(12) United States Patent
Selby et al.

(10) Patent No.: US 12,435,044 B2
(45) Date of Patent: Oct. 7, 2025

(54) PYRIDAZINONE HERBICIDES AND PYRIDAZINONE INTERMEDIATES USED TO PREPARE A HERBICIDE

(71) Applicant: FMC Corporation, Philadelphia, PA (US)

(72) Inventors: Thomas Paul Selby, Hockessin, DE (US); Thomas Martin Stevenson, Newark, DE (US); Stephen Frederick McCann, Newark, DE (US); Eric Allen Marshall, Rising Sun, MD (US); Yuzhong Chen, Wilmington, DE (US)

(73) Assignee: FMC Corporation, Philadelphia, PA (US)

( * ) Notice: Subject to any disclaimer, the term of this patent is extended or adjusted under 35 U.S.C. 154(b) by 1173 days.

(21) Appl. No.: 17/280,611

(22) PCT Filed: Sep. 26, 2019

(86) PCT No.: PCT/US2019/053053
§ 371 (c)(1),
(2) Date: Mar. 26, 2021

(87) PCT Pub. No.: WO2020/069057
PCT Pub. Date: Apr. 2, 2020

(65) Prior Publication Data
US 2022/0041560 A1 Feb. 10, 2022

Related U.S. Application Data

(60) Provisional application No. 62/737,894, filed on Sep. 27, 2018.

(51) Int. Cl.
*C07D 237/16* (2006.01)
*A01N 43/58* (2006.01)
*C07D 237/14* (2006.01)

(52) U.S. Cl.
CPC .......... *C07D 237/16* (2013.01); *A01N 43/58* (2013.01); *C07D 237/14* (2013.01)

(58) Field of Classification Search
CPC ..... C07D 237/14; C07D 237/16; A01N 43/08
See application file for complete search history.

(56) References Cited

U.S. PATENT DOCUMENTS

| 3,555,026 | A | 1/1971 | Reicheneder et al. |
| 4,360,672 | A | 11/1982 | Parg et al. |
| 5,362,708 | A | 11/1994 | Kores et al. |
| 6,551,963 | B1 | 4/2003 | Linker et al. |
| 8,541,414 | B2 | 9/2013 | Kiji et al. |
| 10,118,917 | B2 | 11/2018 | Selby et al. |
| 10,750,743 | B2 | 8/2020 | Stevenson et al. |
| 2003/0236166 | A1 | 12/2003 | Smiley |
| 2010/0249077 | A1 | 9/2010 | Grammenos et al. |
| 2016/0272613 | A1 | 9/2016 | Braun et al. |
| 2017/0050953 | A1 | 2/2017 | Selby et al. |
| 2018/0332851 | A1 | 11/2018 | Stevenson et al. |

FOREIGN PATENT DOCUMENTS

| CN | 101861306 B | 2/2013 |
| CN | 111018790 A | 4/2020 |
| JP | 2008133252 A | 6/2008 |
| JP | 2017075131 A | 4/2017 |
| JP | 2022-502423 A | 1/2022 |
| WO | 2009/086041 A1 | 7/2009 |
| WO | 2009/115420 A2 | 9/2009 |
| WO | 2015/052095 A1 | 4/2015 |
| WO | 2015/071205 A1 | 5/2015 |
| WO | 2015/168010 | 11/2015 |
| WO | 2015/168010 A1 | 11/2015 |
| WO | 2016/149315 A1 | 9/2016 |
| WO | 2017/074988 | 5/2017 |

OTHER PUBLICATIONS

International Search Report for corresponding PCT/US2019/053053 patent application.
R'kyek, et al., "Study of the Reactivity of 5-Alkynyl-4-chloro- and 4-Alkynyl-5-chloropyridazin-3(2H)-ones Towards Oxygen and Sulfur Nucleophiles", Heterocycles, vol. 57, No., 11, 2002, pp. 2115-2128.
Katrusiak, et al., "Ipso and cine Substitution of Bromine in Pyridazinones", Polish Journal Chemistry, vol. 76, 2002, pp. 45-56.

*Primary Examiner* — John Pak
(74) *Attorney, Agent, or Firm* — FMC Corporation

(57) ABSTRACT

Disclosed are compounds of Formula I and N-oxides or salts thereof, wherein $R^1$ is $C_1$-$C_4$alkyl or $C_3$-$C_6$cycloalkyl; $R^2$ is H, Cl, Br or I; $R^3$ is Cl or $OR^4$; $R^4$ is H or $C_1$-$C_4$ alkyl; $R^5$ is H, F, Cl or $CH_3$; and $R^6$ is H or Cl. Also disclosed is a composition containing a compound of Formula I, and methods for controlling undesired vegetation comprising contacting the undesired vegetation or its environment with an effective amount of a compound of Formula I or a composition thereof. Also disclosed are methods for preparing a compound of Formula I.

17 Claims, No Drawings

PYRIDAZINONE HERBICIDES AND PYRIDAZINONE INTERMEDIATES USED TO PREPARE A HERBICIDE

BACKGROUND OF THE INVENTION

The present disclosure provides pyridazinones and processes for preparing pyridazinones. The pyridazinones disclosed herein can be used as synthetic intermediates to prepare pyridazinone-based herbicides or used as pyridazinone herbicides. WO 2015/168010 and WO 2017/074988 disclose herbicidal pyridazinones and synthetic intermediates used to prepare herbicidal pyridazinones. There exists a need for improved herbicidal pyridazinones and improved methods of preparing herbicidal pyridazinones.

SUMMARY OF THE INVENTION

In one aspect, the present disclosure provides a compound of Formula I and N-oxides or salts thereof,

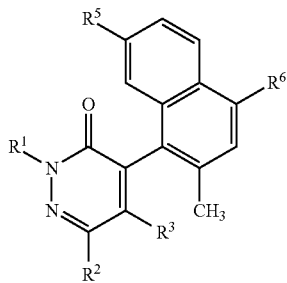

I wherein
$R^1$ is $C_1$-$C_4$ alkyl or $C_3$-$C_6$ cycloalkyl;
$R^2$ is H, Cl, Br or I;
$R^3$ is Cl or $OR^4$;
$R^4$ is H or $C_1$-$C_4$ alkyl;
$R^5$ is H, F, Cl or $CH_3$; and
$R^6$ is H or Cl.

In another aspect, the present disclosure provides a process for preparing a compound of Formula I-A

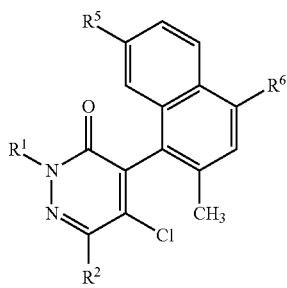

I-A wherein
$R^1$ is $C_1$-$C_4$ alkyl or $C_3$-$C_6$ cycloalkyl;
$R^2$ is H or Cl;
$R^5$ is H, F, Cl or $CH_3$; and
$R^6$ is H or Cl
the process comprising:

(1) reacting a compound of Formula II

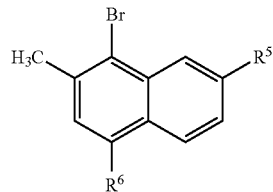

II wherein
$R^5$ is H, F, Cl or $CH_3$; and
$R^6$ is H or Cl
with magnesium to form an intermediate compound of Formula III

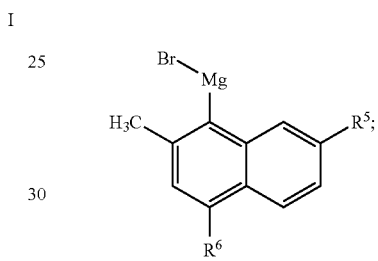

III and (2) reacting the intermediate compound or Formula III formed in (1) with a compound of Formula IV-A or IV-B

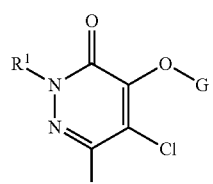

IV-A or

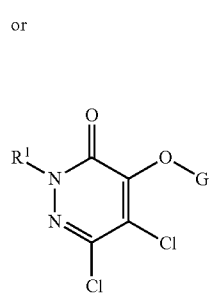

IV-B wherein
$R^1$ is $C_1$-$C_4$ alkyl or $C_3$-$C_6$ cycloalkyl;
G is $C_1$-$C_4$ alkyl, $SO_2CF_3$ or $SO_2$(4-Me-Ph).

In another aspect, the present disclosure provides a process for preparing a compound of Formula I-B

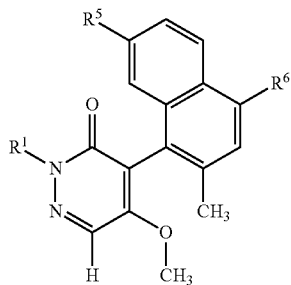

I-B wherein
$R^1$ is $C_1$-$C_4$ alkyl or $C_3$-$C_6$ cycloalkyl;
$R^5$ is H, F, Cl or $CH_3$; and
$R^6$ is H or Cl
the process comprising reacting a compound of Formula I-A, as set forth above wherein $R^2$ is H, with a methoxylating agent.

In another aspect, the present disclosure provides a process for preparing a compound of Formula I-C

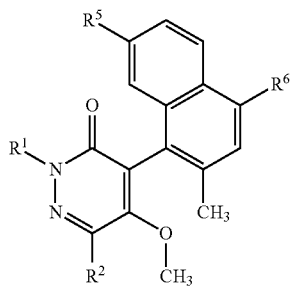

I-C wherein
$R^1$ is $C_1$-$C_4$ alkyl or $C_3$-$C_6$ cycloalkyl;
$R^2$ is Cl, Br or I;
$R^5$ is H, F, Cl or $CH_3$; and
$R^6$ is H or Cl
the process comprising:
(1) reacting a compound of Formula I-B, as set forth above, with a tmp-zinc base, to form a zincated intermediate compound of Formula V

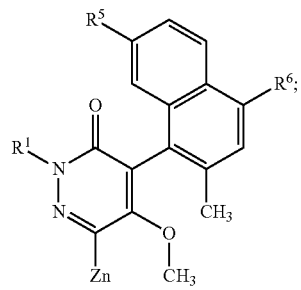

V and
(2) reacting the zincated intermediate compound of Formula V formed in (1) with a halogenating agent.

In another aspect, the present disclosure provides a process for preparing a compound of Formula I-D

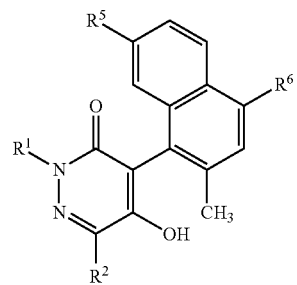

I-D wherein
$R^1$ is $C_1$-$C_4$ alkyl or $C_3$-$C_6$ cycloalkyl;
$R^2$ is Cl, Br or I;
$R^5$ is H, F, Cl or $CH_3$; and
$R^6$ is H or Cl
the process comprising reacting a compound of Formula I-C, as set forth above, with a demethylating agent.

In another aspect, the present disclosure provides a further process for preparing a compound of Formula I-E

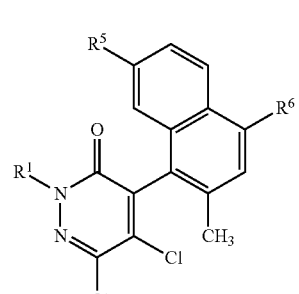

I-E wherein
$R^1$ is $C_1$-$C_4$ alkyl or $C_3$-$C_6$ cycloalkyl;
$R^5$ is H, F, Cl or $CH_3$; and
$R^6$ is H or Cl;
the process comprising reacting a compound of Formula VI

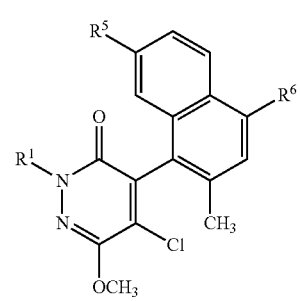

VI wherein
$R^1$ is $C_1$-$C_4$ alkyl or $C_3$-$C_6$ cycloalkyl
$R^5$ is H, F, Cl or $CH_3$; and
$R^6$ is H or Cl
with phosphorous oxychloride.

In another aspect, the present disclosure provides a further process for preparing a compound of Formula I-E

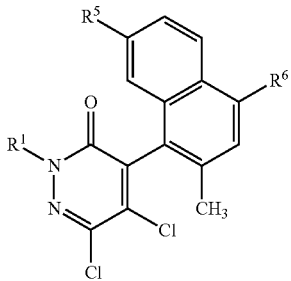

I-E wherein
R¹ is $C_1$-$C_4$ alkyl or $C_3$-$C_6$ cycloalkyl;
R⁵ is H, F, Cl or $CH_3$; and
R⁶ is H or Cl;
the process comprising:
(1) reacting a compound of Formula II

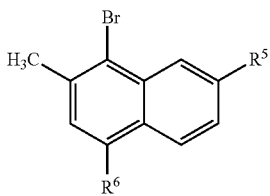

II wherein
R⁵ is H, F, Cl or $CH_3$; and
R⁶ is H or Cl;
with magnesium to form an intermediate compound of Formula III

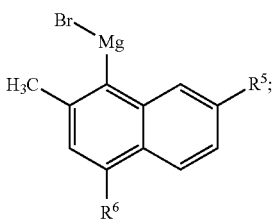

III and
(2) reacting the intermediate compound or Formula III formed in (1) with a compound of Formula 7

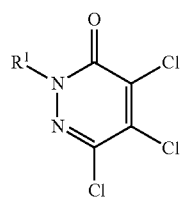

7 wherein
R¹ is $C_1$-$C_4$ alkyl or $C_3$-$C_6$ cycloalkyl.

DETAILED DESCRIPTION OF THE INVENTION

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a process or method that comprises a list of elements is not necessarily limited to only those elements but may include other elements not expressly listed or inherent to such composition process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a process or method that includes materials, steps, features, components, or elements, in addition to those literally disclosed, provided that these additional materials, steps, features, components, or elements do not materially affect the basic and novel characteristic(s) of the disclosure. The term "consisting essentially of" occupies a middle ground between "comprising" and "consisting of".

Where applicants have defined the disclosure or a portion thereof with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, term "$C_1$-$C_6$ alkyl" includes straight-chain or branched alkyl groups having one to six carbon atoms, e.g., methyl, ethyl, n-propyl, i-propyl, or the different butyl, pentyl, or hexyl isomers. Likewise, the term "$C_1$-$C_4$ alkyl" includes straight-chain or branched alkyl having one to four carbon atoms, e.g., methyl, ethyl, n-propyl, i-propyl, or the different butyl isomers, and the term "$C_1$-$C_3$ alkyl" includes methyl, ethyl, n-propyl, and i-propyl.

As used herein, the term "halogen" includes fluorine, chlorine, bromine or iodine. When G is "$SO_2$(4-Me-Ph)" this is alternatively defined as "$SO_2$(p-tolyl)." The term "reacting" and the like refer to adding, contacting, or mixing two or more reagents under appropriate conditions to produce the indicated and/or the desired product. It should be appreciated that the reaction which produces the indicated and/or the desired product may not necessarily result directly from the combination of two reagents which were initially added, i.e. there may be one or more intermediates which are produced in the mixture which ultimately leads to the formation of the indicated and/or the desired product. Reacting can take place in the presence or absence of solvent, at a temperature above room temperature or below room temperature, under an inert atmosphere, etc.

The term "methoxylating agent" as used herein refers to a chemical reagent used to add a methoxy group, i.e. $OCH_3$, to a compound. Exemplary non-limiting methoxylating agents include sodium methoxide or potassium methoxide. The term "tmp-zinc base" as used herein refers to a chemical complex which comprises zinc and 2,2,6,6-tetramethylpiperidine.

Exemplary non-limiting zinc bases include $(tmp)_2Zn \cdot 2MgCl_2 \cdot 2LiCl$. $(tmp)_2Zn \cdot 2LiCl$ and $(tmp)_2Zn$.

The term "halogenating agent" as used herein refers to a chemical reagent used to add a halogen atom, e.g., Cl, Br or I, to a compound. Exemplary non-limiting halogenating agents include iodine, 1,3-dichloro-5,5-dimethylhydantoin, 1,3-dibromo-5,5-dimethylhydantoin, 1,3-diiodo-5,5-dimethylhydantoin, trichloroisocyanuric acid, sulfuryl chloride, N-bromosuccinimide and N-chlorosuccinimide.

Compounds of Formula I typically exist in more than one solid form. Thus, compounds of Formula I includes all crystalline and non-crystalline forms of the compounds they represent. Non-crystalline forms include embodiments which are solids such as waxes and gums as well as embodiments which are liquids such as solutions and melts. Crystalline forms include embodiments which represent essentially a single crystal type and embodiments which represent a mixture of polymorphs (i.e. different crystalline types). The term "polymorph" refers to a particular crystalline form of a chemical compound that can crystallize in different crystalline forms, these forms having different arrangements and/or conformations of the molecules in the crystal lattice. Although polymorphs can have the same chemical composition, they can also differ in composition due the presence or absence of co-crystallized water or other molecules, which can be weakly or strongly bound in the lattice. Polymorphs can differ in such chemical, physical and biological properties as crystal shape, density, hardness, color, chemical stability, melting point, hygroscopicity, suspensibility, dissolution rate and biological availability.

One skilled in the art will appreciate that a polymorph of a compound of Formula I can exhibit beneficial effects (e.g., suitability for preparation of useful formulations, improved biological performance) relative to another polymorph or a mixture of polymorphs of the same compound of Formula I. Preparation and isolation of a particular polymorph of a compound of Formula I can be achieved by methods known to those skilled in the art including, for example, crystallization using selected solvents and temperatures. For a comprehensive discussion of polymorphism see R. Hilfiker, Ed., *Polymorphism in the Pharmaceutical Industry*, Wiley-VCH, Weinheim, 2006.

Synthetic methods for the preparation of N-oxides of heterocycles and tertiary amines are well known by one skilled in the art. Exemplary procedures for preparing N-oxides include the oxidation of heterocycles and tertiary amines with peroxy acids such as peracetic and m-chloroperbenzoic acid (MCPBA), hydrogen peroxide, alkyl hydroperoxides such as t-butyl hydroperoxide, sodium perborate, and dioxiranes such as dimethyldioxirane. These methods for the preparation of N-oxides have been extensively described and reviewed in the literature, see for example: T. L. Gilchrist in *Comprehensive Organic Synthesis*, vol. 7, pp 748-750, S. V. Ley, Ed., Pergamon Press; M. Tisler and B. Stanovnik in *Comprehensive Heterocyclic Chemistry*, vol. 3, pp 18-20, A. J. Boulton and A. McKillop, Eds., Pergamon Press; M. R. Grimmett and B. R. T. Keene in *Advances in Heterocyclic Chemistry*, vol. 43, pp 149-161, A. R. Katritzky, Ed., Academic Press; M. Tisler and B. Stanovnik in *Advances in Heterocyclic Chemistry*, vol. 9, pp 285-291, A. R. Katritzky and A. J. Boulton, Eds., Academic Press; and G. W. H. Cheeseman and E. S. G. Werstiuk in *Advances in Heterocyclic Chemistry*, vol. 22, pp 390-392, A. R. Katritzky and A. J. Boulton, Eds., Academic Press. That said, one skilled in the art will appreciate that not all nitrogen-containing heterocycles can form N-oxides since the nitrogen requires an available lone pair for oxidation to the oxide; one skilled in the art will recognize those nitrogen-containing heterocycles which can form N-oxides.

One skilled in the art recognizes that because in the environment and under physiological conditions salts of chemical compounds are in equilibrium with their corresponding nonsalt forms, salts share the biological utility of the nonsalt forms. Thus a wide variety of salts of a compound of Formula I are useful for control of undesired vegetation (i.e. are agriculturally suitable). The salts of a compound of Formula I include acid-addition salts with inorganic or organic acids such as hydrobromic, hydrochloric, nitric, phosphoric, sulfuric, acetic, butyric, fumaric, lactic, maleic, malonic, oxalic, propionic, salicylic, tartaric, 4-toluenesulfonic or valeric acids. Accordingly, the present disclosure comprises compounds selected from Formula I, N-oxides and agriculturally suitable salts thereof.

Embodiments of the present disclosure (where a compound of Formula I includes a compound of Formula I-A, I-B, I-C, I-D and I-E) also include N-oxides and/or salts thereof):

A. A Compound of Formula I

Embodiment A1. A compound of Formula I and N-oxides or salts thereof as described in the Summary of the Invention.

Embodiment A2. The compound of Embodiment A1 wherein $R^1$ is $C_1$-$C_4$ alkyl.

Embodiment A3. The compound of any one of Embodiments A1 or A2 wherein $R^1$ is $CH_3$.

Embodiment A3A. The compound of any one of Embodiments A1 to A3 wherein $R^2$ is Cl.

Embodiment A4. The compound of any one of Embodiments A1 to A3 wherein $R^2$ is Br.

Embodiment A5. The compound of any one of Embodiments A1 to A4 wherein $R^3$ is Cl.

Embodiment A6. The compound of any one of Embodiments A1 to A4 wherein $R^3$ is $OR^4$; and $R^4$ is H.

Embodiment A7. The compound of any one of Embodiments A1 to A4 wherein $R^3$ is $OR^4$; and $R^4$ is $C_1$-$C_4$ alkyl.

Embodiment A8. The compound of any one of Embodiments A1 to A4 wherein $R^3$ is $OR^4$; and $R^4$ is $CH_3$.

Embodiment A9. The compound of any one of Embodiments A1 through A8 wherein $R^5$ is F.

Embodiment A10. The compound of any one of Embodiments A1 through A8 wherein $R^5$ is Cl.

Embodiment A11. The compound of any one of Embodiments A1 through A8 wherein $R^5$ is $CH_3$.

Embodiment A12. The compound of any one of Embodiments A1 through A8 wherein $R^5$ is H.

Embodiment A13. The compound of any one of Embodiments A1 to A12 wherein $R^6$ is H.

Embodiment A14. The compound of any one of Embodiments A1 to A12 wherein $R^6$ is Cl.

Embodiment A15. The compound of Embodiment A1 wherein $R^1$ is $CH_3$ and $R^2$, $R^3$, $R^4$, $R^5$ and $R^6$ of Formula I are as defined in Table AA.

TABLE AA

| Cpd. No. | $R^2$ | $R^3$ | $R^4$ | $R^5$ | $R^6$ |
|---|---|---|---|---|---|
| 1 | H | Cl | — | H | H |
| 2 | H | Cl | — | F | H |
| 3 | H | Cl | — | Cl | H |
| 4 | H | Cl | — | $CH_3$ | H |
| 5 | Cl | Cl | — | H | H |
| 6 | Cl | Cl | — | F | H |
| 7 | Cl | Cl | — | Cl | H |
| 8 | Cl | Cl | — | $CH_3$ | H |
| 9 | Br | Cl | — | H | H |
| 10 | Br | Cl | — | F | H |
| 11 | Br | Cl | — | Cl | H |
| 12 | Br | Cl | — | $CH_3$ | H |
| 13 | I | Cl | — | H | H |
| 14 | I | Cl | — | F | H |
| 15 | I | Cl | — | Cl | H |
| 16 | I | Cl | — | $CH_3$ | H |
| 17 | H | $OR^4$ | H | Cl | H |
| 18 | H | $OR^4$ | H | $CH_3$ | H |
| 19 | H | $OR^4$ | H | F | H |
| 20 | Cl | $OR^4$ | H | $CH_3$ | H |
| 21 | Cl | $OR^4$ | H | F | H |
| 22 | Cl | $OR^4$ | H | Cl | H |
| 23 | Br | $OR^4$ | H | F | H |
| 24 | Br | $OR^4$ | H | Cl | H |
| 25 | Br | $OR^4$ | H | $CH_3$ | H |
| 26 | I | $OR^4$ | H | F | H |
| 27 | I | $OR^4$ | H | Cl | H |
| 28 | I | $OR^4$ | H | $CH_3$ | H |
| 29 | H | $OR^4$ | $CH_3$ | H | H |
| 30 | H | $OR^4$ | $CH_3$ | F | H |
| 31 | H | $OR^4$ | $CH_3$ | Cl | H |
| 32 | H | $OR^4$ | $CH_3$ | $CH_3$ | H |
| 33 | Cl | $OR^4$ | $CH_3$ | H | H |
| 34 | Cl | $OR^4$ | $CH_3$ | F | H |
| 35 | Cl | $OR^4$ | $CH_3$ | Cl | H |
| 36 | Cl | $OR^4$ | $CH_3$ | $CH_3$ | H |
| 37 | Br | $OR^4$ | $CH_3$ | H | H |
| 38 | Br | $OR^4$ | $CH_3$ | F | H |
| 39 | Br | $OR^4$ | $CH_3$ | Cl | H |
| 40 | Br | $OR^4$ | $CH_3$ | $CH_3$ | H |
| 41 | I | $OR^4$ | $CH_3$ | H | H |
| 42 | I | $OR^4$ | $CH_3$ | F | H |
| 43 | I | $OR^4$ | $CH_3$ | Cl | H |
| 44 | I | $OR^4$ | $CH_3$ | $CH_3$ | H |
| 45 | H | Cl | — | H | Cl |
| 46 | H | Cl | — | F | Cl |
| 47 | H | Cl | — | Cl | Cl |
| 48 | H | Cl | — | $CH_3$ | Cl |
| 49 | Cl | Cl | — | H | Cl |
| 50 | Cl | Cl | — | F | Cl |
| 51 | Cl | Cl | — | Cl | Cl |
| 52 | Cl | Cl | — | $CH_3$ | Cl |
| 53 | Br | Cl | — | H | Cl |
| 54 | Br | Cl | — | F | Cl |
| 55 | Br | Cl | — | Cl | Cl |
| 56 | Br | Cl | — | $CH_3$ | Cl |
| 57 | I | Cl | — | H | Cl |
| 58 | I | Cl | — | F | Cl |
| 59 | I | Cl | — | Cl | Cl |
| 60 | I | Cl | — | $CH_3$ | Cl |
| 61 | H | $OR^4$ | H | H | Cl |
| 62 | H | $OR^4$ | H | F | Cl |
| 63 | H | $OR^4$ | H | Cl | Cl |
| 64 | H | $OR^4$ | H | $CH_3$ | Cl |
| 65 | Cl | $OR^4$ | H | H | Cl |
| 66 | Cl | $OR^4$ | H | F | Cl |
| 67 | Cl | $OR^4$ | H | Cl | Cl |
| 68 | Cl | $OR^4$ | H | $CH_3$ | Cl |
| 69 | I | $OR^4$ | H | H | Cl |
| 70 | I | $OR^4$ | H | F | Cl |
| 71 | I | $OR^4$ | H | Cl | Cl |
| 72 | I | $OR^4$ | H | $CH_3$ | Cl |
| 73 | H | $OR^4$ | $CH_3$ | H | Cl |
| 74 | H | $OR^4$ | $CH_3$ | F | Cl |
| 75 | H | $OR^4$ | $CH_3$ | Cl | Cl |
| 76 | H | $OR^4$ | $CH_3$ | $CH_3$ | Cl |
| 77 | Cl | $OR^4$ | $CH_3$ | H | Cl |
| 78 | Cl | $OR^4$ | $CH_3$ | F | Cl |
| 79 | Cl | $OR^4$ | $CH_3$ | Cl | Cl |
| 80 | Cl | $OR^4$ | $CH_3$ | $CH_3$ | Cl |
| 81 | Br | $OR^4$ | $CH_3$ | H | Cl |
| 82 | Br | $OR^4$ | $CH_3$ | F | Cl |
| 83 | Br | $OR^4$ | $CH_3$ | Cl | Cl |
| 84 | Br | $OR^4$ | $CH_3$ | $CH_3$ | Cl |
| 85 | I | $OR^4$ | $CH_3$ | H | Cl |
| 86 | I | $OR^4$ | $CH_3$ | F | Cl |
| 87 | I | $OR^4$ | $CH_3$ | Cl | Cl |
| 88 | I | $OR^4$ | $CH_3$ | $CH_3$ | Cl |

Embodiment A16. A compound of Embodiment A1 (i.e. a compound of Formula I selected from
5-chloro-2-methyl-4-(2-methyl-1-naphthalenyl)-3(2H)-pyridazinone;
5-chloro-4-(2,7-dimethyl-1-naphthalenyl)-2-methyl-3(2H)-pyridazinone;
5-methoxy-2-methyl-4-(2-methyl-1-naphthalenyl)-3(2H)-pyridazinone;
4-(2,7-dimethyl-1-naphthalenyl)-5-methoxy-2-methyl-3(2H)-pyridazinone;
6-chloro-5-methoxy-2-methyl-4-(2-methyl-1-naphthalenyl)-3(2H)-pyridazinone; and
6-chloro-4-(2,7-dimethyl-1-naphthalenyl)-5-methoxy-2-methyl-3(2H)-pyridazinone.

Embodiment A17. The compound of Embodiment A1 provided that
(a) when $R^3$ is $OR^4$; $R^4$ is H; and $R^5$ is H, then $R^6$ is Cl; and
(b) when $R^2$ is Br: $R^3$ is $OR^4$; and $R^4$ is H, then $R^6$ is H.

B. A Process for Preparing a Compound of Formula I-A

Embodiment B1. A process as described in the Summary of the Invention for preparing a compound of Formula I-A.

Embodiment B2. The process of Embodiment B1 wherein $R^1$ is $C_1$-$C_4$ alkyl.

Embodiment B3. The process of any one of Embodiments B1 or B2 wherein $R^1$ is $CH_3$.

Embodiment B4. The process of any one of Embodiments B1 to B3 wherein $R^2$ is Cl.

Embodiment B5. The process of any one of Embodiments B1 to B3 wherein $R^2$ is Br.

Embodiment B6. The process of any one of Embodiments B1 through B5 wherein $R^5$ is F.

Embodiment B7. The process of any one of Embodiment B1 through B5 wherein $R^5$ is Cl.

Embodiment B8. The process of any one of Embodiment B1 through B5 wherein $R^5$ is $CH_3$.

Embodiment B9. The process of any one of Embodiments B1 through B5 wherein $R^5$ is H.

Embodiment B10. The process of any one of Embodiments B1 through B9 wherein $R^6$ is H.

Embodiment B11. The process of any one of Embodiments B1 through B9 wherein $R^6$ is Cl.

Embodiment B12. The process of Embodiment B1 wherein the compound of Formula I-A is selected from the group consisting of Cpd. No. 1, 2, 3, 4, 5, 6, 7, 8, 45, 46, 47, 48, 49, 50, 51 and 52 (i.e. a compound of Formula I wherein $R^1$ is $CH_3$; $R^5$ is H, F, Cl or $CH_3$; $R^2$ is H; $R^3$ is Cl; and $R^6$ is H or Cl, as listed in TABLE BB).

TABLE BB

| Cpd. No. | $R^2$ | $R^3$ | $R^5$ | $R^6$ |
|---|---|---|---|---|
| 1 | H | Cl | H | H |
| 2 | H | Cl | F | H |
| 3 | H | Cl | Cl | H |
| 4 | H | Cl | $CH_3$ | H |
| 5 | Cl | Cl | H | H |
| 6 | Cl | Cl | F | H |
| 7 | Cl | Cl | Cl | H |
| 8 | Cl | Cl | $CH_3$ | H |
| 45 | H | Cl | H | Cl |
| 46 | H | Cl | F | Cl |
| 47 | H | Cl | Cl | Cl |
| 48 | H | Cl | $CH_3$ | Cl |
| 49 | Cl | Cl | H | Cl |
| 50 | Cl | Cl | F | Cl |
| 51 | Cl | Cl | Cl | Cl |
| 52 | Cl | Cl | $CH_3$ | Cl |

Embodiment B13. The process of any one of Embodiments B1 through B12 wherein a compound of Formulae II or III is as described in the Summary of the Invention.
Embodiment B14. The process of Embodiment B13 wherein $R^5$ is F.
Embodiment B15. The process of Embodiment B13 wherein $R^5$ is Cl.
Embodiment B16. The process of Embodiment B13 wherein $R^5$ is $CH_3$.
Embodiment B17. The process of Embodiment B13 wherein $R^5$ is H.
Embodiment B18. The process of any one of Embodiments B1 or B13 through B17 wherein $R^6$ is H.
Embodiment B19. The process of any one of Embodiments B13 through B17 wherein $R^6$ is Cl.
Embodiment B20. The process of any one of Embodiments B13 through B17 wherein a compound of Formulae IV-A or IV-B is as defined in the Summary of the Invention.
Embodiment B21. The process of Embodiment B20 wherein $R^1$ is $C_1$-$C_4$ alkyl.
Embodiment B22. The process of Embodiment B20 wherein $R^1$ is $C_3$-$C_6$ cycloalkyl.
Embodiment B23. The process of Embodiment B20 wherein $R^1$ is $CH_3$.
Embodiment B24. The process of any one of Embodiments B20 through B23 wherein G is $C_1$-$C_6$ alkyl.
Embodiment B25. The process of Embodiment B24 wherein G is $CH_3$.
Embodiment B26. The process of any one of Embodiments B1 to B25 further comprising isolating the compound of Formula I-A.
Embodiment B27. The process of any one of Embodiments B1 through B26 wherein the reacting of a compound of Formula II with magnesium is performed in a suitable solvent.
Embodiment B28. The process of Embodiment B27 wherein the reacting of a compound of Formula II with magnesium is performed in tetrahydrofuran.
Embodiment B29. The process of any of Embodiments B1 through B28 wherein the reacting of a compound of Formula II with magnesium is performed at a temperature above 80° C.
Embodiment B30. The process of any one of Embodiments B1 through B28 wherein the reacting is performed at a temperature at or below 0° C.
Embodiment B31. The process of any one of Embodiments B1 through B30 wherein the reacting is performed at a temperature from about 0° C. to about 80° C.

C. A Process for Preparing a Compound of Formula I-B

Embodiment C1. A process as described in the Summary of the Invention for preparing a compound of Formula I-B.
Embodiment C2. A process of Embodiment C1 wherein $R^1$ is $C_1$-$C_4$ alkyl.
Embodiment C3. The process of Embodiment C2 wherein $R^1$ is $CH_3$.
Embodiment C4. The process of any one of Embodiments C1 through C3 wherein $R^5$ is F.
Embodiment C5. The process of any one of Embodiments C1 through C3 wherein $R^5$ is Cl.
Embodiment C6. The process of any one of Embodiment C1 through C3 wherein $R^5$ is $CH_3$.
Embodiment C7. The process of any one of Embodiment C1 through C3 wherein $R^5$ is H.
Embodiment C8. The process of any one of Embodiments C1 through C7 wherein $R^6$ is H.
Embodiment C9. The process of any one of Embodiments C1 through C7 wherein $R^6$ is Cl.
Embodiment C10. The process of any one of Embodiments C1 through C9 wherein the compound of Formula I-B is selected from the group consisting of Cpd. Nos. 29, 30, 31, 32, 73, 74, 75 and 76 (i.e. Compounds of Formula I wherein $R^1$ is $CH_3$; $R^2$ is H; $R^3$ is $OR^4$; $R^4$ is $CH_3$; $R^5$ is H, F, Cl or $CH_3$; and $R^6$ is H or Cl; as listed in TABLE CC).

TABLE CC

| Cpd. No. | $R^2$ | $R^3$ | $-R^4$ | $R^5$ | $R^6$ |
|---|---|---|---|---|---|
| 29 | H | $OR^4$ | $CH_3$ | H | H |
| 30 | H | $OR^4$ | $CH_3$ | F | H |
| 31 | H | $OR^4$ | $CH_3$ | Cl | H |
| 32 | H | $OR^4$ | $CH_3$ | $CH_3$ | H |
| 73 | H | $OR^4$ | $CH_3$ | H | Cl |
| 74 | H | $OR^4$ | $CH_3$ | F | Cl |
| 75 | H | $OR^4$ | $CH_3$ | Cl | Cl |
| 76 | H | $OR^4$ | $CH_3$ | $CH_3$ | Cl |

Embodiment C11. The process of any one of Embodiments C1 through C10 wherein the reacting is performed in a suitable solvent.
Embodiment C12. The process of Embodiment C11 wherein the suitable solvent is methanol.
Embodiment C13. The process of any one of Embodiments C1 through C12 wherein the reacting is performed at a temperature at or below 0° C.
Embodiment C14. The process of any one of Embodiments C1 through C13 wherein the methoxylating agent is sodium methoxide.

D. A Process for Preparing a Compound of Formula I-C

Embodiment D1. A process as described in the Summary of the Invention for preparing a compound of Formula I-C.
Embodiment D2. The process of Embodiment D1 wherein $R^1$ is $C_1$-$C_4$ alkyl.
Embodiment D3. The process of Embodiment D1 wherein $R^1$ is $C_3$-$C_6$ cycloalkyl.
Embodiment D4. The process of any one of Embodiments D1 through D3 wherein $R^2$ is Cl or Br.
Embodiment D5. The process of Embodiment D4 wherein $R^2$ is Cl.

Embodiment D6. The process of any one of Embodiments D1 through D5 wherein $R^5$ is H or $CH_3$.

Embodiment D7. The process of Embodiment D6 wherein $R^5$ is H.

Embodiment D8. The process of Embodiment D6 wherein $R^5$ is $CH_3$.

Embodiment D9. The process of any one of Embodiments D1 through D8 wherein $R^6$ is H.

Embodiment D10. The process of Embodiment D1 wherein in the intermediate compound of Formula V, $R^1$ is $C_1$-$C_4$ alkyl.

Embodiment D11. The process of Embodiment D1 wherein in the intermediate compound of Formula V, $R^1$ is $C_3$-$C_6$ cycloalkyl.

Embodiment D12. The process of any one Embodiments D10 through D11 wherein in the intermediate compound of Formula V, $R^5$ is H or $CH_3$.

Embodiment D13. The process of Embodiment D12 wherein $R^5$ is H.

Embodiment D14. The process of Embodiment D12 wherein $R^5CH_3$.

Embodiment D15. The process of any one of Embodiments D10 through D14 wherein $R^6$ is H.

Embodiment D16. The process of any one of Embodiments D10 through D14 wherein $R^6$ is Cl.

Embodiment D17. The process of any one of Embodiments D1 through D16 further comprising isolating the compound of Formula I-C.

Embodiment D18. The process of Embodiment D1 wherein the compound of Formula I-C is selected from the group consisting of Cpd. No. 33, 34, 35, 36, 37, 38, 39, 40, 41, 42, 43, 44, 77, 78, 79, 80, 81, 82, 83, 84, 85, 86, 87 and 88 (i.e. a compound of Formula I wherein $R^1$ is $CH_3$; $R^2$ is Cl, Br or I; $R^3$ is $OR^4$; $R^4$ is $CH_3$; $R^5$ is H, F, Cl or $CH_3$; and $R^6$ is H or Cl, as listed in TABLE DD).

TABLE DD

| Cpd. No. | $R^2$ | $R^3$ | $R^4$ | $R^5$ | $R^6$ |
|---|---|---|---|---|---|
| 33 | Cl | $OR^4$ | $CH_3$ | H | H |
| 34 | Cl | $OR^4$ | $CH_3$ | F | H |
| 35 | Cl | $OR^4$ | $CH_3$ | Cl | H |
| 36 | Cl | $OR^4$ | $CH_3$ | $CH_3$ | H |
| 37 | Br | $OR^4$ | $CH_3$ | H | H |
| 38 | Br | $OR^4$ | $CH_3$ | F | H |
| 39 | Br | $OR^4$ | $CH_3$ | Cl | H |
| 40 | Br | $OR^4$ | $CH_3$ | $CH_3$ | H |
| 41 | I | $OR^4$ | $CH_3$ | H | H |
| 42 | I | $OR^4$ | $CH_3$ | F | H |
| 43 | I | $OR^4$ | $CH_3$ | Cl | H |
| 44 | I | $OR^4$ | $CH_3$ | $CH_3$ | H |
| 77 | Cl | $OR^4$ | $CH_3$ | H | Cl |
| 78 | Cl | $OR^4$ | $CH_3$ | F | Cl |
| 79 | Cl | $OR^4$ | $CH_3$ | Cl | Cl |
| 80 | Cl | $OR^4$ | $CH_3$ | $CH_3$ | Cl |
| 81 | Br | $OR^4$ | $CH_3$ | H | Cl |
| 82 | Br | $OR^4$ | $CH_3$ | F | Cl |
| 83 | Br | $OR^4$ | $CH_3$ | Cl | Cl |
| 84 | Br | $OR^4$ | $CH_3$ | $CH_3$ | Cl |
| 85 | I | $OR^4$ | $CH_3$ | H | Cl |
| 86 | I | $OR^4$ | $CH_3$ | F | Cl |
| 87 | I | $OR^4$ | $CH_3$ | Cl | Cl |
| 88 | I | $OR^4$ | $CH_3$ | $CH_3$ | Cl |

Embodiment D19. The process of any one of Embodiments D1-D18 wherein the reacting of a compound of Formula I-B with a tmp-zinc base is performed in suitable solvent.

Embodiment D20. The process of Embodiment D19 wherein the suitable solvent is a tetrahydrofuran.

Embodiment D21. The process of any one of Embodiments D1-D20 wherein the tmp-zinc base is an organometallic tmp-zinc base.

Embodiment D22. The process of Embodiment D21 wherein the tmp-zinc base is prepared from zinc chloride and 2,2,6,6-tetramethylpiperidinyl magnesium chloride lithium chloride complex.

Embodiment D23. The process of Embodiment D22 wherein the tmp-zinc base is bis(2,2,6,6-tetramethylpiperidinyl)zinc, lithium chloride, magnesium chloride complex.

Embodiment D24. The process of any one of Embodiments D1 through D22 wherein the reacting of the intermediate with halogenating agent is performed in suitable solvent.

Embodiment D25. The process of Embodiment D24 wherein the suitable solvent is tetrahydrofuran.

Embodiment D26. The process of any one of Embodiments D1 through D25 wherein the halogenating agent is iodine, N-bromosuccinimide or isocyanuric chloride.

Embodiment D27. The process of any one of Embodiments D1 through D26 wherein the halogenating agent is N-bromosuccinimide or isocyanuric chloride.

Embodiment D28. The process of any one of Embodiments D1 through D27 wherein the halogenating agent is isocyanuric chloride.

Embodiment D29. The process of any one of Embodiments D1 through D28 wherein the compound of Formula I-C wherein $R^1$ is $C_1$-$C_4$ alkyl or $C_3$-$C_6$ cycloalkyl; $R^2$ is Cl; $R^5$ is H, F, Cl or $CH_3$; and $R^6$ is H or Cl; comprises reacting a compound of Formula I-E with a methoxylating agent.

Embodiment D30. The process of Embodiment D29 wherein the methoxylating agent is sodium methoxide.

E. A Process for Preparing a Compound of Formula I-D

Embodiment E1. A process as described in the Summary of the Invention for preparing a compound of Formula I-D.

Embodiment E2. The process of Embodiment E1 wherein $R^1$ is $C_1$-$C_4$ alkyl.

Embodiment E3. The process of Embodiment E1 wherein $R^1$ is $C_3$-$C_6$ cycloalkyl.

Embodiment E4. The process of Embodiments E1 or E2 wherein $R^1$ is $CH_3$.

Embodiment E5. The process of any one of Embodiments E1 to E4 wherein $R^2$ is Cl.

Embodiment E6. The process of any one of Embodiments E1 to E4 wherein $R^2$ is Br.

Embodiment E7. The process of any one of Embodiments E1 to E4 wherein $R^2$ is I.

Embodiment E8. The process of any one of Embodiments E1 to E7 wherein $R^5$ is H.

Embodiment E9. The process of any one of Embodiments E1 to E7 wherein $R^5$ is F.

Embodiment E10. The process of any one of Embodiments E1 to E7 wherein $R^5$ is Cl.

Embodiment E11. The process of any one of Embodiments E1 to E7 wherein $R^5$ is $CH_3$.

Embodiment E12. The process of any one of Embodiments E1 to E11 wherein $R^6$ is H.

Embodiment E13. The process of any one of Embodiments E1 to E11 wherein $R^6$ is Cl.

Embodiment E14. The process of Embodiment E1 wherein the compound of Formula I-B is selected from the group consisting of Cpd No. 20, 21, 22, 23, 24, 25, 26, 27, 28, 65, 66, 67, 68, 69, 70, 71 and 72 (i.e. a compound of Formula I wherein $R^1$ is $CH_3$; $R^2$ is Cl, Br or I; $R^3$ is $OR^4$; $R^4$ is H; $R^5$ is H, F, Cl or $CH_3$; and $R^6$ is H or Cl, as listed in TABLE EE).

TABLE EE

| Cpd. No. | $R^2$ | $R^3$ | $R^4$ | $R^5$ | $R^6$ |
|---|---|---|---|---|---|
| 21 | Cl | $OR^4$ | H | F | H |
| 22 | Cl | $OR^4$ | H | Cl | H |
| 20 | Cl | $OR^4$ | H | $CH_3$ | H |
| 23 | Br | $OR^4$ | H | F | H |
| 24 | Br | $OR^4$ | H | Cl | H |
| 25 | Br | $OR^4$ | H | $CH_3$ | H |
| 26 | I | $OR^4$ | H | F | H |
| 27 | I | $OR^4$ | H | Cl | H |
| 28 | I | $OR^4$ | H | $CH_3$ | H |
| 65 | Cl | $OR^4$ | H | H | Cl |
| 66 | Cl | $OR^4$ | H | F | Cl |
| 67 | Cl | $OR^4$ | H | Cl | Cl |
| 68 | Cl | $OR^4$ | H | $CH_3$ | Cl |
| 69 | I | $OR^4$ | H | H | Cl |
| 70 | I | $OR^4$ | H | F | Cl |
| 71 | I | $OR^4$ | H | Cl | Cl |
| 72 | I | $OR^4$ | H | $CH_3$ | Cl |

Embodiment E15. The process of any one of Embodiments E1 to E13, wherein the reacting is performed in a suitable solvent.

Embodiment E16. The process of Embodiment E14, wherein the reacting is performed in a liquid demethylating agent in the absence of a further solvent.

Embodiment E17. The process of any one of Embodiments E2 to E15 wherein the reacting is performed at a temperature at or above 80° C.

Embodiment E18. The process of any one of Embodiments E1 to E16 wherein the demethylating agent is morpholine.

Embodiment E18. The process of any one of Embodiments E1 to E16 wherein the demethylating agent is other than morpholine.

F. A Process for Preparing a Compound of Formula I-E

Embodiment F1. A process as described in the Summary of the Invention for preparing a compound of Formula I-E.

Embodiment F2. The process of Embodiment F1 wherein $R^1$ is $C_1$-$C_4$ alkyl.

Embodiment F3. The process of Embodiment F1 wherein $R^1$ is $C_3$-$C_6$ cycloalkyl.

Embodiment F4. The process of Embodiments F1 through F2, wherein $R^1$ is $CH_3$.

Embodiment F5. The process of any one of Embodiments F1 to F4 wherein $R^5$ is H.

Embodiment F6. The process of any one of Embodiments F1 to F4 wherein $R^5$ is F.

Embodiment F7. The process of any one of Embodiments F1 to F4 wherein $R^5$ is Cl.

Embodiment F8. The process of any one of Embodiments F1 to F4 wherein $R^5$ is $CH_3$.

Embodiment F9. The process of any one of Embodiments F1 to F8 wherein $R^6$ is H.

Embodiment F10. The process of any one of Embodiments F1 to F8 wherein $R^6$ is Cl.

Embodiment F11. The process of Embodiment F1, wherein the compound of Formula I-E is selected from the group consisting of Cpd No. 5, 6, 7 and 8 (i.e. a compound of Formula I wherein $R^1$ is $CH_3$; $R^2$ is Cl; $R^3$ is Cl; $R^4$ is not present (i.e. --); $R^5$ is H, F, Cl or $CH_3$; and $R^6$ is H or Cl, as listed in TABLE FF).

TABLE FF

| Cpd. No. | $R^2$ | $R^3$ | $R^4$ | $R^5$ | $R^6$ |
|---|---|---|---|---|---|
| 5 | Cl | Cl | — | H | H |
| 6 | Cl | Cl | — | F | H |
| 7 | Cl | Cl | — | Cl | H |
| 8 | Cl | Cl | — | $CH_3$ | H |

Embodiment F12. The process of any one of Embodiments F1 to F11, wherein the reacting is performed in a suitable solvent.

Embodiment F13. The process of Embodiment F12, wherein the suitable solvent is toluene.

G. An Alternate Process for Preparing a Compound of Formula I-E

Embodiment G1. A process as described in the Summary of the Invention for preparing a compound of Formula I-E.

Embodiment G2. The process of Embodiment G1 wherein $R^1$ is $C_1$-$C_4$ alkyl.

Embodiment G3. The process of any one of Embodiments G1 through G2 wherein $R^1$ is $CH_3$.

Embodiment G4. The process of any one of Embodiments G1 through G3 wherein $R^5$ is F.

Embodiment G5. The process of any one of Embodiment G1 through G3 wherein $R^5$ is Cl.

Embodiment G6. The process of any one of Embodiment G1 through G3 wherein $R^5$ is $CH_3$.

Embodiment G7. The process of any one of Embodiments G1 through G3 wherein $R^5$ is H.

Embodiment G8. The process of any one of Embodiments G1 through G7 wherein $R^6$ is H.

Embodiment G9. The process of any one of Embodiments G1 through G7 wherein $R^6$ is Cl.

Embodiment G13. The process of Embodiment G1, wherein the compound of Formula I-E is selected from the group consisting of Cpd No. 5, 6, 7 and 8 (i.e. a compound of Formula I wherein $R^1$ is $CH_3$; $R^2$ is Cl; $R^3$ is $OR^4$; $R^4$ is H; $R^5$ is H, F, Cl or $CH_3$; and $R^6$ is H or Cl, as listed above in TABLE FF).

Embodiment G14. The process of any one of Embodiments G1 through G13 wherein a compound of Formulae II or III are as described in the Summary of the Invention.

Embodiment G15. The process of Embodiment G14 wherein $R^5$ is F.

Embodiment G16. The process of Embodiment G14 wherein $R^5$ is Cl.

Embodiment G17. The process of Embodiment G14 wherein $R^5$ is $CH_3$.

Embodiment G18. The process of Embodiment G14 wherein $R^5$ is H.

Embodiment G19. The process of any one of Embodiments G14 through G18 wherein $R^6$ is H.

Embodiment G20. The process of any one of Embodiments G14 through G18 wherein $R^6$ is Cl.

Embodiment G21. The process of any one of Embodiments G1 through G20 wherein in a compound of Formula 7 is as defined in the Summary of the Invention.

Embodiment G22. The process of Embodiment G20 wherein $R^1$ is $C_1$-$C_4$ alkyl.

Embodiment G23. The process of Embodiment G20 wherein $R^1$ is $C_3$-$C_6$ cycloalkyl.

Embodiment G24. The process of Embodiment G22 wherein $R^1$ is $CH_3$.

Embodiment G25. The process of any one of Embodiments G1 to G24 further comprising isolating the compound of Formula I-E.

Embodiment G26. The process of any one of Embodiments G1 through G25, wherein the reacting of a compound of Formula II with magnesium is performed in a suitable solvent.

Embodiment G27. The process of Embodiment G26, wherein the reacting of a compound of Formula II with magnesium is performed in tetrahydrofuran.

Embodiment G28. The process of any of Embodiments G1 through G27, wherein the reacting of a compound of Formula II with magnesium is performed at a temperature above 80° C.

Embodiment G29. The process of any one of Embodiments G1 through G28, wherein the reacting is performed at a temperature at or below 0° C.

This invention also relates to a method for controlling undesired vegetation comprising applying to the locus of the vegetation herbicidally effective amounts of the compounds of the invention (e.g., as a composition described herein). Of note as embodiments relating to methods of use are those involving the compounds of embodiments described above. Compounds of the invention are particularly useful for selective control of weeds in crops such as wheat, barley, maize, soybean, sunflower, cotton, oilseed rape and rice, and specialty crops such as sugarcane, citrus, fruit and nut crops.

Also noteworthy as embodiments are herbicidal compositions of the present invention comprising the compounds of embodiments described above.

This invention also includes a herbicidal mixture comprising (a) a compound selected from Formula 1, N-oxides, and salts thereof, and (b) at least one additional active ingredient selected from (b1) photosystem II inhibitors, (b2) acetohydroxy acid synthase (AHAS) inhibitors, (b3) acetyl-CoA carboxylase (ACCase) inhibitors, (b4) auxin mimics, (b5) 5-enol-pyruvylshikimate-3-phosphate (EPSP) synthase inhibitors, (b6) photosystem I electron diverters, (b7) protoporphyrinogen oxidase (PPO) inhibitors, (b8) glutamine synthetase (GS) inhibitors, (b9) very long chain fatty acid (VLCFA) elongase inhibitors, (b10) auxin transport inhibitors, (b11) phytoene desaturase (PDS) inhibitors, (b12) 4-hydroxyphenyl-pyruvate dioxygenase (HPPD) inhibitors, (b13) homogentisate solenesyltransererase (HST) inhibitors, (b14) cellulose biosynthesis inhibitors, (b15) other herbicides including mitotic disruptors, organic arsenicals, asulam, bromobutide, cinmethylin, cumyluron, dazomet, difenzoquat, dymron, etobenzanid, flurenol, fosamine, fosamine-ammonium, hydantocidin, metam, methyldymron, oleic acid, oxaziclomefone, pelargonic acid and pyributicarb, and (b16) herbicide safeners; and salts of compounds of (b1) through (b16).

"Photosystem II inhibitors" (b1) are chemical compounds that bind to the D-1 protein at the $Q_B$-binding niche and thus block electron transport from $Q_A$ to $Q_B$ in the chloroplast thylakoid membranes. The electrons blocked from passing through photosystem II are transferred through a series of reactions to form toxic compounds that disrupt cell membranes and cause chloroplast swelling, membrane leakage, and ultimately cellular destruction. The $Q_B$-binding niche has three different binding sites: binding site A binds the triazines such as atrazine, triazinones such as hexazinone, and uracils such as bromacil, binding site B binds the phenylureas such as diuron, and binding site C binds benzothiadiazoles such as bentazon, nitriles such as bromoxynil and phenyl-pyridazines such as pyridate. Examples of photosystem II inhibitors include ametryn, amicarbazone, atrazine, bentazon, bromacil, bromofenoxim, bromoxynil, chlorbromuron, chloridazon, chlorotoluron, chloroxuron, cumyluron, cyanazine, daimuron, desmedipham, desmetryn, dimefuron, dimethametryn, diuron, ethidimuron, fenuron, fluometuron, hexazinone, ioxynil, isoproturon, isouron, lenacil, linuron, metamitron, methabenzthiazuron, metobromuron, metoxuron, metribuzin, monolinuron, neburon, pentanochlor, phenmedipham, prometon, prometryn, propanil, propazine, pyridafol, pyridate, siduron, simazine, simetryn, tebuthiuron, terbacil, terbumeton, terbuthylazine, terbutryn and trietazine.

"AHAS inhibitors" (b2) are chemical compounds that inhibit acetohydroxy acid synthase (AHAS), also known as acetolactate synthase (ALS), and thus kill plants by inhibiting the production of the branched-chain aliphatic amino acids such as valine, leucine and isoleucine, which are required for protein synthesis and cell growth. Examples of AHAS inhibitors include amidosulfuron, azimsulfuron, bensulfuron-methyl, bispyribac-sodium, cloransulam-methyl, chlorimuron-ethyl, chlorsulfuron, cinosulfuron, cyclosulfamuron, diclosulam, ethametsulfuron-methyl, ethoxysulfuron, flazasulfuron, florasulam, flucarbazone-sodium, flumetsulam, flupyrsulfuron-methyl, flupyrsulfuron-sodium, foramsulfuron, halosulfuron-methyl, imazamethabenz-methyl, imazamox, imazapic, imazapyr, imazaquin, imazethapyr, imazosulfuron, iodosulfuron-methyl (including sodium salt), iofensulfuron (2-iodo-N-[[(4-methoxy-6-methyl-1,3,5-triazin-2-yl)amino]carbonyl]-benzenesulfonamide), mesosulfuron-methyl, metazosulfuron (3-chloro-4-(5,6-dihydro-5-methyl-1,4,2-dioxazin-3-yl)-N-[[(4,6-dimethoxy-2-pyrimidinyl)amino]carbonyl]-1-methyl-1H-pyrazole-5-sulfonamide), metosulam, metsulfuron-methyl, nicosulfuron, oxasulfuron, penoxsulam, primisulfuron-methyl, propoxycarbazone-sodium, propyrisulfuron (2-chloro-N-[[(4,6-dimethoxy-2-pyrimidinyl)amino]carbonyl]-6-propylimidazo[1,2-b]pyridazine-3-sulfonamide), prosulfuron, pyrazosulfuron-ethyl, pyribenzoxim, pyriftalid, pyriminobac-methyl, pyrithiobac-sodium, rimsulfuron, sulfometuron-methyl, sulfosulfuron, thiencarbazone, thifensulfuron-methyl, triafamone (N-[2-[(4,6-dimethoxy-1,3,5-triazin-2-yl)carbonyl]-6-fluorophenyl]-1,1-difluoro-N-methylmethanesulfonamide), triasulfuron, tribenuron-methyl, trifloxysulfuron (including sodium salt), triflusulfuron-methyl and tritosulfuron.

"ACCase inhibitors" (b3) are chemical compounds that inhibit the acetyl-CoA carboxylase enzyme, which is responsible for catalyzing an early step in lipid and fatty acid synthesis in plants. Lipids are essential components of cell membranes, and without them, new cells cannot be produced. The inhibition of acetyl CoA carboxylase and the subsequent lack of lipid production leads to losses in cell membrane integrity, especially in regions of active growth such as meristems. Eventually shoot and rhizome growth ceases, and shoot meristems and rhizome buds begin to die back. Examples of ACCase inhibitors include alloxydim, butroxydim, clethodim, clodinafop, cycloxydim, cyhalofop, diclofop, fenoxaprop, fluazifop, haloxyfop, pinoxaden, profoxydim, propaquizafop, quizalofop, sethoxydim, tepraloxydim and tralkoxydim, including resolved forms such as fenoxaprop-P, fluazifop-P, haloxyfop-P and quizalofop-P and ester forms such as clodinafop-propargyl, cyhalofop-butyl, diclofop-methyl and fenoxaprop-P-ethyl.

Auxin is a plant hormone that regulates growth in many plant tissues. "Auxin mimics" (b4) are chemical compounds mimicking the plant growth hormone auxin, thus causing uncontrolled and disorganized growth leading to plant death in susceptible species. Examples of auxin mimics include aminocyclopyrachlor (6-amino-5-chloro-2-cyclopropyl-4-pyrimidinecarboxylic acid) and its methyl and ethyl esters and its sodium and potassium salts, aminopyralid, benazolin-ethyl, chloramben, clacyfos, clomeprop, clopyralid, dicamba, 2,4-D, 2,4-DB, dichlorprop, fluroxypyr, halauxifen (4-amino-3-chloro-6-(4-chloro-2-fluoro-3-methoxyphenyl)-2-pyridinecarboxylic acid), halauxifen-methyl (methyl 4-amino-3-chloro-6-(4-chloro-2-fluoro-3-methoxyphenyl)-2-pyridinecarboxylate), MCPA, MCPB, mecoprop, picloram, quinclorac, quinmerac, 2,3,6-TBA, triclopyr, and methyl 4-amino-3-chloro-6-(4-chloro-2-fluoro-3-methoxyphenyl)-5-fluoro-2-pyridinecarboxylate.

"EPSP synthase inhibitors" (b5) are chemical compounds that inhibit the enzyme, 5-enol-pyruvylshikimate-3-phosphate synthase, which is involved in the synthesis of aromatic amino acids such as tyrosine, tryptophan and phenylalanine. EPSP inhibitor herbicides are readily absorbed through plant foliage and translocated in the phloem to the growing points. Glyphosate is a relatively nonselective postemergence herbicide that belongs to this group. Glyphosate includes esters and salts such as ammonium, isopropylammonium, potassium, sodium (including sesquisodium) and trimesium (alternatively named sulfosate).

"Photosystem I electron diverters" (b6) are chemical compounds that accept electrons from Photosystem I, and after several cycles, generate hydroxyl radicals. These radicals are extremely reactive and readily destroy unsaturated lipids, including membrane fatty acids and chlorophyll. This destroys cell membrane integrity, so that cells and organelles "leak", leading to rapid leaf wilting and desiccation, and eventually to plant death. Examples of this second type of photosynthesis inhibitor include diquat and paraquat.

"PPO inhibitors" (b7) are chemical compounds that inhibit the enzyme protoporphyrinogen oxidase, quickly resulting in formation of highly reactive compounds in plants that rupture cell membranes, causing cell fluids to leak out. Examples of PPO inhibitors include acifluorfen-sodium, azafenidin, benzfendizone, bifenox, butafenacil, carfentrazone, carfentrazone-ethyl, chlomethoxyfen, cinidon-ethyl, fluazolate, flufenpyr-ethyl, flumiclorac-pentyl, flumioxazin, fluoroglycofen-ethyl, fluthiacet-methyl, fomesafen, halosafen, lactofen, oxadiargyl, oxadiazon, oxyfluorfen, pentoxazone, profluazol, pyraclonil, pyraflufen-ethyl, saflufenacil, sulfentrazone, thidiazimin, trifludimoxazin (dihydro-1,5-dimehyl-6-thioxo-3-[2,2,7-trifluoro-3,4-dihydro-3-oxo-4-(2-propyn-1-yl)-2H-1,4-benzoxazin-6-yl]-1,3,5-triazine-2,4(1H,3H)-dione) and tiafenacil (methyl N-[2-[[2-chloro-5-[3,6-dihydro-3-methyl-2,6-dioxo-4-(trifluoromethyl)-1(2H)-pyrimidinyl]-4-fluorophenyl]thio]-1-oxopropyl]-β-alaninate).

"GS inhibitors" (b8) are chemical compounds that inhibit the activity of the glutamine synthetase enzyme, which plants use to convert ammonia into glutamine. Consequently, ammonia accumulates and glutamine levels decrease. Plant damage probably occurs due to the combined effects of ammonia toxicity and deficiency of amino acids required for other metabolic processes. The GS inhibitors include glufosinate and its esters and salts such as glufosinate-ammonium and other phosphinothricin derivatives, glufosinate-P ((2S)-2-amino-4-(hydroxymethylphosphinyl)butanoic acid) and bilanaphos.

"VLCFA elongase inhibitors" (b9) are herbicides having a wide variety of chemical structures, which inhibit the elongase. Elongase is one of the enzymes located in or near chloroplasts which are involved in biosynthesis of VLCFAs. In plants, very-long-chain fatty acids are the main constituents of hydrophobic polymers that prevent desiccation at the leaf surface and provide stability to pollen grains. Such herbicides include acetochlor, alachlor, anilofos, butachlor, cafenstrole, dimethachlor, dimethenamid, diphenamid, fenoxasulfone (3-[[(2,5-dichloro-4-ethoxyphenyl)methyl]sulfonyl]-4,5-dihydro-5,5-dimethylisoxazole), fentrazamide, flufenacet, indanofan, mefenacet, metazachlor, metolachlor, naproanilide, napropamide, napropamide-M ((2R)—N,N-diethyl-2-(1-naphthalenyloxy)propanamide), pethoxamid, piperophos, pretilachlor, propachlor, propisochlor, pyroxasulfone, and thenylchlor, including resolved forms such as S-metolachlor and chloroacetamides and oxyacetamides.

"Auxin transport inhibitors" (b10) are chemical substances that inhibit auxin transport in plants, such as by binding with an auxin-carrier protein. Examples of auxin transport inhibitors include diflufenzopyr, naptalam (also known as N-(1-naphthyl)phthalamic acid and 2-[(1-naphthalenylamino)carbonyl]benzoic acid).

"PDS inhibitors" (b11) are chemical compounds that inhibit carotenoid biosynthesis pathway at the phytoene desaturase step. Examples of PDS inhibitors include beflubutamid, diflufenican, fluridone, flurochloridone, flurtamone norflurzon and picolinafen.

"HPPD inhibitors" (b12) are chemical substances that inhibit the biosynthesis of synthesis of 4-hydroxyphenylpyruvate dioxygenase. Examples of HPPD inhibitors include benzobicyclon, benzofenap, bicyclopyrone (4-hydroxy-3-[[2-[(2-methoxyethoxy)methyl]-6-(trifluoromethyl)-3-pyridinyl]carbonyl]bicyclo[3.2.1]oct-3-en-2-one), fenquinotrione (2-[[8-chloro-3,4-dihydro-4-(4-methoxyphenyl)-3-oxo-2-quinoxalinyl]carbonyl]-1,3-cyclohexanedione), isoxachlortole, isoxaflutole, mesotrione, pyrasulfotole, pyrazolynate, pyrazoxyfen, sulcotrione, tefuryltrione, tembotrione, tolpyralate (1-[[1-ethyl-4-[3-(2-methoxyethoxy)-2-methyl-4-(methylsulfonyl)benzoyl]-1H-pyrazol-5-yl]oxy]ethyl methyl carbonate), topramezone, 5-chloro-3-[(2-hydroxy-6-oxo-1-cyclohexen-1-yl)carbonyl]-1-(4-methoxyphenyl)-2(1H)-quinoxalinone, 4-(2,6-diethyl-4-methylphenyl)-5-hydroxy-2,6-dimethyl-3(2H)-pyridazinone, 4-(4-fluorophenyl)-6-[(2-hydroxy-6-oxo-1-cyclohexen-1-yl)carbonyl]-2-methyl-1,2,4-triazine-3,5(2H,4H)-dione, 5-[(2-hydroxy-6-oxo-1-cyclohexen-1-yl)carbonyl]-2-(3-methoxyphenyl)-3-(3-methoxypropyl)-4(3H)-pyrimidinone, 2-methyl-N-(4-methyl-1,2,5-oxadiazol-3-yl)-3-(methylsulfinyl)-4-(trifluoromethyl)benzamide and 2-methyl-3-(methylsulfonyl)-N-(1-methyl-1H-tetrazol-5-yl)-4-(trifluoromethyl)benzamide.

"HST inhibitors" (b13) disrupt a plant's ability to convert homogentisate to 2-methyl-6-solanyl-1,4-benzoquinone, thereby disrupting carotenoid biosynthesis. Examples of HST inhibitors include cyclopyrimorate (6-chloro-3-(2-cyclopropyl-6-methylphenoxy)-4-pyridazinyl 4-morpholinecarboxylate), haloxydine, pyriclor, 3-(2-chloro-3,6-difluorophenyl)-4-hydroxy-1-methyl-1,5-naphthyridin-2(1H)-one, 7-(3,5-dichloro-4-pyridinyl)-5-(2,2-difluoroethyl)-8-hydroxypyrido[2,3-b]pyrazin-6(5H)-one and 4-(2,6-diethyl-4-methyl-phenyl)-5-hydroxy-2,6-dimethyl-3(2H)-pyridazinone.

HST inhibitors also include compounds of Formulae A and B.

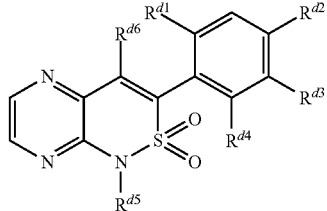

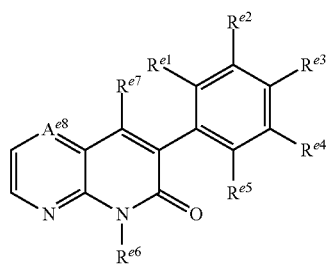

wherein $R^{d1}$ is H, Cl or $CF_3$; $R^{d2}$ is H, Cl or Br; $R^{d3}$ is H or Cl; $R^{d4}$ is H, Cl or $CF_3$; $R^{d5}$ is $CH_3$, $CH_2CH_3$ or $CH_2CHF_2$; and $R^{d6}$ is OH, or —OC(=O)-i-Pr; and $R^{e1}$ is H, F, Cl, $CH_3$ or $CH_2CH_3$; $R^{e2}$ is H or $CF_3$; $R^{e3}$ is H, $CH_3$ or $CH_2CH_3$; $R^{e4}$ is H, F or Br; $R^{e5}$ is Cl, $CH_3$, $CF_3$, $OCF_3$ or $CH_2CH_3$; $R^{e6}$ is H, $CH_3$, $CH_2CHF_2$ or C≡CH; $R^{e7}$ is OH, —OC(=O)Et, —OC(=O)-i-Pr or —OC(=O)-t-Bu; and $A^{e8}$ is N or CH.

"Cellulose biosynthesis inhibitors" (b14) inhibit the biosynthesis of cellulose in certain plants. They are most effective when applied preemergence or early postemergence on young or rapidly growing plants. Examples of cellulose biosynthesis inhibitors include chlorthiamid, dichlobenil, flupoxam, indaziflam ($N^2$-[(1R,2S)-2,3-dihydro-2,6-dimethyl-1H-inden-1-yl]-6-(1-fluoroethyl)-1,3,5-triazine-2,4-diamine), isoxaben and triazifiam.

"Other herbicides" (b15) include herbicides that act through a variety of different modes of action such as mitotic disruptors (e.g., flamprop-M-methyl and flamprop-M-isopropyl), organic arsenicals (e.g., DSMA, and MSMA), 7,8-dihydropteroate synthase inhibitors, chloroplast isoprenoid synthesis inhibitors and cell-wall biosynthesis inhibitors. Other herbicides include those herbicides having unknown modes of action or do not fall into a specific category listed in (b1) through (b14) or act through a combination of modes of action listed above. Examples of other herbicides include aclonifen, asulam, amitrole, bromobutide, cinmethylin, clomazone, cumyluron, daimuron, difenzoquat, etobenzanid, fluometuron, flurenol, fosamine, fosamine-ammonium, dazomet, dymron, ipfencarbazone (1-(2,4-dichlorophenyl)-N-(2,4-difluorophenyl)-1,5-dihydro-N-(1-methylethyl)-5-oxo-4H-1,2,4-triazole-4-carboxamide), metam, methyldymron, oleic acid, oxaziclomefone, pelargonic acid, pyributicarb and 5-[[(2,6-difluorophenyl)methoxy]methyl]-4,5-dihydro-5-methyl-3-(3-methyl-2-thienyl)isoxazole.

"Other herbicides" (b15) also include a compound of Formula (b15A)

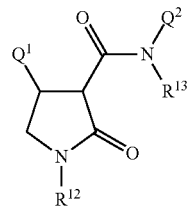

wherein
$R^{12}$ is H, $C_1$-$C_6$ alkyl, $C_1$-$C_6$ haloalkyl or $C_4$-$C_8$ cycloalkyl;
$R^{13}$ is H, $C_1$-$C_6$ alkyl or $C_1$-$C_6$ alkoxy;
$Q^1$ is an optionally substituted ring system selected from the group consisting of phenyl, thienyl, pyridinyl, benzodioxolyl, naphthyl, naphthalenyl, benzofuranyl, furanyl, benzothiophenyl and pyrazolyl, wherein when substituted said ring system is substituted by 1 to 3 $R^{14}$;
$Q^2$ is an optionally substituted ring system selected from the group consisting of phenyl, pyridinyl, benzodioxolyl, pyridinonyl, thiadiazolyl, thiazolyl, and oxazolyl, wherein when substituted said ring system is substituted by 1 to 3 $R^{15}$;
each $R^{14}$ is independently halogen, $C_1$-$C_6$ alkyl, $C_1$-$C_6$ haloalkyl, $C_1$-$C_6$ alkoxy, $C_1$-$C_6$ haloalkoxy, $C_3$-$C_8$ cyaloalkyl, cyano, $C_1$-$C_6$ alkylthio, $C_1$-$C_6$ alkylsulfinyl, $C_1$-$C_6$ alkylsulfonyl, $SF_5$, $NHR^{17}$; or phenyl optionally substituted by 1 to 3 $R^{16}$; or pyrazolyl optionally substituted by 1 to 3 $R^{16}$;
each $R^{15}$ is independently halogen, $C_1$-$C_6$ alkyl, $C_1$-$C_6$ haloalkyl, $C_1$-$C_6$ alkoxy, $C_1$-$C_6$ haloalkoxy, cyano, nitro, $C_1$-$C_6$ alkylthio, $C_1$-$C_6$ alkylsulfinyl, $C_1$-$C_6$ alkylsulfonyl;
each $R^{16}$ is independently halogen, $C_1$-$C_6$ alkyl or $C_1$-$C_6$ haloalkyl;
$R^{17}$ is $C_1$-$C_4$ alkoxycarbonyl.

In one Embodiment wherein "other herbicides" (b15) also include a compound of Formula (b15A), it is preferred that $R^{12}$ is H or $C_1$-$C_6$ alkyl; more preferably $R^{12}$ is H or methyl. Preferably $R^{13}$ is H. Preferably $Q^1$ is either a phenyl ring or a pyridinyl ring, each ring substituted by 1 to 3 $R^{14}$; more preferably $Q^1$ is a phenyl ring substituted by 1 to 2 $R^{14}$. Preferably $Q^2$ is a phenyl ring substituted by 1 to 3 $R^{15}$; more preferably $Q^2$ is a phenyl ring substituted by 1 to 2 $R^{15}$. Preferably each $R^{14}$ is independently halogen, $C_1$-$C_4$ alkyl, $C_1$-$C_3$ haloalkyl, $C_1$-$C_3$ alkoxy or $C_1$-$C_3$ haloalkoxy; more preferably each $R^{14}$ is independently chloro, fluoro, bromo, $C_1$-$C_2$ haloalkyl, $C_1$-$C_2$ haloalkoxy or $C_1$-$C_2$ alkoxy. Preferably each $R^{15}$ is independently halogen, $C_1$-$C_4$ alkyl, $C_1$-$C_3$ haloalkoxy; more preferably each $R^{15}$ is independently chloro, fluoro, bromo, $C_1$-$C_2$ haloalkyl, $C_1$-$C_2$ haloalkoxy or $C_1$-$C_2$ alkoxy. Specifically preferred as "other herbicides" (b15) include any one of the following (b15A-1) through (b15A-15).

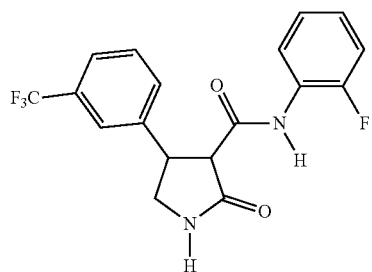
(b15A-1)
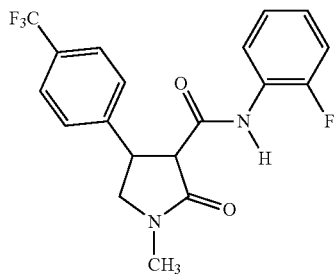
(b15A-6)
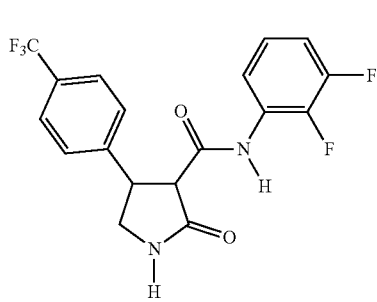
(b15A-2)
(b15A-7)
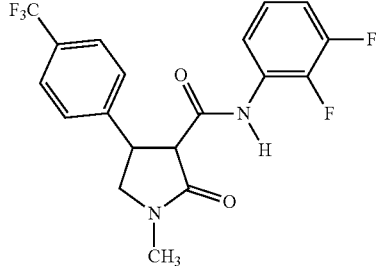
(b15A-3)
(b15A-8)
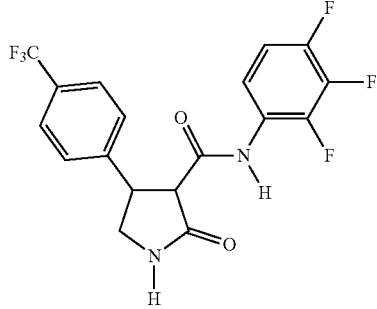
(b15A-4)
(b15A-9)
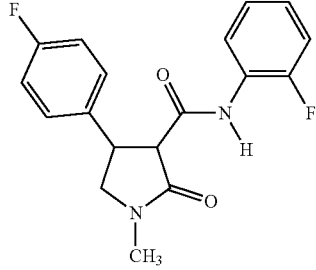
(b15A-5)
(b15A-10)

(b15A-11)
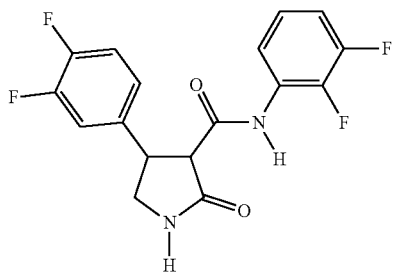

(b15A-12)
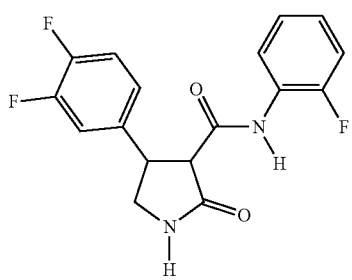

(b15A-13)
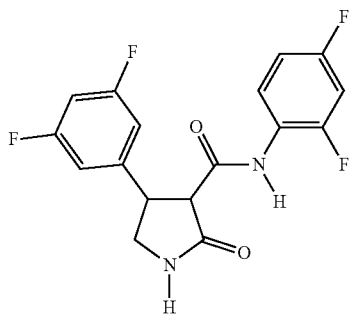

(b15A-14)
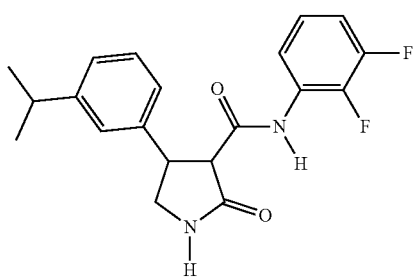

(b15A-15)
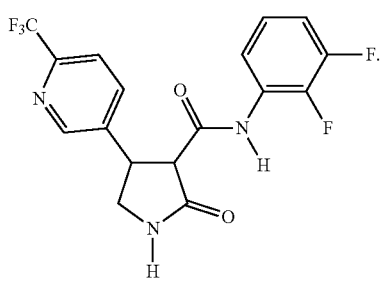

"Other herbicides" (b15) also include a compound of Formula (b15B)

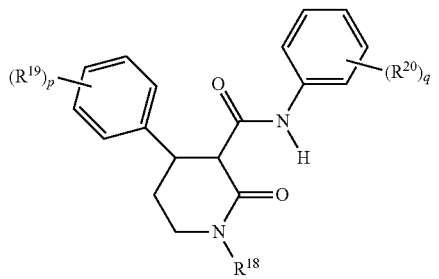
(b15B)

wherein $R^{18}$ is H, $C_1$-$C_6$ alkyl, $C_1$-$C_6$ haloalkyl or $C_4$-$C_8$ cycloalkyl;

each $R^{19}$ is independently halogen, $C_1$-$C_6$ haloalkyl or $C_1$-$C_6$ haloalkoxy;

p is an integer of 0, 1, 2 or 3;

each $R^{20}$ is independently halogen, $C_1$-$C_6$ haloalkyl or $C_1$-$C_6$ haloalkoxy; and q is an integer of 0, 1, 2 or 3.

In one Embodiment wherein "other herbicides" (b15) also include a compound of Formula (b15B), it is preferred that $R^{18}$ is H, methyl, ethyl or propyl; more preferably $R^{18}$ is H or methyl; most preferably $R^{18}$ is H. Preferrably each $R^{19}$ is independently chloro, fluoro, $C_1$-$C_3$ haloalkyl or $C_1$-$C_3$ haloalkoxy; more preferably each $R^{19}$ is independently chloro, fluoro, $C_1$ fluoroalkyl (i.e. fluoromethyl, difluoromethyl or trifluoromethyl) or $C_1$ fluoroalkoxy (i.e. trifluoromethoxy, difluoromethoxy or fluoromethoxy). Preferably each $R^{20}$ is independently chloro, fluoro, $C_1$ haloalkyl or $C_1$ haloalkoxy; more preferably each $R^{20}$ is independently chloro, fluoro, $C_1$ fluoroalkyl (i.e. fluoromethyl, difluoromethyl or trifluoromethyl) or $C_1$ fluoroalkoxy (i.e. trifluoromethoxy, difluoromethoxy or fluoromethoxy). Specifically preferred as "other herbicides" (b15) include any one of the following (b15B-1) through (b15B-19):

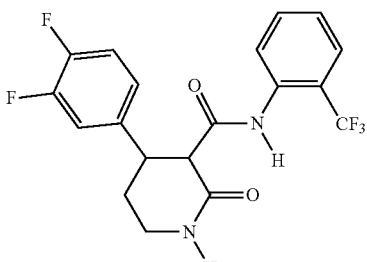
(b15B-1)

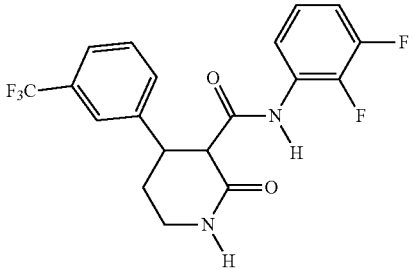
(b15B-2)

-continued
(b15B-3)
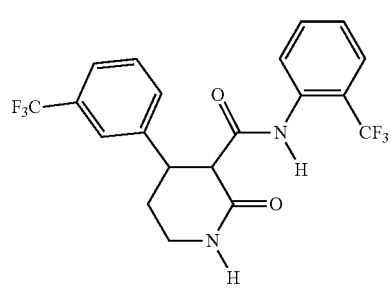
(b15B-4)
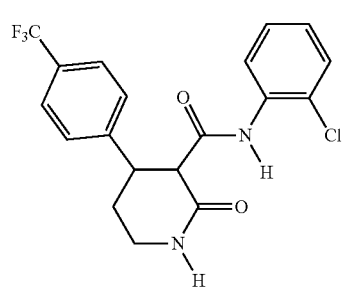
(b15B-5)
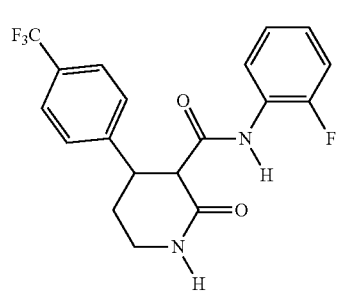
(b15B-6)
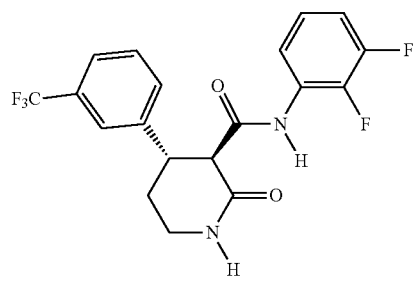
(b15B-7)
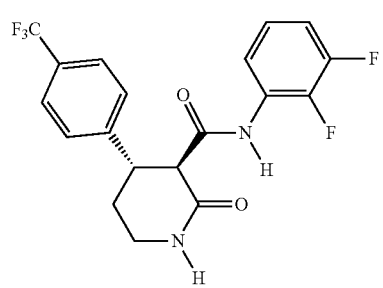
-continued
(b15B-8)
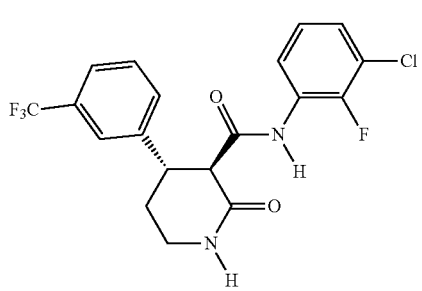
(b15B-9)
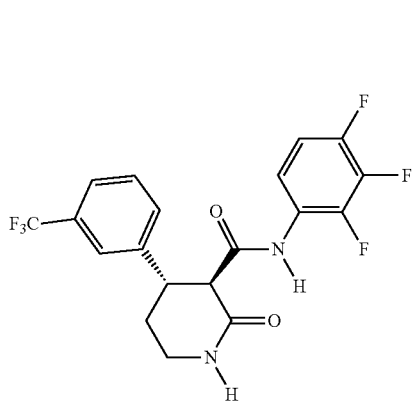
(b15B-10)
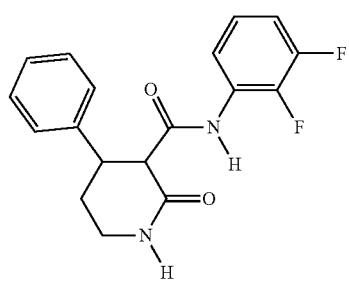
(b15B-11)
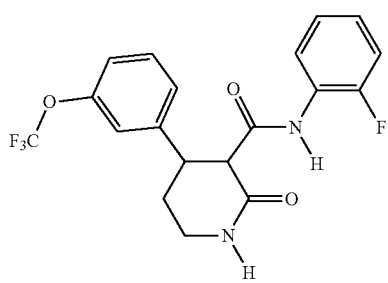
(b15B-12)
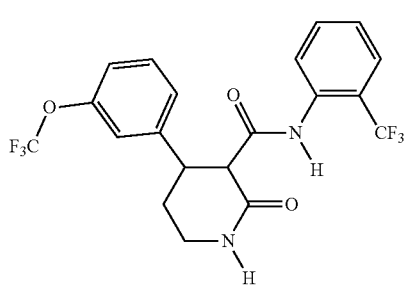

(b15B-13)
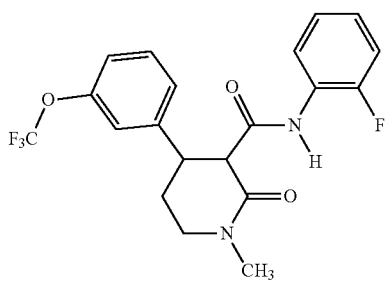

(b15B-14)
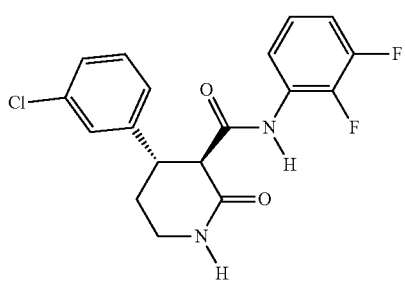

(b15B-15)
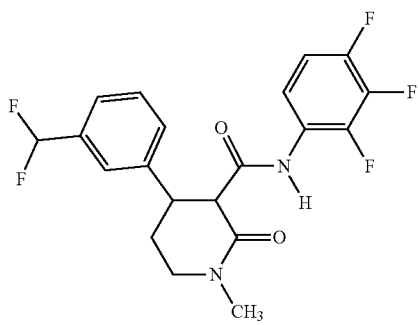

(b15B-16)
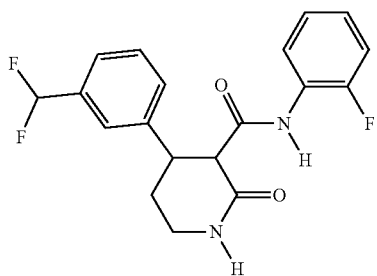

(b15B-17)
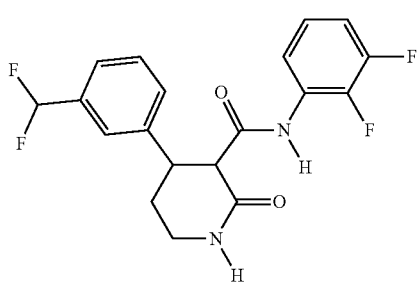

(b15B-18)
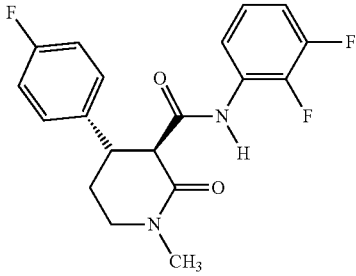

(b15B-19)
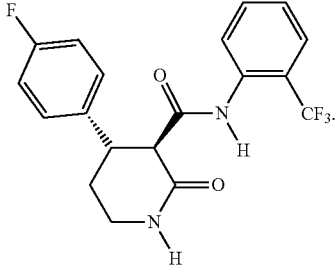

"Herbicide safeners" (b16) are substances added to a herbicide formulation to eliminate or reduce phytotoxic effects of the herbicide to certain crops. These compounds protect crops from injury by herbicides but typically do not prevent the herbicide from controlling undesired vegetation. Examples of herbicide safeners include but are not limited to benoxacor, cloquintocet-mexyl, cumyluron, cyometrinil, cyprosulfamide, daimuron, dichlormid, dicyclonon, dietholate, dimepiperate, fenchlorazole-ethyl, fenclorim, flurazole, fluxofenim, furilazole, isoxadifen-ethyl, mefenpyr-diethyl, mephenate, methoxyphenone, naphthalic anhydride, oxabetrinil, N-(aminocarbonyl)-2-methylbenzenesulfonamide and N-(aminocarbonyl)-2-fluorobenzenesulfonamide, 1-bromo-4-[(chloromethyl)sulfonyl]benzene, 2-(dichloromethyl)-2-methyl-1,3-dioxolane (MG 191), 4-(dichloroacetyl)-1-oxa-4-azospiro[4.5]decane (MON 4660), 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide.

Another Embodiment wherein "other herbicides" (b15) also include a compound of Formula (b15C), (b15C)
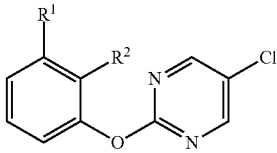

wherein $R^1$ is Cl, Br or CN; and $R^2$ is C(=O)CH$_2$CH$_2$CF$_3$, CH$_2$CH$_2$CH$_2$CH$_2$CF$_3$ or 3-CHF$_2$-isoxazol-5-yl. Specific examples include a compound of Formula (b15C) selected from (b15C1) 5-chloro-2-[3-chloro-2-[3-(difluoromethyl)-5-isoxazolyl]phenoxy]-pyrimidine and (b15C2) 1-[2-chloro-6-[(5-chloro-2-pyrimidinyl)oxy]phenyl]-4,4,4-trifluoro-1-butanone.

Preferred for better control of undesired vegetation (e.g., lower use rate such as from greater-than-additive effects, broader spectrum of weeds controlled, or enhanced crop safety) or for preventing the development of resistant weeds are mixtures of a compound of this invention with a herbicide selected from the group consisting of atrazine, azimsulfuron, beflubutamid, S-beflubutamid, benzisothiazolinone, carfentrazone-ethyl, chlorimuron-ethyl, chlorsulfuron-methyl, clomazone, clopyralid potassium, cloransulam-methyl, 2-[(2,4-dichlorophenyl)methyl]-4,4-dimethyl-isoxazolidinone, 2-[(2,5-dichlorophenyl)methyl]-4,4-dimethyl-isoxazolidinone, ethametsulfuron-methyl, flumetsulam, 4-(4-fluorophenyl)-6-[(2-hydroxy-6-oxo-1-cyclohexen-1-yl)carbonyl]-2-methyl-1,2,4-triazine-3,5-(2H,4H)-dione, flupyrsulfuron-methyl, fluthiacet-methyl, fomesafen, imazethapyr, lenacil, mesotrione, metribuzin, metsulfuron-methyl, pethoxamid, picloram, pyroxasulfone, quinclorac, rimsulfuron, S-metolachlor, sulfentrazone, thifensulfuron-methyl, triflusulfuron-methyl and tribenuron-methyl.

A compound of Formula I (wherein $R^5$ is H, F, Cl or $CH_3$) can be prepared by the acidification of the corresponding morpholine salt of Formula I-M as depicted in Scheme 1. The reaction in Scheme 1 typically involves the addition of the compound of Formula I-M, either as a solid or as a slurry or as a solution, to an aqueous acid, such as hydrochloric acid or sulfuric acid. The solvent used to slurry the compound of Formula I-M is typically a water miscible organic solvent such as methanol, ethanol, acetonitrile, tetrahydrofuran, N,N-dimethylformamide, and the like. The free-acid form of Formula I typically is insoluble in the aqueous acid solution and is isolated by filtration. Alternatively, the free-acid forms of a compound of Formula I can be isolated by partitioning the morpholine salt of a compound of Formula I between an aqueous acid and a suitable, immiscible solvent such as dichloromethane, chloroform, or ethyl acetate.

Scheme 1

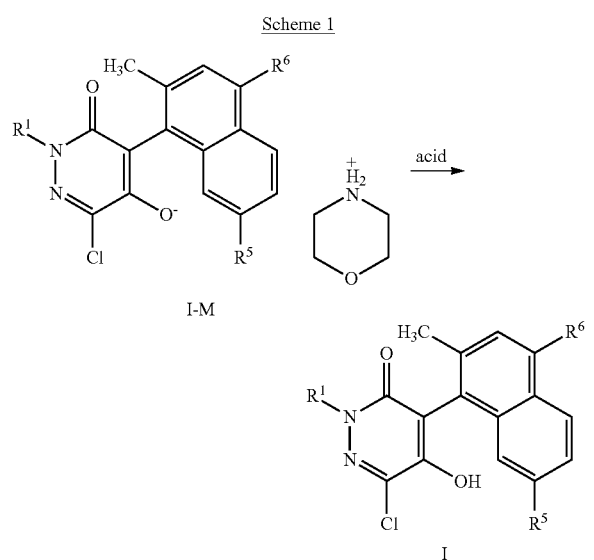

The compound of Formula I-M can be prepared in two steps starting with compounds of Formula 2 (wherein $R^5$ is H, F, Cl or $CH_3$) as shown in Schemes 2 and 3. In Scheme 2, a compound of Formula 2 reacts with sodium methoxide or potassium methoxide in a solvent such as dioxane, tetrahydrofuran, toluene, N,N-dimethylformamide, or methanol at a temperature ranging from 0° C. up to the reflux temperature of the solvent. One to two molar equivalents of sodium methoxide or potassium methoxide are typically used. The product of Scheme 2 can contain a mixture of compounds of Formulae 3 and 4 (wherein $R^5$ is H, F, Cl or $CH_3$). This mixture can be used as shown in Scheme 3 without purification.

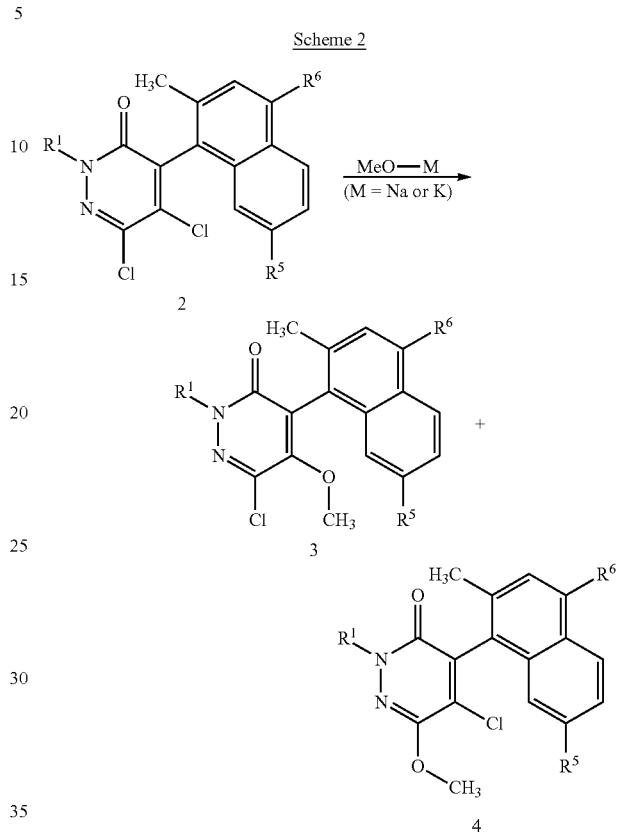

In Scheme 3, the mixture of a compound of Formulae 3 and 4 can be heated in morpholine at refluxing temperatures whereupon the compound of Formula 3 forms the compound of Formula I-M but a compound of Formula 4 does not react with morpholine. Reaction workup consists of optionally removing excess morpholine under distillation or vacuum, followed by dilution with an organic solvent such as diethyl ether or ethyl acetate. The compound Formula I-M is typically insoluble in the solvent and can be isolated by filtration, whereas unreacted Formula 4 remains in solution and can be recovered from the filtrate.

Scheme 3

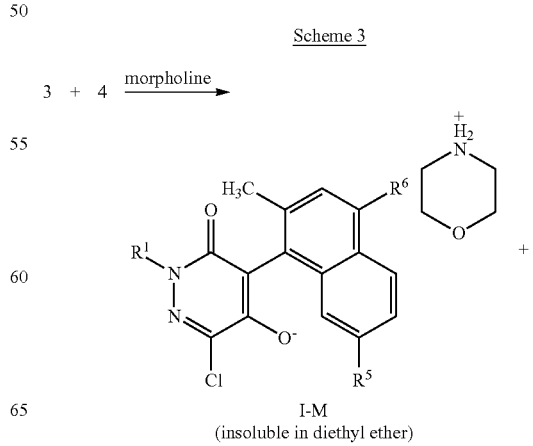

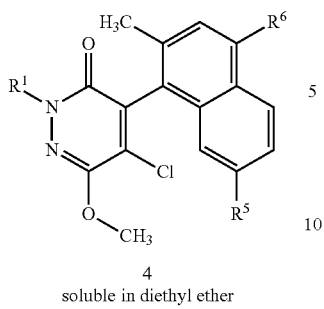

4
soluble in diethyl ether

A compound of Formula 2 can be formed by heating compounds of Formula 4 in phosphorous oxychloride containing pyridine as depicted in Scheme 4. Conditions for the reactions of Scheme 4 may be found in *Polish Journal of Chemistry*, 1990, vol. 64, p. 741. A compound of Formula 4 may be converted to a compound of Formula 3 by chlorination followed by methoxylation as shown in Schemes 4 and 2.

Scheme 4

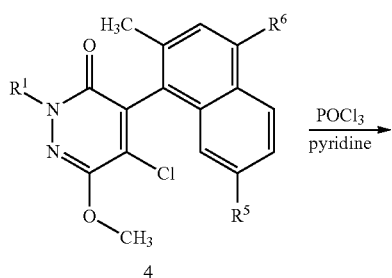

A compound of Formula 2 (wherein $R^5$ is H, F, Cl or $CH_3$) can be prepared by the reaction of a compound of Formula 5 with a Grignard reagent of Formula 6 as depicted in Scheme 5. The reactions of Scheme 5 are typically carried out in a solvent such as tetrahydrofuran or diethyl ether at temperatures ranging from −78° C. up to the reflux temperature of the solvent, with −20° C. to 25° C. being most representative. The Grignard reagent of Formula 6 where $R^5$=H is commercially available while the Grignard reagent of Formula 6 where $R^5$=$CH_3$ can be prepared from 1-bromo-2,7-dimethylnaphthalene using procedures known to those skilled in the art (see *J. Am. Chem. Soc.* 2008, vol. 130, p. 6848).

Scheme 5

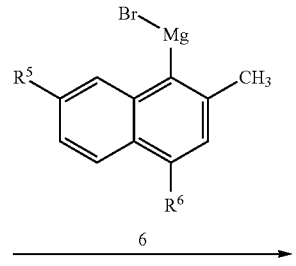

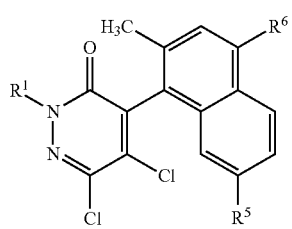

A compound of Formula 2 (wherein $R^5$ is H, F, Cl or $CH_3$) can alternatively be prepared by the reaction of a compound of Formula 7 with a Grignard reagent of Formula 6 as depicted in Scheme 6. The reactions of Scheme 6 are typically carried out in a solvent such as tetrahydrofuran or diethyl ether at temperatures ranging from −78° C. up to the reflux temperature of the solvent, with −20° C. to 25° C. being most representative.

Scheme 6

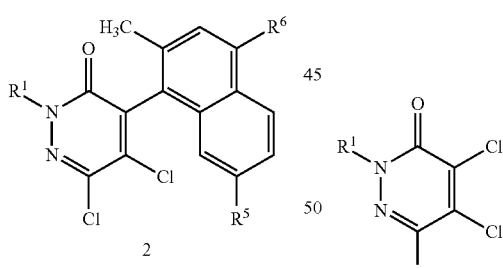

The present disclosure also relates to a method for controlling undesired vegetation comprising applying to the locus of the vegetation an herbicidally effective amount of one or more compounds of Formula I (e.g., as a composition described herein). Compounds of Formula I are particularly useful for selective control of weeds in crops including, but not limited to, wheat, barley, maize, soybean, sunflower, cotton, oilseed rape, rice and specialty crops such as sugarcane, citrus, fruit and nut crops.

Also noteworthy as embodiments are herbicidal compositions of the present disclosure comprising compounds of Formula I.

The present disclosure also includes a herbicidal mixture comprising (a) a compound selected from Formula I, N-oxides, and salts thereof, and (b) at least one additional active ingredient.

Without further elaboration, it is believed that one skilled in the art using the preceding description can utilize the present disclosure to its fullest extent. The following non-limiting Examples are illustrative of the disclosure. Steps in the following Examples illustrate a procedure for each step in an overall synthetic transformation, and the starting material for each step may not have necessarily been prepared by a particular preparative run whose procedure is described in other Examples or Steps. Percentages are by weight except for chromatographic solvent mixtures or where otherwise indicated. Parts and percentages for chromatographic solvent mixtures are by volume unless otherwise indicated. $^1$H NMR spectra are reported in ppm downfield from tetramethylsilane in $CDCl_3$ unless otherwise indicated; "s" means singlet, "d" means doublet, "t" means triplet, "q" means quartet, "m" means multiplet, "dd" means doublet of doublets, "dt" means doublet of triplets, and "br s" means broad singlet. Mass spectra (MS) are reported as the molecular weight of the highest isotopic abundance parent ion (M+1) formed by addition of H+ (molecular weight of 1) to the molecule, or (M−1) formed by the loss of H+ (molecular weight of 1) from the molecule, observed by using liquid chromatography coupled to a mass spectrometer (LCMS) using either atmospheric pressure chemical ionization (AP+) where "amu" stands for unified atomic mass units.

Synthesis Example 1

Preparation of 6-chloro-5-hydroxy-2-methyl-4-(2-methyl-1-naphthalenyl)-3(2H)-pyridazinone Step A: Preparation of 5-chloro-2-methyl-4-(2-methyl-1-naphthalenyl)-3(2H)-pyridazinone (Cpd. No. 1)

Under a nitrogen atmosphere, magnesium (5.4 g, 0.22 mol) was introduced into a clean, dry flask. A few crystals of iodine were added to activate the magnesium. A solution of 1-bromo-2-methylnaphthalene (31.0 mL, 0.20 mol) in tetrahydrofuran (200 mL) was added dropwise to the magnesium. After 25 mL of the solution was added, the addition was stopped to allow a mild, gradual exotherm to occur. Once small gas bubbles were observed, the dropwise addition was continued at a rate to maintain a controlled, vigorous reaction. Near the end of the addition the reaction was externally heated to maintain a gentle-reflux. The reaction was heated for one hour following the completion of the addition. Grignard formation was monitored by HPLC of an aliquot quenched with 1 N aqueous hydrochloric acid. The reaction was cooled to −55° C. A solution of 5-chloro-4-methoxy-2-methyl-3(2H)-pyridazinone (34.9 g, 0.20 mol) in tetrahydrofuran (400 mL) was slowly added, while maintaining a reaction temperature below −40° C. After the addition was complete, the cooling bath was removed to allow the reaction to warm to room temperature. The reaction was stirred an additional hour and monitored for completion. Once complete, the reaction was cooled to 0° C., quenched with 1 N aqueous hydrochloric acid (500 mL), and stirred for 18 h at ambient temperature. The reaction was extracted two times with dichloromethane. The extracts were combined, dried with $MgSO_4$, filtered and concentrated. The concentrate was triturated for 18 h with hexanes. The resulting mixture was cooled with an ice water bath, filtered, washed with cold hexanes and dried in-vacuo to give a beige colored solid (50.8 g, 88% yield).

$^1$H NMR δ 7.90 (s, 1H), 7.85 (m, 2H), 7.40 (m, 3H), 7.30 (m, 1H), 3.87 (s, 3H), 2.29 (s, 3H).

Step B: Preparation of 5-methoxy-2-methyl-4-(2-methyl-1-naphthalenyl)-3(2H)-pyridazinone (Cpd. No. 29)

To 5-chloro-2-methyl-4-(2-methyl-1-naphthalenyl)-3(2H)-pyridazinone (i.e. the product obtained in Step A, 50.8 g, 0.18 mol) in methanol (180 mL) was added sodium methoxide (25 wt % in methanol, 61 mL, 0.27 mol). The reaction was heated to the reflux temperature of the solvent. The reaction was monitored after 18 h by $^1$H NMR indicating the starting material was consumed. The reaction was cooled to 0° C., then water (500 mL) was added. The resultant mixture was filtered and dried in-vacuo to give a beige colored solid (40.9 g, 81% yield).

$^1$H NMR δ 7.90 (s, 1H), 7.80 (m, 2H), 7.40 (m, 4H), 3.85 (s, 3H), 3.66 (s, 3H), 2.28 (s, 3H).

Step C: Preparation of 6-chloro-5-methoxy-2-methyl-4-(2-methyl-1-naphthalenyl)-3(2H)-pyridazinone (Cpd. No. 33)

Step C-1: A solution of zinc chloride (2.9 M in 2-methyltetrahydrofuran, 28 mL, 0.10 mol) in a dry flask, under an atmosphere of nitrogen, was cooled to 5° C. 2,2,6,6-tetramethylpiperidinyl magnesium chloride lithium chloride complex (1.0 M in tetrahydrofuran/toluene, 100 mL, 0.10 mol) was slowly added at a rate that limited the exotherm temperature to 15° C. The mixture was then allowed to warm to room temperature to give a clear 0.39 M solution of bis(2,2,6,6-tetramethylpiperidine)zinc, magnesium chloride, lithium chloride complex to be used in the next step.

Step C-2: A stirred solution of 5-methoxy-2-methyl-4-(2-methyl-1-naphthalenyl)-3(2H)-pyridazinone (i.e. the product obtained in Step B above, 14 g, 50 mmol) in dichloromethane (250 mL) was cooled to −20° C. While keeping the reaction temperature below −15° C., bis(2,2,6,6-tetramethylpiperidine)zinc, magnesium chloride, lithium chloride complex (0.39 M, 128 mL, 50 mmol) was slowly added, and stirred cold for 10 min. Thin layer chromatography (i.e. TLC) of an aliquot quenched with $I_2$ indicated zincation was complete. Freshly ground trichloroisocyanuric acid (17.4 g, 74.9 mmol) was added in one portion to the stirred reaction at −20° C. Following a mild exotherm to 0° C., the reaction cooled back to −20° C. and was stirred cold for 30 min. Analysis by TLC indicated the reaction was complete. 1 N Aqueous hydrochloric acid (300 mL) was added to the cold reaction and stirred at room temperature for 20 min. The mixture was filtered through a short pad of Celite® diatomaceous earth filter aid with dichloromethane. The filtrate was extracted two times with dichloromethane. The extracts were combined, dried with $MgSO_4$, filtered, concentrated onto Celite® diatomaceous earth filter aid and purified by medium pressure liquid chromatography ("MPLC"), eluting with 20% ethyl acetate in hexanes to afford the desired product as a light beige solid (14.1 g, 89% yield).

$^1$H NMR δ 7.85 (d, 2H), 7.45 (m, 4H), 3.79 (s, 3H), 3.25 (s, 3H), 2.33 (s, 3H).

Step D: Preparation of 6-chloro-5-hydroxy-2-methyl-4-(2-methyl-1-naphthalenyl)-3(2H)-pyridazinone A mixture of 6-chloro-5-methoxy-2-methyl-4-(2-methyl-1-naphthalenyl)-3(2H)-pyridazinone (14.1 g, 44.8 mmol) in morpholine (45 mL) was heated at reflux for 1 h, followed by cooling to room temperature. The mixture was diluted with hexanes (45 mL), stirred for 18 h and filtered. The filtered solids were dried on the filter funnel under a flow of nitrogen. The solids were transferred to a flask with 1 N aqueous hydrochloric acid (200 mL). The mixture was stirred for 3 h. The solids were filtered and dried under vacuum to give a light beige solid (10.4 g, 77% yield).

$^1$H NMR (DMSO-d$_6$) δ 10.89-11.27 (b, 1H), 7.95 (m, 2H), 7.40 (m, 4H), 3.64 (s, 3H), 2.20 (s, 3H).

Synthesis Example 2

Alternate Preparation of 6-chloro-5-hydroxy-2-methyl-4-(2-methyl-1-naphthalenyl)-3(2H)-pyridazinone Step A: Preparation of 5-chloro-2-methyl-4-(2-methyl-1-naphthalenyl)-3(2H)-pyridazinone (Cpd. No. 1)

To a solution of 1-bromo-2-methylnaphthalene (100 g, 452 mmol) in tetrahydrofuran (400 mL) was added, magnesium turnings (21.7 g, 904 mmol) and iodine (20 mg). The reaction mixture was heated at 70° C. for 2 h during which time the color turned a deep green, and vigorous refluxing was observed. 5-Chloro-4-methoxy-2-methyl-3(2H)-pyridazinone (65 g, 373 mmol) in tetrahydrofuran (400 mL) was taken into another round bottom flask, the above reaction mixture was added at −100° C. and the reaction mixture was stirred at ambient temperature for 4 h. Analysis by TLC in 20% ethyl acetate in petroleum ether showed completion of the reaction. The reaction mixture was then quenched with saturated NH$_4$Cl solution and extracted with ethyl acetate twice. The combined organic layer was washed with water, brine and dried over Na$_2$SO$_4$. The solvent was evaporated to give the crude product. The crude compound was washed with petroleum ether to give provide 84 g (65.3% yield) of the title compound as an off-white solid.

Step B: Preparation of 5-methoxy-2-methyl-4-(2-methyl-1-naphthalenyl)-3(2H)-pyridazinone (Cpd. No. 29)

To a solution of 5-chloro-2-methyl-4-(2-methyl-1-naphthalenyl)-3(2H)-pyridazinone (i.e. the compound obtained in Step A, 500 g, 1.76 mol) in dioxane (5.0 L), was added 30% sodium methoxide in methanol (949 mL, 5.26 mol) at room temperature and the reaction mixture was stirred at 110° C. for 2 h. Analysis by TLC in 50% ethyl acetate/petroleum ether showed completion of the reaction. The reaction mixture was poured into ice water, quenched with saturated NH$_4$Cl solution and extracted with dichloromethane twice. The combined organic layer was washed with water, brine and dried over Na$_2$SO$_4$. The solvent was evaporated to provide a crude product which was washed with petroleum ether to provide 449 g (91.2% yield) of the title compound as a solid.

Step C: Preparation of 6-chloro-5-methoxy-2-methyl-4-(2-methyl-1-naphthalenyl)-3(2H)-pyridazinone (Cpd. No. 33)

In a round bottom flask, ZnCl$_2$ (194 g, 1.42 mol) was taken and 1 M 2,2,6,6-tetramethylpiperidinyl magnesium chloride lithium chloride complex in tetrahydrofuran (2378 mL, 2.37 mol) was added and the reaction mixture was stirred at ambient temperature for 2 h. 5-Methoxy-2-methyl-4-(2-methyl-1-naphthalenyl)-3(2H)-pyridazinone (i.e. the product obtained in Step B, 333 g, 1.18 mol) and 1,3-dichloro-5,5-dimethylhydantoin (281 g, 1.42 mol) were added portionwise and the reaction mixture was stirred at room temperature for 16 h. Analysis by TLC in 30% ethyl acetate/petroleum ether showed completion of the reaction. The reaction mixture was poured into ice water, quenched with saturated sodium bisulfite solution and extracted with dichloromethane twice. The combined organic layers were washed with water, brine and dried over Na$_2$SO$_4$. The solvent was evaporated to give crude product. The crude product was washed with diethyl ether/petroleum ether to provide 205 g (55% yield) of the title compound as a white solid.

Step D: Preparation of 6-chloro-5-hydroxy-2-methyl-4-(2-methyl-1-naphthalenyl)-3(2H)-pyridazinone 6-Chloro-5-methoxy-2-methyl-4-(2-methyl-1-naphthalenyl)-3(2H)-pyridazinone (i.e. the product obtained in Step C, 410 g, 1.30 mol) in morpholine (1.2 L) was stirred at 120° C. for 2 h. Analysis by TLC in 50% ethyl acetate/petroleum ether showed completion of the reaction. The reaction mixture was then evaporated, acidified with concentrated hydrochloric acid and stirred for 1 h at ambient temperature. The reaction mixture was filtered, washed with an excess of water and dried under vacuum to give 290 g (74.3% yield) of the title compound as an off-white solid.

Synthesis Example 3

Preparation of 6-chloro-4-(2,7-dimethyl-1-naphthalenyl)-5-hydroxy-2-methyl-3(2H)-pyridazinone (Cpd. No. 20)

Step A. Preparation of 5-chloro-4-(2,7-dimethyl-1-naphthalenyl)-2-methyl-3(2H)-pyridazinone (Cpd. No. 4)

Magnesium turnings (4.22 g, 173 mmol, partially crushed with a mortar and pestle prior to weighing) were charged into a 1 L 3-neck round bottomed flask equipped with an addition funnel, large magnetic stir-bar, and a reflux condenser. The apparatus was heated with a heat-gun while slowly stirring the magnesium under a flow of N$_2$. After cooling, a small amount of iodine crystals (80 mg) was added, the mixture was briefly heated again (observed red-brown vapors) and then a 5 mL portion of a solution of 1-bromo-2,7-dimethylnaphthalene (35.2 g, 0.15 moles) and tetrahydrofuran (80 mL) was added. The reaction mixture began quickly changing color from red-brown to light blue with bubbling. The solution of 1-bromo-2,7-dimethylnaphthalene and tetrahydrofuran was added slowly at such a rate that maintained a gentle reflux (total time ca. 30 min). The resulting mixture was diluted with 64 mL tetrahydrofuran, refluxed for 1 h, and then cooled to −40° C. A solution of 5-chloro-4-methoxy-2-methyl-3(2H)-pyridazinone (21.7 g, 124 mmol) and tetrahydrofuran (80 mL) was then added and the resulting solution was stirred at ambient temperature for 14 h. The resulting mixture was cooled in ice/water and quenched with saturated aqueous $NH_4Cl$ (100 mL) added at <15° C. The resulting mixture was partitioned between ethyl acetate (1.2 L) and saturated aqueous $NH_4Cl$ (1 L), the aqueous layer was extracted with ethyl acetate (500 mL) and the combined organic layers were washed with saturated $NH_4Cl$, brine, dried with $MgSO_4$ and concentrated to give 38.1 g (85%) of crude 5-chloro-4-(2,7-dimethyl-1-naphthalenyl)-2-methyl-3(2H)-pyridazinone that was used in the next step without further purification. The crude product contained minor side products, including 2,7-dimethylnaphthalene. An analytical sample was prepared by MPLC on a silica gel column eluting with 0-50% ethyl acetate in hexanes.

$^1$H NMR (500 MHz) δ 7.95 (s, 1H), 7.79 (d, 1H), 7.74 (d, 1H), 7.35 (d, 1H), ca. 7.26 (dd, 1H), 7.03 (br s, 1H), 3.88 (s, 3H), 2.42 (s, 3H), 2.26 (s, 3H).

Step B. Preparation of 4-(2,7-dimethyl-1-naphthalenyl)-5-methoxy-2-methyl-3(2H)-pyridazinone (Cpd. No. 32)

A solution of crude 5-chloro-4-(2,7-dimethyl-1-naphthalenyl)-2-methyl-3(2H)-pyridazinone (i.e. the product obtained in Step A, 38.1 g, 12 8 mmol) from Step A and dioxane (890 mL) was treated with NaOMe (25% solution in MeOH, 87 mL, 383 mmol). The resulting dark brown mixture was heated at reflux for 16 h, cooled and concentrated to remove the bulk of the dioxane. The resulting residue was partitioned between $CH_2Cl_2$ and excess saturated aqueous $NH_4Cl$, the aqueous layer (pH-10) was extracted with $CH_2Cl_2$ and the combined organics were washed with saturated $NH_4Cl$, brine, dried with $MgSO_4$ and concentrated to give 57 g of a brown oily slurry. Trituration of the slurry with diethyl ether gave a beige solid that was isolated by filtration, washed with some diethyl ether and dried on the frit to give 4-(2,7-dimethyl-1-naphthalenyl)-2-methyl-3(2H)-pyridazinone as a beige solid (10.6 g, 28%). $^1$H NMR analysis showed desired product of high purity. The filtrate from above was concentrated to give a dark brown oily residue that was triturated with ether and hexanes to give additional compound (2.2 g, 6%).

$^1$H NMR (500 MHz) δ 7.92 (s, 1H), 7.73 (d, 1H), 7.71 (d, 1H), 7.32 (d, 1H), 7.22 (dd, 1H), 7.11 (br s, 1H), 3.87 (s, 3H), 3.70 (s, 3H), 2.41 (s, 3H), 2.26 (s, 3H).

Step C. Preparation of 6-chloro-4-(2,7-dimethyl-1-naphthalenyl)-5-methoxy-2-methyl-3(2H)-pyridazinone (Cpd. No. 36)

A solution of 4-(2,7-dimethyl-1-naphthalenyl)-5-methoxy-2-methyl-3(2H)-pyridazinone (i.e. the product obtained in Step B, 27.2 g, 92 mmol) and $CH_2Cl_2$ (646 mL) was cooled in an ice/acetone bath to −10° C. A solution of bis(2,2,6,6-tetramethylpiperidine)zinc, magnesium chloride, lithium chloride complex in tetrahydrofuran/2-methyl tetrahydrofuran (231 mL of a ca. 0.40 M solution, ca. 92 mmol) was added at <0° C. The resulting mixture was warmed to 18° C. with a water bath, stirred 15 min, and then cooled to −15° C. 1,3-Dichloro-5,5-dimethylhydantoin (21.8 g, 111 mmol) was added in portions to maintain a temp.<−10° C. The resulting mixture was warmed to ambient temperature and stirred for 7 h. The resulting mixture was cooled to −10° C. and was quenched with a solution of sodium metabisulfite (50 g) and water (250 mL) added at <0° C. The resulting mixture was rapidly stirred as it warmed to ambient temp over 1 h. The resulting mixture was diluted with $CH_2Cl_2$ (600 mL) and water (300 mL), the aqueous layer was extracted with $CH_2Cl_2$ (300 mL) and the combined organics washed with saturated aqueous ammonium chloride (2×500 mL), brine (300 mL), dried with $MgSO_4$ and concentrated to give 50 g of a brown oil. The crude product was purified by preparative MPLC on a 750 g column, eluting with 20-100% ethyl acetate in hexanes. The desired product 6-chloro-4-(2,7-dimethyl-1-naphthalenyl)-2-methyl-3(2H)-pyridazinone eluted first (11.2 g, 37% plus 3.3 g of slightly impure desired product in the first fraction). Further elution gave recovered unreacted 4-(2,7-dimethyl-1-naphthalenyl)-2-methyl-3 (2H)-pyridazinone (10.2 g, 38% recovery).

$^1$H NMR (500 MHz) δ 7.78 (d, 1H), 7.73 (d, 1H), 7.32 (d, 1H), ca. 7.25 (dd, 1H), 7.15 (br s, 1H), 3.80 (s, 3H), 3.26 (s, 3H), 2.45 (s, 3H), 2.30 (s, 3H).

Step D. Preparation of 6-chloro-4-(2,7-dimethyl-1-naphthalenyl)-5-hydroxy-2-methyl-3(2H)-pyridazinone (Cpd. No. 20)

A suspension of 6-chloro-4-(2,7-dimethyl-1-naphthalenyl)-5-methoxy-2-methyl-3(2H)-pyridazinone (i.e. the product obtained in Step C, 6.9 g, 21 mmol) and morpholine (21 mL) was heated at gentle reflux for 1 h, cooled to room temperature, and poured into a mixture of concentrated hydrochloric acid (30 mL) and ice (ca. 200 mL). The mixture was extracted with $CH_2Cl_2$ (2×200 mL) and the combined organic layers were washed with saturated $NH_4Cl$ (2×100 mL), dried with $MgSO_4$ and concentrated to give 6.0 g (91% yield) of the title compound as a light yellow solid. mp=232-234° C.

$^1$H NMR (500 MHz) δ 7.83 (d, 1H), 7.75 (d, 1H), 7.38 (d, 1H), 7.29 (dd, 1H), 7.13 (br s, 1H), 5.55 (v br s, 1H), 3.83 (s, 3H), 2.44 (s, 3H), 2.28 (s, 3H).

Synthesis Example 4

Alternate Preparation of 6-chloro-4-(2,7-dimethyl-1-naphthalenyl)-5-hydroxy-2-methyl-3(2H)-pyridazinone (Cpd. No. 20)

Step A: Preparation of 2,7-dimethylnaphthalene

To a solution of 2,7-dibromonaphthalene (250 g, 0.877 mol) in dioxane (4 L) was added $Pd(dppf)Cl_2$ and 2 M dimethyl zinc in toluene (2.19 L, 4.38 mol) at room temperature. The reaction mixture was stirred at 100° C. for 16 h. TLC analysis in hexane showed completion of the reaction. The reaction mixture was diluted with ethyl acetate and poured into ice water. The combined organic layer was washed with water, brine and dried over sodium sulfate. The solvent was evaporated to give the crude product which was charged on silica gel column. Elution of the column with petroleum ether gave 111 g (81% yield) of the title product as a white solid.

Step B: Preparation of 1-bromo-2,7-dimethylnaphthalene

To a solution of 2,7-dimethylnaphthalene (i.e. the product obtained in Step A, 282 g, 1.8 mol) in $CH_3CN$ (2.8 L) and N,N-dimethylformamide (200 mL) was added N-bromosuccinimide (321 g, 1.8 mol) and the reaction mixture was stirred at room temperature for 16 h. Analasys by TLC in hexane showed completion of the reaction. The reaction mixture was poured into ice water and extracted with petroleum ether thrice. The combined organic layer was washed with water, brine and dried over $Na_2SO_4$. The solvent was evaporated to give the crude product which was purified by silica gel chromatography eluting with petroleum ether to provide 415 g (97% yield) of the title product as pale yellow solid.

Step C: Preparation of 5-chloro-4-(2,7-dimethyl-1-naphthalenyl)-2-methyl-3(2H)-pyridazinone (Cpd. No. 4)

To a solution of 1-bromo-2,7-dimethylnaphthalene (i.e. the product obtained in Step B, 100 g, 0.42 mol) in tetrahydrofuran (500 mL) was added magnesium turnings (20.42 g, 0.851 mol) and iodine (20 mg). The reaction mixture was heated at 70° C. for 2 h during which time the color of the reaction mixture turned to deep green (vigorous reflux was observed). The Grignard reagent prepared above was added to a solution of 5-chloro-4-methoxy-2-methyl-3(2H)-pyridazinone (61.1 g, 0.351 mol) in tetrahydrofuran (500 mL) and the reaction mixture was stirred at room temperature for 4 h. Analysis by TLC in 20% ethyl acetate/petroleum ether showed completion of the reaction. The reaction mixture was quenched with saturated $NH_4Cl$ solution and extracted with ethyl acetate twice. The combined organic layer was washed with water, brine and dried over $Na_2SO_4$. The solvent was evaporated to give the crude product. The crude product was washed with petroleum ether to provide 82 g (64% yield) of the title compound as a white solid.

Step D: Preparation of 4-(2,7-dimethyl-1-naphthalenyl)-5-methoxy-2-methyl-3(2H)-pyridazinone (Cpd. No. 32)

To a solution of 5-chloro-4-(2,7-dimethyl-1-naphthalenyl)-2-methyl-3(2H)-pyridazinone (i.e. the product obtained in Step C, 365 g, 1.2 mol) in dioxane (3.6 L), was added 30% NaOMe in methanol (661 mL, 3.6 mol) at room temperature and the reaction mixture was stirred at 110° C. for 2 h. Analysis by TLC in 50% ethyl acetate/petroleum ether showed completion of the reaction. The reaction mixture was poured into ice water, quenched with saturated $NH_4Cl$ solution and extracted with dichloromethane twice. The combined organic layer was washed with water, brine and dried over $Na_2SO_4$. The solvent was evaporated to give the crude product. The crude product was washed with petroleum ether to give 355 g (98% yield) of the pure title product as an off-white solid.

Step E: Preparation of 6-chloro-4-(2,7-dimethyl-1-naphthalenyl)-5-methoxy-2-methyl-3(2H)-pyridazinone (Cpd. No. 36)

In a round bottom flask, $ZnCl_2$ (65 g, 0.47 mol and 1 M 2,2,6,6-tetramethylpiperidinyl $MgCl_2LiCl$ in tetrahydrofuran (952 mL, 0.952 mol) was added and the reaction mixture was stirred at room temperature for 2 h. 4-(2,7-Dimethyl-1-naphthalenyl)-5-methoxy-2-methyl-3(2H)-pyridazinone (i.e. the product obtained in Step D, 140 g, 0.476 mol) and 1,3-dichloro-5,5-dimethylhydantoin (112 g, 0.571 mol) were added portionwise and the reaction mixture was stirred at room temperature for 16 h. TLC analysis in 30% ethyl acetate/petroleum ether showed completion of the reaction. The reaction mixture was poured into ice water, quenched with saturated sodium bisulfite solution and extracted with dichloromethane twice. The combined organic layer was washed with water, brine and dried over $Na_2SO_4$. The solvent was evaporated to give the crude product. The crude compound was washed with diethyl ether/petroleum ether to provide 82 g (52% yield) as an off-white solid.

Step F: 6-chloro-4-(2,7-dimethyl-1-naphthalenyl)-5-hydroxy-2-methyl-3(2H)-pyridazinone (Cpd. No. 20)

6-chloro-4-(2,7-dimethyl-1-naphthalenyl)-5-methoxy-2-methyl-3(2H)-pyridazinone (i.e. the product obtained in Step E, 208 g, 0.634 mol) in morpholine (650 mL) was stirred at 120° C. for 2 h. TLC analysis in 50% ethyl acetate/petroleum ether showed completion of the reaction. The reaction mixture was evaporated, acidified with concentrated hydrochloric acid and stirred for 1 h at room temperature during which time the solid precipitated. The solid was filtered, washed with excess of water and dried under vacuum to give 195 g (98% yield) of the title compound as an off white solid.

Synthesis Example 5

Preparation of 5-chloro-6-methoxy-2-methyl-4-(2-methyl-1-naphthalenyl)-3(2H)-pyridazinone Step A: Preparation of 6-amino-5-chloro-4-methoxy-2-methyl-3(2H)-pyridazinone A solution of sodium methoxide in methanol (4.8 mL of a 4.4 M solution, 21.0 mmol) was added to a suspension of 6-amino-4,5-dichloro-2-methyl-3(2H)-pyridazinone (3.70 g, 19.1 mmol) and dioxane (95 mL, anhydrous) with ice-water bath cooling. The resulting suspension was stirred at ambient temperature for 3 h, poured into saturated aqueous ammonium chloride solution (150 mL) and the resulting mixture was extracted with methylene chloride (150 mL). The aqueous layer was extracted two more times with methylene chloride. The combined organic extracts were dried over anhydrous $MgSO_4$, filtered and concentrated to give 3.45 g of the title compound as a yellow semi-solid.
$^1$H NMR (500 MHz) δ 4.34 (br s, 2H), 4.29 (s, 3H), 3.60 (s, 3H).

Step B: Preparation of 5,6-dichloro-4-methoxy-2-methyl-3(2H)-pyridazinone

To a solution of 6-amino-5-chloro-4-methoxy-2-methyl-3(2H)-pyridazinone (i.e. the product obtained in Step A, 529 mg, 2.8 mmol), copper(II) chloride (618 mg, 4.6 mmol) and acetonitrile (8 mL, anhydrous) was added tert-butyl nitrite (0.48 mL, 90% by weight, 3.6 mmol) with ice-water bath cooling. The resulting mixture was stirred at ambient temperature for 1 h and then partitioned between an ethyl acetate and saturated aqueous ammonium chloride solution. The organic layer was washed with a saturated aqueous ammonium chloride solution, dried over anhydrous $MgSO_4$, filtered and concentrated to give 0.51 g of the title compound as a yellow semi-solid.
$^1$H NMR (500 MHz) δ 4.33 (s, 3H), 3.74 (s, 3H).

Step C: Preparation of 5,6-dichloro-2-methyl-4-(2-methyl-1-naphthalenyl)-3(2H)-pyridazinone (Cpd. No. 5)

5,6-Dichloro-4-methoxy-2-methyl-3(2H)-pyridazinone (i.e. the product obtained in Step B, 0.41 g, 1.9 mmol) was added to 2-methyl-1-naphthalenyl-magnesium bromide (9.0 mL of a 0.25 M solution in tetrahydrofuran, 2.3 mmol) at −20° C. The resulting mixture was stirred at ambient temperature for 30 min, at which time the reaction was cooled to 5° C. and quenched with saturated aqueous ammonium chloride solution (3 mL). The resulting mixture was partitioned between ethyl acetate and a saturated aqueous ammonium chloride solution, the resulting organic layer was washed with a saturated aqueous ammonium chloride solution, dried over anhydrous $MgSO_4$, filtered and concentrated to give 0.69 g of the title compound in crude form which was used in the subsequent step without further purification. An analytical sample was prepared by purification by MPLC on a silica column, eluting with a gradient of 0% to 100% ethyl acetate in hexanes.

$^1$H NMR (500 MHz) δ 7.87-7.85 (m, 2H), 7.47-7.40 (m, 3H), 7.30-7.27 (m, 1H), 3.86 (s, 3H), 2.29 (s, 3H).

Step D. Preparation of 6-Chloro-5-methoxy-2-methyl-4-(2-methyl-1-naphthalenyl)-3(2H)-pyridazinone (Cpd. No. 33)

Solid potassium methoxide (0.29 g, 3.4 mmol) was added to a solution of 5,6-dichloro-2-methyl-4-(2-methyl-1-naphthalenyl)-3(2H)-pyridazinone (i.e. the product obtained in Step C, 0.69 g of the crude product, ~1.7 mmol) and toluene (17 mL) at ambient temperature. The resulting mixture was stirred at ambient temperature for 3 d, cooled in an ice-water bath and quenched with saturated aqueous ammonium chloride solution (10 mL). The resulting mixture was partitioned between ethyl acetate and a saturated aqueous ammonium chloride solution. The organic layer was dried over anhydrous $MgSO_4$, filtered and concentrated to give 0.60 g of the title compound in crude form, which was used in the subsequent step without further purification. $^1$H NMR analysis of the crude product indicated a mixture of the desired product, 6-chloro-5-methoxy-2-methyl-4-(2-methyl-1-naphthalenyl)-3(2H)-pyridazinone, the isomer, 5-chloro-6-methoxy-2-methyl-4-(2-methyl-1-naphthalenyl)-3(2H)-pyridazinone, and unreacted 5,6-dichloro-2-methyl-4-(2-methyl-1-naphthalenyl)-3(2H)-pyridazinone in a ratio of 3.0:1.0:2.8, respectively. Analytical samples were obtained by MPLC on silica, eluting with a gradient of 0% to 100% ethyl acetate in hexanes.

6-Chloro-5-methoxy-2-methyl-4-(2-methyl-1-naphthalenyl)-3(2H)-pyridazinone:

$^1$H NMR (500 MHz) δ 7.84 (distorted d, 2H), 7.47-7.38 (m, 4H), 3.80 (s, 3H), 3.26 (s, 3H), 2.33 (s, 3H).

5-Chloro-6-methoxy-2-methyl-4-(2-methyl-1-naphthalenyl)-3(2H)-pyridazinone:

$^1$H NMR (500 MHz) δ 7.86-7.83 (m, 2H), 7.45-7.37 (m, 3H), 7.33-7.30 (m, 1H), 4.01 (s, 3H), 3.77 (s, 3H), 2.29 (s, 3H).

Synthesis Example 6

Step A. Preparation of 6-chloro-5-hydroxy-2-methyl-4-(2-methyl-1-naphthalenyl)-3(2H)-pyridazinone A solution of morpholine (2 mL) and the crude product from Synthesis Example 5, Step D (0.60 g), containing a mixture of 6-chloro-5-methoxy-2-methyl-4-(2-methyl-1-naphthalenyl)-3(2H)-pyridazinone, 5-chloro-6-methoxy-2-methyl-4-(2-methyl-1-naphthalenyl)-3(2H)-pyridazinone and 5,6-dichloro-2-methyl-4-(2-methyl-1-naphthalenyl)-3(2H)-pyridazinone, was heated at 110° C. for 2 h. The resulting mixture was concentrated and the residue was triturated with diethyl ether. The resulting solid was filtered, washed with diethyl ether, and dried on the frit to give the morpholine salt of 6-chloro-5-hydroxy-2-methyl-4-(2-methyl-1-naphthalenyl)-3(2H)-pyridazinone. The filtrate contained unreacted 5-chloro-6-methoxy-2-methyl-4-(2-methyl-1-naphthalenyl)-3(2H)-pyridazinone and 5,6-dichloro-2-methyl-4-(2-methyl-1-naphthalenyl)-3(2H)-pyridazinone. The solid 6-chloro-5-hydroxy-2-methyl-4-(2-methyl-1-naphthalenyl)-3(2H)-pyridazinone morpholine salt was partially dissolved in a minimal amount of tetrahydrofuran and the resulting mixture was added gradually to 1 N aqueous hydrochloric acid (10 mL) with stirring. The resultant solid was isolated by filtration, washed with 1 N aqueous hydrochloric acid and dried on the frit to give 200 mg of the title product as an off-white solid.

$^1$H NMR (500 MHz) δ 7.92-7.86 (m, 2H), 7.48-7.40 (m, 6H), 3.83 (s, 3H), 2.33 (s, 3H).

A compound of Formula I will generally be used as an herbicidal active ingredient in a composition, i.e. formulation, with at least one additional component selected from the group consisting of surfactants, solid diluents and liquid diluents. In certain embodiments, the additional component can serve as a carrier. The formulation or composition ingredients are selected to be consistent with the physical properties of the active ingredient, mode of application and environmental factors such as soil type, moisture and temperature.

Useful formulations include both liquid and solid compositions comprising the compound of Formula I. Liquid compositions include solutions (including emulsifiable concentrates), suspensions, emulsions (including microemulsions, oil-in-water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil-in-water emulsion, flowable concentrate and suspo-emulsion. The general types of nonaqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation. High-strength compositions are primarily used as intermediates for further formulation.

Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting.

The formulations will typically contain effective amounts of active ingredient, diluent and surfactant within the following approximate ranges which add up to 100 percent by weight.

|  | Active Ingredient | Weight Percent Diluent | Surfactant |
|---|---|---|---|
| Water-Dispersible and Water-soluble Granules, Tablets and Powders | 0.001-90 | 0-99.999 | 0-15 |
| Oil Dispersions, Suspensions, Emulsions, Solutions (including Emulsifiable Concentrates) | 1-50 | 40-99 | 0-50 |
| Dusts | 1-25 | 70-99 | 0-5 |
| Granules and Pellets | 0.001-99 | 5-99.999 | 0-15 |
| High Strength Compositions | 90-99 | 0-10 | 0-2 |

Solid diluents include, for example, clays such as bentonite, montmorillonite, attapulgite and kaolin, gypsum, cellulose, titanium dioxide, zinc oxide, starch, dextrin, sugars (e.g., lactose, sucrose), silica, talc, mica, diatomaceous earth, urea, calcium carbonate, sodium carbonate and bicarbonate, and sodium sulfate. Typical solid diluents are described in Watkins et al., *Handbook of Insecticide Dust Diluents and Carriers,* 2nd Ed., Dorland Books, Caldwell, New Jersey.

Liquid diluents include, for example, water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and γ-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically $C_6$-$C_{22}$), such as plant seed and fruit oils (e.g., oils of olive, castor, linseed, sesame, corn (maize), peanut, sunflower, grapeseed, safflower, cottonseed, soybean, rapeseed, coconut and palm kernel), animal-sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, *Solvents Guide,* 2nd Ed., Interscience, New York, 1950.

The solid and liquid compositions of the present disclosure often include one or more surfactants. When added to a liquid, surfactants (also known as "surface-active agents") generally modify, most often reduce, the surface tension of the liquid. Depending on the nature of the hydrophilic and lipophilic groups in a surfactant molecule, surfactants can be useful as wetting agents, dispersants, emulsifiers or defoaming agents.

Surfactants can be classified as nonionic, anionic or cationic. Nonionic surfactants useful for the present compositions include, but are not limited to: alcohol alkoxylates such as alcohol alkoxylates based on natural and synthetic alcohols (which may be branched or linear) and prepared from the alcohols and ethylene oxide, propylene oxide, butylene oxide or mixtures thereof; amine ethoxylates, alkanolamides and ethoxylated alkanolamides; alkoxylated triglycerides such as ethoxylated soybean, castor and rapeseed oils; alkylphenol alkoxylates such as octylphenol ethoxylates, nonylphenol ethoxylates, dinonyl phenol ethoxylates and dodecyl phenol ethoxylates (prepared from the phenols and ethylene oxide, propylene oxide, butylene oxide or mixtures thereof); block polymers prepared from ethylene oxide or propylene oxide and reverse block polymers where the terminal blocks are prepared from propylene oxide; ethoxylated fatty acids; ethoxylated fatty esters and oils; ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers, alkyd peg (polyethylene glycol) resins, graft or comb polymers and star polymers; polyethylene glycols (pegs); polyethylene glycol fatty acid esters; silicone-based surfactants; and sugar-derivatives such as sucrose esters, alkyl polyglycosides and alkyl polysaccharides.

Useful anionic surfactants include, but are not limited to: alkylaryl sulfonic acids and their salts; carboxylated alcohol or alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; and sulfosuccinates and their derivatives such as dialkyl sulfosuccinate salts.

Useful cationic surfactants include, but are not limited to: amides and ethoxylated amides; amines such as N-alkyl propanediamines, tripropylenetriamines and dipropylenetetramines, and ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; and amine oxides such as alkyldimethylamine oxides and bis-(2-hydroxyethyl)-alkylamine oxides.

Also useful for the present compositions are mixtures of nonionic and anionic surfactants or mixtures of nonionic and cationic surfactants. Nonionic, anionic and cationic surfactants and their recommended uses are disclosed in a variety of published references including *McCutcheon's Emulsifiers and Detergents*, annual American and International Editions published by McCutcheon's Division, The Manufacturing Confectioner Publishing Co.; Sisely and Wood, *Encyclopedia of Surface Active Agents*, Chemical Publ. Co., Inc., New York, 1964; and A. S. Davidson and B. Milwidsky, *Synthetic Detergents*, Seventh Edition, John Wiley and Sons, New York, 1987.

Compositions of this disclosure may also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such polyorganosiloxanes), sedimentation of active ingredients (suspending agents), viscosity (thixotropic thickeners), in-container microbial growth (antimicrobials), product freezing (antifreezes), color (dyes/pigment dispersions), wash-off (film formers or stickers), evaporation (evaporation retardants), and other formulation attributes. Film formers include, for example, polyvinyl acetates, polyvinyl acetate copolymers, polyvinylpyrrolidone-vinyl acetate copolymer, polyvinyl alcohols, polyvinyl alcohol copolymers and waxes. Examples of formulation auxiliaries and additives include those listed in *McCutcheon's Volume 2: Functional Materials*, annual International and North American editions published by McCutcheon's Division, The Manufacturing Confectioner Publishing Co.; and PCT Publication WO 03/024222.

The compound of Formula I and any other active ingredients are typically incorporated into the present compositions by dissolving the active ingredient in a solvent or by grinding in a liquid or dry diluent. Solutions, including emulsifiable concentrates, can be prepared by simply mixing the ingredients. If the solvent of a liquid composition intended for use as an emulsifiable concentrate is water-immiscible, an emulsifier is typically added to emulsify the active-containing solvent upon dilution with water. Active ingredient slurries, with particle diameters of up to 2,000 μm can be wet milled using media mills to obtain particles with average diameters below 3 μm. Aqueous slurries can be made into finished suspension concentrates (see, for example, U.S. Pat. No. 3,060,084) or further processed by spray drying to form water-dispersible granules. Dry formulations usually require dry milling processes, which produce average particle diameters in the 2 to 10 μm range. Dusts and powders can be prepared by blending and usually grinding (such as with a hammer mill or fluid-energy mill). Granules and pellets can be prepared by spraying the active material upon preformed granular carriers or by agglomeration techniques. See Browning, "Agglomeration", *Chemical Engineering*, Dec. 4, 1967, pp 147-48, *Perry's Chemical Engineer's Handbook*, 4th Ed., McGraw-Hill, New York, 1963, pages 8-57 and following, and WO 91/13546. Pellets can be prepared as described in U.S. Pat. No. 4,172,714. Water-dispersible and water-soluble granules can be prepared as taught in U.S. Pat. Nos. 4,144,050, 3,920,442 and DE 3,246,493. Tablets can be prepared as taught in U.S. Pat. Nos. 5,180,587, 5,232,701 and 5,208,030. Films can be prepared as taught in GB 2,095,558 and U.S. Pat. No. 3,299,566.

For further information regarding the art of formulation, see T. S. Woods, "The Formulator's Toolbox—Product Forms for Modern Agriculture" in *Pesticide Chemistry and Bioscience, The Food-Environment Challenge*, T. Brooks and T. R. Roberts, Eds., Proceedings of the 9th International Congress on Pesticide Chemistry, The Royal Society of Chemistry, Cambridge, 1999, pp. 120-133. See also U.S. Pat. No. 3,235,361, Col. 6, line 16 through Col. 7, line 19 and Examples 10-41; U.S. Pat. No. 3,309,192, Col. 5, line 43 through Col. 7, line 62 and Examples 8, 12, 15, 39, 41, 52, 53, 58, 132, 138-140, 162-164, 166, 167 and 169-182; U.S. Pat. No. 2,891,855, Col. 3, line 66 through Col. 5, line 17 and Examples 1-4; Klingman, *Weed Control as a Science*, John Wiley and Sons, Inc., New York, 1961, pp 81-96; Hance et al., *Weed Control Handbook*, 8th Ed., Blackwell Scientific Publications, Oxford, 1989; and *Developments in formulation technology*, PJB Publications, Richmond, U K, 2000.

In the following Examples, all percentages are by weight and all formulations are prepared in conventional ways. The compound number, i.e. "Cpd. No." refers to the compounds in Table 1. Without further elaboration, it is believed that one skilled in the art using the preceding description can utilize the present disclosure to its fullest extent. The following Examples are, therefore, to be construed as merely illustrative, and not limiting of the disclosure in any way whatsoever. Percentages are by weight except where otherwise indicated.

Example A

| High Strength Concentrate | |
|---|---|
| Cpd. No. 22 | 98.5% |
| silica aerogel | 0.5% |
| synthetic amorphous fine silica | 1.0% |

Example B

| Wettable Powder | |
|---|---|
| Cpd. No. 22 | 65.0% |
| dodecylphenol polyethylene glycol ether | 2.0% |
| sodium ligninsulfonate | 4.0% |
| sodium silicoaluminate | 6.0% |
| montmorillonite (calcined) | 23.0% |

Example C

| (i) Granule | |
|---|---|
| Cpd. No. 22 | 10.0% |
| attapulgite granules (low volatile matter, 0.71/0.30 mm; U.S.S. No. 25-50 sieves) | 90.0% |

Example D

| Extruded Pellet | |
| --- | --- |
| Cpd. No. 22 | 25.0% |
| anhydrous sodium sulfate | 10.0% |
| crude calcium ligninsulfonate | 5.0% |
| sodium alkylnaphthalenesulfonate | 1.0% |
| calcium/magnesium bentonite | 59.0% |

Example E

| Emulsifiable Concentrate | |
| --- | --- |
| Cpd. No. 22 | 10.0% |
| polyoxyethylene sorbitol hexoleate | 20.0% |
| $C_6$-$C_{10}$ fatty acid methyl ester | 70.0% |

Example F

| Microemulsion | |
| --- | --- |
| Cpd. No. 22 | 5.0% |
| polyvinylpyrrolidone-vinyl acetate copolymer | 30.0% |
| alkylpolyglycoside | 30.0% |
| glyceryl monooleate | 15.0% |
| water | 20.0% |

Example G

| Suspension Concentrate | |
| --- | --- |
| Cpd. No. 22 | 35% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| water | 53.7% |

Example H

| Emulsion in Water | |
| --- | --- |
| Cpd. No. 22 | 10.0% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-enzisothiazolin-3-one | 0.1% |
| aromatic petroleum based hydrocarbon | 20.0 |
| water | 58.7% |

Example I

| Oil Dispersion | |
| --- | --- |
| Cpd. No. 22 | 25% |
| polyoxyethylene sorbitol hexaoleate | 15% |
| organically modified bentonite clay | 2.5% |
| fatty acid methyl ester | 57.5% |

Also disclosed are the above Examples A through I, wherein Cpd. No. 22 is replaced with Cpd. No. 20, Cpd. No. 21 or Cpd. No. 65.

Test results indicate that the certain compounds of Formula I are active preemergent and/or postemergent herbicides and/or plant growth regulants. Compounds of Formula I generally show highest activity for postemergence weed control (i.e. applied after weed seedlings emerge from the soil) and preemergence weed control (i.e. applied before weed seedlings emerge from the soil). Many of them have utility for broad-spectrum pre- and/or postemergence weed control in areas where complete control of all vegetation is desired such as around fuel storage tanks, industrial storage areas, parking lots, drive-in theaters, air fields, river banks, irrigation and other waterways, around billboards and highway and railroad structures. Many of the compounds of this disclosure, by virtue of selective metabolism in crops versus weeds, or by selective activity at the locus of physiological inhibition in crops and weeds, or by selective placement on or within the environment of a mixture of crops and weeds, are useful for the selective control of grass and broadleaf weeds within a crop/weed mixture. One skilled in the art will recognize that the preferred combination of these selectivity factors within a compound or group of compounds can readily be determined by performing routine biological and/or biochemical assays.

Compounds of Formula I may show tolerance to important agronomic crops including, but is not limited to, alfalfa, barley, cotton, wheat, rape, sugar beets, corn (maize), sorghum, soybeans, rice, oats, peanuts, vegetables, tomato, potato, perennial plantation crops including coffee, cocoa, oil palm, rubber, sugarcane, citrus, grapes, fruit trees, nut trees, banana, plantain, pineapple, hops, tea and forests such as eucalyptus and conifers (e.g., loblolly pine), and turf species (e.g., Kentucky bluegrass, St. Augustine grass, Kentucky fescue and Bermuda grass). Compounds of this disclosure can be used in or on crops genetically transformed or bred to incorporate resistance to herbicides, express proteins toxic to invertebrate pests (such as *Bacillus thuringiensis* toxin), and/or express other useful traits. Those skilled in the art will appreciate that not all compounds are equally effective against all weeds. Alternatively, the subject compounds are useful to modify plant growth.

As the compounds of the disclosure have (both preemergent and postemergent herbicidal) activity, to control undesired vegetation by killing or injuring the vegetation or reducing its growth, the compounds can be usefully applied by a variety of methods involving contacting an herbicidally effective amount of a compound of the disclosure, or a composition comprising said compound and at least one of a surfactant, a solid diluent or a liquid diluent, to the foliage or other part of the undesired vegetation or to the environment of the undesired vegetation such as the soil or water in which the undesired vegetation is growing or which surrounds the seed or other propagule of the undesired vegetation.

A herbicidally effective amount of a compound of Formula I is determined by a number of factors. These factors include: formulation selected, method of application, amount and type of vegetation present, growing conditions, etc. In general, a herbicidally effective amount of compounds of this disclosure is about 0.001 to 20 kg/ha with a preferred range of about 0.004 to 1 kg/ha. One skilled in the art can easily determine the herbicidally effective amount necessary for the desired level of weed control.

In one common embodiment, a compound of Formula I is applied, typically in a formulated composition, to a locus comprising desired vegetation (e.g., crops) and undesired vegetation (i.e. weeds), both of which may be seeds, seedlings and/or larger plants, in contact with a growth medium (e.g., soil). In this locus, a composition comprising a compound of the disclosure can be directly applied to a plant or a part thereof, particularly of the undesired vegetation, and/or to the growth medium in contact with the plant.

Plant varieties and cultivars of the desired vegetation in the locus treated with a compound of the disclosure can be obtained by conventional propagation and breeding methods or by genetic engineering methods. Genetically modified plants (transgenic plants) are those in which a heterologous gene (transgene) has been stably integrated into the plant's genome. A transgene that is defined by its particular location in the plant genome is called a transformation or transgenic event.

Although most typically, compounds of the disclosure are used to control undesired vegetation, contact of desired vegetation in the treated locus with compounds of the disclosure may result in super-additive or synergistic effects with genetic traits in the desired vegetation, including traits incorporated through genetic modification. For example, resistance to phytophagous insect pests or plant diseases, tolerance to biotic/abiotic stresses or storage stability may be greater than expected from the genetic traits in the desired vegetation.

Compounds of this disclosure can also be mixed with one or more other biologically active compounds or agents including herbicides, herbicide safeners, fungicides, insecticides, nematocides, bactericides, acaricides, growth regulators such as insect molting inhibitors and rooting stimulants, chemosterilants, semiochemicals, repellents, attractants, pheromones, feeding stimulants, plant nutrients, other biologically active compounds or entomopathogenic bacteria, virus or fungi to form a multi-component pesticide giving an even broader spectrum of agricultural protection. Mixtures of the compounds of the disclosure with other herbicides can broaden the spectrum of activity against additional weed species, and suppress the proliferation of any resistant biotypes. Thus, the present disclosure also pertains to a composition comprising a compound of Formula I (in a herbicidally effective amount) and at least one additional biologically active compound or agent (in a biologically effective amount) and can further comprise at least one of a surfactant, a solid diluent or a liquid diluent. The other biologically active compounds or agents can be formulated in compositions comprising at least one of a surfactant, solid or liquid diluent. For mixtures of the present disclosure, one or more other biologically active compounds or agents can be formulated together with a compound of Formula I, to form a premix, or one or more other biologically active compounds or agents can be formulated separately from the compound of Formula I, and the formulations combined together before application (e.g., in a spray tank) or, alternatively, applied in succession.

General references for agricultural protectants (i.e. herbicides, herbicide safeners, insecticides, fungicides, nematocides, acaricides and biological agents) include *The Pesticide Manual*, 13th Edition, C. D. S. Tomlin, Ed., British Crop Protection Council, Farnham, Surrey, U. K., 2003 and *The BioPesticide Manual*, 2nd Edition, L. G. Copping, Ed., British Crop Protection Council, Farnham, Surrey, U. K., 2001.

For embodiments where one or more of these various mixing partners are used, the mixing partners are typically used in the amounts similar to amounts customary when the mixture partners are used alone. More particularly in mixtures, active ingredients are often applied at an application rate between one-half and the full application rate specified on product labels for use of active ingredient alone. These amounts are listed in references such as *The Pesticide Manual* and *The BioPesticide Manual*. The weight ratio of these various mixing partners (in total) to the compound of Formula I is typically between about 1:3000 and about 3000:1. Of note are weight ratios between about 1:300 and about 300:1 (for example ratios between about 1:30 and about 30:1). One skilled in the art can easily determine through simple experimentation the biologically effective amounts of active ingredients necessary for the desired spectrum of biological activity. It will be evident that including these additional components may expand the spectrum of weeds controlled beyond the spectrum controlled by the compound of Formula I alone.

Of note is a composition comprising a compound of the invention (in a herbicidally effective amount), at least one additional active ingredient selected from the group consisting of other herbicides and herbicide safeners (in an effective amount), and at least one component selected from the group consisting of surfactants, solid diluents and liquid diluents.

Table A1 lists specific combinations of a Component (a) with Component (b) illustrative of the mixtures, compositions and methods of the present invention. Compound No. 1 (i.e. "Cpd. No." stands for "Compound Number") in the Component (a) column is identified in Table AA. The second column of Table A1 lists the specific Component (b) compound (e.g., "2,4-D" in the first line). The third, fourth and fifth columns of Table A1 lists ranges of weight ratios for rates at which the Component (a) compound is typically applied to a field-grown crop relative to Component (b) (i.e. (a):(b)). Thus, for example, the first line of Table A1 specifically discloses the combination of Component (a) (i.e. Compound No. 1 in Table AA) with 2,4-D is typically applied in a weight ratio between 1:192-6:1. The remaining lines of Table A1 are to be construed similarly.

TABLE A1

| Component (a) (Cpd. No.) | Component (b) | Typical Weight Ratio | More Typical Weight Ratio | Most Typical Weight Ratio |
|---|---|---|---|---|
| 1 | 2,4-D | 1:192-6:1 | 1:64-2:1 | 1:24-1:3 |
| 1 | Acetochlor | 1:768-2:1 | 1:256-1:2 | 1:96-1:11 |
| 1 | Acifluorfen | 1:96-12:1 | 1:32-4:1 | 1:12-1:2 |
| 1 | Aclonifen | 1:857-2:1 | 1:285-1:3 | 1:107-1:12 |
| 1 | Alachlor | 1:768-2:1 | 1:256-1:2 | 1:96-1:11 |
| 1 | Ametryn | 1:384-3:1 | 1:128-1:1 | 1:48-1:6 |
| 1 | Amicarbazone | 1:192-6:1 | 1:64-2:1 | 1:24-1:3 |
| 1 | Amidosulfuron | 1:6-168:1 | 1:2-56:1 | 1:1-11:1 |
| 1 | Aminocyclopyrachlor | 1:48-24:1 | 1:16-8:1 | 1:6-2:1 |
| 1 | Aminopyralid | 1:20-56:1 | 1:6-19:1 | 1:2-4:1 |

TABLE A1-continued

| Component (a) (Cpd. No.) | Component (b) | Typical Weight Ratio | More Typical Weight Ratio | Most Typical Weight Ratio |
|---|---|---|---|---|
| 1 | Amitrole | 1:768-2:1 | 1:256-1:2 | 1:96-1:11 |
| 1 | Anilofos | 1:96-12:1 | 1:32-4:1 | 1:12-1:2 |
| 1 | Asulam | 1:960-2:1 | 1:320-1:3 | 1:120-1:14 |
| 1 | Atrazine | 1:192-6:1 | 1:64-2:1 | 1:24-1:3 |
| 1 | Azimsulfuron | 1:6-168:1 | 1:2-56:1 | 1:1-11:1 |
| 1 | Beflubutamid | 1:342-4:1 | 1:114-2:1 | 1:42-1:5 |
| 1 | S-Beflubutamid | 1:171-4:0.5 | 1:57-2:0.5 | 1:21-1:2.5 |
| 1 | Benfuresate | 1:617-2:1 | 1:205-1:2 | 1:77-1:9 |
| 1 | Bensulfuron-methyl | 1:25-45:1 | 1:8-15:1 | 1:3-3:1 |
| 1 | Bentazone | 1:192-6:1 | 1:64-2:1 | 1:24-1:3 |
| 1 | Benzobicyclon | 1:85-14:1 | 1:28-5:1 | 1:10-1:2 |
| 1 | Benzofenap | 1:257-5:1 | 1:85-2:1 | 1:32-1:4 |
| 1 | Bicyclopyrone | 1:42-27:1 | 1:14-9:1 | 1:5-2:1 |
| 1 | Bifenox | 1:257-5:1 | 1:85-2:1 | 1:32-1:4 |
| 1 | Bispyribac-sodium | 1:10-112:1 | 1:3-38:1 | 1:1-7:1 |
| 1 | Bixlozone | 1:384-3:1 | 1:128-1:1 | 1:48-1:6 |
| 1 | Bromacil | 1:384-3:1 | 1:128-1:1 | 1:48-1:6 |
| 1 | Bromobutide | 1:384-3:1 | 1:128-1:1 | 1:48-1:6 |
| 1 | Bromoxynil | 1:96-12:1 | 1:32-4:1 | 1:12-1:2 |
| 1 | Butachlor | 1:768-2:1 | 1:256-1:2 | 1:96-1:11 |
| 1 | Butafenacil | 1:42-27:1 | 1:14-9:1 | 1:5-2:1 |
| 1 | Butylate | 1:1542-1:2 | 1:514-1:5 | 1:192-1:22 |
| 1 | Carfenstrole | 1:192-6:1 | 1:64-2:1 | 1:24-1:3 |
| 1 | Carfentrazone-ethyl | 1:128-9:1 | 1:42-3:1 | 1:16-1:2 |
| 1 | Chlorimuron-ethyl | 1:8-135:1 | 1:2-45:1 | 1:1-9:1 |
| 1 | Chlorotoluron | 1:768-2:1 | 1:256-1:2 | 1:96-1:11 |
| 1 | Chlorsulfuron | 1:6-168:1 | 1:2-56:1 | 1:1-11:1 |
| 1 | Cincosulfuron | 1:17-68:1 | 1:5-23:1 | 1:2-5:1 |
| 1 | Cinidon-ethyl | 1:384-3:1 | 1:128-1:1 | 1:48-1:6 |
| 1 | Cinmethylin | 1:34-34:1 | 1:11-12:1 | 1:4-3:1 |
| 1 | Clacyfos | 1:34-34:1 | 1:11-12:1 | 1:4-3:1 |
| 1 | Clethodim | 1:48-24:1 | 1:16-8:1 | 1:6-2:1 |
| 1 | Clodinafop-propargyl | 1:20-56:1 | 1:6-19:1 | 1:2-4:1 |
| 1 | Clomazone | 1:384-3:1 | 1:128-1:1 | 1:48-1:6 |
| 1 | Clomeprop | 1:171-7:1 | 1:57-3:1 | 1:21-1:3 |
| 1 | Clopyralid | 1:192-6:1 | 1:64-2:1 | 1:24-1:3 |
| 1 | Cloransulam-methyl | 1:12-96:1 | 1:4-32:1 | 1:1-6:1 |
| 1 | Cumyluron | 1:384-3:1 | 1:128-1:1 | 1:48-1:6 |
| 1 | Cyanazine | 1:384-3:1 | 1:128-1:1 | 1:48-1:6 |
| 1 | Cyclopyrimorate | 1:17-68:1 | 1:5-23:1 | 1:2-5:1 |
| 1 | Cyclosulfamuron | 1:17-68:1 | 1:5-23:1 | 1:2-5:1 |
| 1 | Cycloxydim | 1:96-12:1 | 1:32-4:1 | 1:12-1:2 |
| 1 | Cyhalofop | 1:25-45:1 | 1:8-15:1 | 1:3-3:1 |
| 1 | Daimuron | 1:192-6:1 | 1:64-2:1 | 1:24-1:3 |
| 1 | Desmedipham | 1:322-4:1 | 1:107-2:1 | 1:40-1:5 |
| 1 | Dicamba | 1:192-6:1 | 1:64-2:1 | 1:24-1:3 |
| 1 | Dichlobenil | 1:1371-1:2 | 1:457-1:4 | 1:171-1:20 |
| 1 | Dichlorprop | 1:925-2:1 | 1:308-1:3 | 1:115-1:13 |
| 1 | Diclofop-methyl | 1:384-3:1 | 1:128-1:1 | 1:48-1:6 |
| 1 | Diclosulam | 1:10-112:1 | 1:3-38:1 | 1:1-7:1 |
| 1 | Difenzoquat | 1:288-4:1 | 1:96-2:1 | 1:36-1:4 |
| 1 | Diflufenican | 1:857-2:1 | 1:285-1:3 | 1:107-1:12 |
| 1 | Diflufenzopyr | 1:12-96:1 | 1:4-32:1 | 1:1-6:1 |
| 1 | Dimethachlor | 1:768-2:1 | 1:256-1:2 | 1:96-1:11 |
| 1 | Dimethametryn | 1:192-6:1 | 1:64-2:1 | 1:24-1:3 |
| 1 | Dimethenamid-P | 1:384-3:1 | 1:128-1:1 | 1:48-1:6 |
| 1 | Dithiopyr | 1:192-6:1 | 1:64-2:1 | 1:24-1:3 |
| 1 | Diuron | 1:384-3:1 | 1:128-1:1 | 1:48-1:6 |
| 1 | EPTC | 1:768-2:1 | 1:256-1:2 | 1:96-1:11 |
| 1 | Esprocarb | 1:1371-1:2 | 1:457-1:4 | 1:171-1:20 |
| 1 | Ethalfluralin | 1:384-3:1 | 1:128-1:1 | 1:48-1:6 |
| 1 | Ethametsulfuron-methyl | 1:17-68:1 | 1:5-23:1 | 1:2-5:1 |
| 1 | Ethoxyfen | 1:8-135:1 | 1:2-45:1 | 1:1-9:1 |
| 1 | Ethoxysulfuron | 1:20-56:1 | 1:6-19:1 | 1:2-4:1 |
| 1 | Etobenzanid | 1:257-5:1 | 1:85-2:1 | 1:32-1:4 |
| 1 | Fenoxaprop-ethyl | 1:120-10:1 | 1:40-4:1 | 1:15-1:2 |
| 1 | Fenoxasulfone | 1:85-14:1 | 1:28-5:1 | 1:10-1:2 |
| 1 | Fenquinotrione | 1:17-68:1 | 1:5-23:1 | 1:2-5:1 |
| 1 | Fentrazamide | 1:17-68:1 | 1:5-23:1 | 1:2-5:1 |
| 1 | Flazasulfuron | 1:17-68:1 | 1:5-23:1 | 1:2-5:1 |
| 1 | Florasulam | 1:2-420:1 | 1:1-140:1 | 2:1-27:1 |
| 1 | Fluazifop-butyl | 1:192-6:1 | 1:64-2:1 | 1:24-1:3 |
| 1 | Flucarbazone | 1:8-135:1 | 1:2-45:1 | 1:1-9:1 |
| 1 | Flucetosulfuron | 1:8-135:1 | 1:2-45:1 | 1:1-9:1 |
| 1 | Flufenacet | 1:257-5:1 | 1:85-2:1 | 1:32-1:4 |
| 1 | Flumetsulam | 1:24-48:1 | 1:8-16:1 | 1:3-3:1 |
| 1 | Flumiclorac-pentyl | 1:10-112:1 | 1:3-38:1 | 1:1-7:1 |
| 1 | Flumioxazin | 1:25-45:1 | 1:8-15:1 | 1:3-3:1 |
| 1 | Fluometuron | 1:384-3:1 | 1:128-1:1 | 1:48-1:6 |
| 1 | Flupyrsulfuron-methyl | 1:3-336:1 | 1:1-112:1 | 2:1-21:1 |
| 1 | Fluridone | 1:384-3:1 | 1:128-1:1 | 1:48-1:6 |
| 1 | Fluroxypyr | 1:96-12:1 | 1:32-4:1 | 1:12-1:2 |
| 1 | Flurtamone | 1:857-2:1 | 1:285-1:3 | 1:107-1:12 |
| 1 | Fluthiacet-methyl | 1:48-42:1 | 1:16-14:1 | 1:3-3:1 |
| 1 | Fomesafen | 1:96-12:1 | 1:32-4:1 | 1:12-1:2 |
| 1 | Foramsulfuron | 1:13-84:1 | 1:4-28:1 | 1:1-6:1 |
| 1 | Glufosinate | 1:288-4:1 | 1:96-2:1 | 1:36-1:4 |
| 1 | Glyphosate | 1:288-4:1 | 1:96-2:1 | 1:36-1:4 |
| 1 | Halosulfuron-methyl | 1:17-68:1 | 1:5-23:1 | 1:2-5:1 |
| 1 | Halauxifen | 1:20-56:1 | 1:6-19:1 | 1:2-4:1 |
| 1 | Halauxifen methyl | 1:20-56:1 | 1:6-19:1 | 1:2-4:1 |
| 1 | Haloxyfop-methyl | 1:34-34:1 | 1:11-12:1 | 1:4-3:1 |
| 1 | Hexazinone | 1:192-6:1 | 1:64-2:1 | 1:24-1:3 |
| 1 | Hydantocidin | 1:1100-16:1 | 1:385-8:1 | 1:144-4:1 |
| 1 | Imazamox | 1:13-84:1 | 1:4-28:1 | 1:1-6:1 |
| 1 | Imazapic | 1:20-56:1 | 1:6-19:1 | 1:2-4:1 |
| 1 | Imazapyr | 1:85-14:1 | 1:28-5:1 | 1:10-1:2 |
| 1 | Imazaquin | 1:34-34:1 | 1:11-12:1 | 1:4-3:1 |
| 1 | Imazethabenz-methyl | 1:171-7:1 | 1:57-3:1 | 1:21-1:3 |
| 1 | Imazethapyr | 1:24-48:1 | 1:8-16:1 | 1:3-3:1 |
| 1 | Imazosulfuron | 1:27-42:1 | 1:9-14:1 | 1:3-3:1 |
| 1 | Indanofan | 1:342-4:1 | 1:114-2:1 | 1:42-1:5 |
| 1 | Indaziflam | 1:25-45:1 | 1:8-15:1 | 1:3-3:1 |
| 1 | Iodosulfuron-methyl | 1:3-336:1 | 1:1-112:1 | 2:1-21:1 |
| 1 | Ioxynil | 1:192-6:1 | 1:64-2:1 | 1:24-1:3 |
| 1 | Ipfencarbazone | 1:85-14:1 | 1:28-5:1 | 1:10-1:2 |
| 1 | Isoproturon | 1:384-3:1 | 1:128-1:1 | 1:48-1:6 |
| 1 | Isoxaben | 1:288-4:1 | 1:96-2:1 | 1:36-1:4 |
| 1 | Isoxaflutole | 1:60-20:1 | 1:20-7:1 | 1:7-2:1 |
| 1 | Lactofen | 1:42-27:1 | 1:14-9:1 | 1:5-2:1 |
| 1 | Lenacil | 1:384-3:1 | 1:128-1:1 | 1:48-1:6 |
| 1 | Linuron | 1:384-3:1 | 1:128-1:1 | 1:48-1:6 |
| 1 | MCPA | 1:192-6:1 | 1:64-2:1 | 1:24-1:3 |
| 1 | MCPB | 1:288-4:1 | 1:96-2:1 | 1:36-1:4 |
| 1 | Mecoprop | 1:768-2:1 | 1:256-1:2 | 1:96-1:11 |
| 1 | Mefenacet | 1:384-3:1 | 1:128-1:1 | 1:48-1:6 |
| 1 | Mefluidide | 1:192-6:1 | 1:64-2:1 | 1:24-1:3 |
| 1 | Mesosulfuron-methyl | 1:5-224:1 | 1:1-75:1 | 1:1-14:1 |
| 1 | Mesotrione | 1:42-27:1 | 1:14-9:1 | 1:5-2:1 |
| 1 | Metamifop | 1:42-27:1 | 1:14-9:1 | 1:5-2:1 |
| 1 | Metazachlor | 1:384-3:1 | 1:128-1:1 | 1:48-1:6 |
| 1 | Metazosulfuron | 1:25-45:1 | 1:8-15:1 | 1:3-3:1 |
| 1 | Methabenzthiazuron | 1:768-2:1 | 1:256-1:2 | 1:96-1:11 |
| 1 | Metolachlor | 1:768-2:1 | 1:256-1:2 | 1:96-1:11 |
| 1 | Metosulam | 1:8-135:1 | 1:2-45:1 | 1:1-9:1 |
| 1 | Metribuzin | 1:192-6:1 | 1:64-2:1 | 1:24-1:3 |
| 1 | Metsulfuron-methyl | 1:2-560:1 | 1:1-187:1 | 3:1-35:1 |
| 1 | Molinate | 1:1028-2:1 | 1:342-1:3 | 1:128-1:15 |
| 1 | Napropamide | 1:384-3:1 | 1:128-1:1 | 1:48-1:6 |
| 1 | Napropamide-M | 1:192-6:1 | 1:64-2:1 | 1:24-1:3 |
| 1 | Naptalam | 1:192-6:1 | 1:64-2:1 | 1:24-1:3 |
| 1 | Nicosulfuron | 1:12-96:1 | 1:4-32:1 | 1:1-6:1 |
| 1 | Norflurazon | 1:1152-1:1 | 1:384-1:3 | 1:144-1:16 |
| 1 | Orbencarb | 1:1371-1:2 | 1:457-1:4 | 1:171-1:20 |
| 1 | Orthosulfamuron | 1:20-56:1 | 1:6-19:1 | 1:2-4:1 |
| 1 | Oryzalin | 1:514-3:1 | 1:171-1:2 | 1:64-1:8 |

TABLE A1-continued

| Component (a) (Cpd. No.) | Component (b) | Typical Weight Ratio | More Typical Weight Ratio | Most Typical Weight Ratio |
|---|---|---|---|---|
| 1 | Oxadiargyl | 1:384-3:1 | 1:128-1:1 | 1:48-1:6 |
| 1 | Oxadiazon | 1:548-3:1 | 1:182-1:2 | 1:68-1:8 |
| 1 | Oxasulfuron | 1:27-42:1 | 1:9-14:1 | 1:3-3:1 |
| 1 | Oxaziclomefone | 1:42-27:1 | 1:14-9:1 | 1:5-2:1 |
| 1 | Oxyfluorfen | 1:384-3:1 | 1:128-1:1 | 1:48-1:6 |
| 1 | Paraquat | 1:192-6:1 | 1:64-2:1 | 1:24-1:3 |
| 1 | Pendimethalin | 1:384-3:1 | 1:128-1:1 | 1:48-1:6 |
| 1 | Penoxsulam | 1:10-112:1 | 1:3-38:1 | 1:1-7:1 |
| 1 | Penthoxamid | 1:384-3:1 | 1:128-1:1 | 1:48-1:6 |
| 1 | Pentoxazone | 1:102-12:1 | 1:34-4:1 | 1:12-1:2 |
| 1 | Phenmedipham | 1:102-12:1 | 1:34-4:1 | 1:12-1:2 |
| 1 | Picloram | 1:96-12:1 | 1:32-4:1 | 1:12-1:2 |
| 1 | Picolinafen | 1:34-34:1 | 1:11-12:1 | 1:4-3:1 |
| 1 | Pinoxaden | 1:25-45:1 | 1:8-15:1 | 1:3-3:1 |
| 1 | Pretilachlor | 1:192-6:1 | 1:64-2:1 | 1:24-1:3 |
| 1 | Primisulfuron-methyl | 1:8-135:1 | 1:2-45:1 | 1:1-9:1 |
| 1 | Prodiamine | 1:384-3:1 | 1:128-1:1 | 1:48-1:6 |
| 1 | Profoxydim | 1:42-27:1 | 1:14-9:1 | 1:5-2:1 |
| 1 | Prometryn | 1:384-3:1 | 1:128-1:1 | 1:48-1:6 |
| 1 | Propachlor | 1:1152-1:1 | 1:384-1:3 | 1:144-1:16 |
| 1 | Propanil | 1:384-3:1 | 1:128-1:1 | 1:48-1:6 |
| 1 | Propaquizafop | 1:48-24:1 | 1:16-8:1 | 1:6-2:1 |
| 1 | Propoxycarbazone | 1:17-68:1 | 1:5-23:1 | 1:2-5:1 |
| 1 | Propyrisulfuron | 1:17-68:1 | 1:5-23:1 | 1:2-5:1 |
| 1 | Propyzamide | 1:384-3:1 | 1:128-1:1 | 1:48-1:6 |
| 1 | Prosulfocarb | 1:1200-1:2 | 1:400-1:4 | 1:150-1:17 |
| 1 | Prosulfuron | 1:6-168:1 | 1:2-56:1 | 1:1-11:1 |
| 1 | Pyraclonil | 1:42-27:1 | 1:14-9:1 | 1:5-2:1 |
| 1 | Pyraflufen-ethyl | 1:5-224:1 | 1:1-75:1 | 1:1-14:1 |
| 1 | Pyrasulfotole | 1:13-84:1 | 1:4-28:1 | 1:1-6:1 |
| 1 | Pyrazolynate | 1:857-2:1 | 1:285-1:3 | 1:107-1:12 |
| 1 | Pyrazosulfuron-ethyl | 1:10-112:1 | 1:3-38:1 | 1:1-7:1 |
| 1 | Pyrazoxyfen | 1:5-224:1 | 1:1-75:1 | 1:1-14:1 |
| 1 | Pyribenzoxim | 1:10-112:1 | 1:3-38:1 | 1:1-7:1 |
| 1 | Pyributicarb | 1:384-3:1 | 1:128-1:1 | 1:48-1:6 |
| 1 | Pyridate | 1:288-4:1 | 1:96-2:1 | 1:36-1:4 |
| 1 | Pyriftalid | 1:10-112:1 | 1:3-38:1 | 1:1-7:1 |
| 1 | Pyriminobac-methyl | 1:20-56:1 | 1:6-19:1 | 1:2-4:1 |
| 1 | Pyrimisulfan | 1:17-68:1 | 1:5-23:1 | 1:2-5:1 |
| 1 | Pyrithiobac | 1:24-48:1 | 1:8-16:1 | 1:3-3:1 |
| 1 | Pyroxasulfone | 1:85-14:1 | 1:28-5:1 | 1:10-1:2 |
| 1 | Pyroxsulam | 1:5-224:1 | 1:1-75:1 | 1:1-14:1 |
| 1 | Quinclorac | 1:192-6:1 | 1:64-2:1 | 1:24-1:3 |
| 1 | Quizalofop-ethyl | 1:42-27:1 | 1:14-9:1 | 1:5-2:1 |
| 1 | Rimsulfuron | 1:13-84:1 | 1:4-28:1 | 1:1-6:1 |
| 1 | Saflufenacil | 1:25-45:1 | 1:8-15:1 | 1:3-3:1 |
| 1 | Sethoxydim | 1:96-12:1 | 1:32-4:1 | 1:12-1:2 |
| 1 | Simazine | 1:384-3:1 | 1:128-1:1 | 1:48-1:6 |
| 1 | Sulcotrione | 1:120-10:1 | 1:40-4:1 | 1:15-1:2 |
| 1 | Sulfentrazone | 1:147-8:1 | 1:49-3:1 | 1:18-1:3 |
| 1 | Sulfometuron-methyl | 1:34-34:1 | 1:11-12:1 | 1:4-3:1 |
| 1 | Sulfosulfuron | 1:8-135:1 | 1:2-45:1 | 1:1-9:1 |
| 1 | Tebuthiuron | 1:384-3:1 | 1:128-1:1 | 1:48-1:6 |
| 1 | Tefuryltrione | 1:42-27:1 | 1:14-9:1 | 1:5-2:1 |
| 1 | Tembotrione | 1:31-37:1 | 1:10-13:1 | 1:3-3:1 |
| 1 | Tepraloxydim | 1:25-45:1 | 1:8-15:1 | 1:3-3:1 |
| 1 | Terbacil | 1:288-4:1 | 1:96-2:1 | 1:36-1:4 |
| 1 | Terbuthylazine | 1:857-2:1 | 1:285-1:3 | 1:107-1:12 |
| 1 | Terbutryn | 1:192-6:1 | 1:64-2:1 | 1:24-1:3 |
| 1 | Thenylchlor | 1:85-14:1 | 1:28-5:1 | 1:10-1:2 |
| 1 | Thiazopyr | 1:384-3:1 | 1:128-1:1 | 1:48-1:6 |
| 1 | Thiencarbazone | 1:3-336:1 | 1:1-112:1 | 2:1-21:1 |
| 1 | Thifensulfuron-methyl | 1:5-224:1 | 1:1-75:1 | 1:1-14:1 |
| 1 | Tiafenacil | 1:17-68:1 | 1:5-23:1 | 1:2-5:1 |
| 1 | Thiobencarb | 1:768-2:1 | 1:256-1:2 | 1:96-1:11 |
| 1 | Tolpyralate | 1:31-37:1 | 1:10-13:1 | 1:3-3:1 |
| 1 | Topramzone | 1:6-168:1 | 1:2-56:1 | 1:1-11:1 |
| 1 | Tralkoxydim | 1:68-17:1 | 1:22-6:1 | 1:8-2:1 |
| 1 | Triafamone | 1:2-420:1 | 1:1-140:1 | 2:1-27:1 |
| 1 | Triallate | 1:768-2:1 | 1:256-1:2 | 1:96-1:11 |
| 1 | Triasulfuron | 1:5-224:1 | 1:1-75:1 | 1:1-14:1 |
| 1 | Triaziflam | 1:171-7:1 | 1:57-3:1 | 1:21-1:3 |
| 1 | Tribenuron-methyl | 1:3-336:1 | 1:1-112:1 | 2:1-21:1 |
| 1 | Triclopyr | 1:192-6:1 | 1:64-2:1 | 1:24-1:3 |
| 1 | Trifloxysulfuron | 1:2-420:1 | 1:1-140:1 | 2:1-27:1 |
| 1 | Trifludimoxazin | 1:25-45:1 | 1:8-15:1 | 1:3-3:1 |
| 1 | Trifluralin | 1:288-4:1 | 1:96-2:1 | 1:36-1:4 |
| 1 | Triflusulfuron-methyl | 1:17-68:1 | 1:5-23:1 | 1:2-5:1 |
| 1 | Tritosulfuron | 1:13-84:1 | 1:4-28:1 | 1:1-6:1 |

Table A2 is constructed the same as Table A1 above except that entries below the "Component (a)" column heading are replaced with the respective Component (a) Column Entry shown below. Compound No. 2 in the Component (a) column is identified in Table AA. Thus, for example, in Table A2 the entries below the "Component (a)" column heading all recite "Compound No. 2" (i.e. Compound No. 2 identified in Table AA), and the first line below the column headings in Table A2 specifically discloses a mixture of Compound No. 2 with 2,4-D.

| Table Number | Component (a) Column Entries |
|---|---|
| A2 | Compound No. 4 |
| A3 | Compound No. 5 |
| A4 | Compound No. 9 |
| A5 | Compound No. 12 |
| A6 | Compound No. 13 |
| A7 | Compound No. 18 |
| A8 | Compound No. 20 |
| A9 | Compound No. 21 |
| A10 | Compound No. 22 |
| A11 | Compound No. 23 |
| A11 | Compound No. 29 |
| A12 | Compound No. 31 |
| A13 | Compound No. 32 |
| A14 | Compound No. 33 |
| A15 | Compound No. 35 |
| A16 | Compound No. 36 |
| A17 | Compound No. 40 |
| A18 | Compound No. 65 |
| A19 | Compound No. 66 |
| A20 | Compound No. 77 |

In certain instances, combinations of a compound of this disclosure with other biologically active (particularly herbicidal) compounds or agents (i.e. active ingredients) can result in a greater-than-additive (i.e. synergistic) effect on weeds and/or a less-than-additive effect (i.e. safening) on crops or other desirable plants. Reducing the quantity of active ingredients released in the environment while ensuring effective pest control is always desirable. Ability to use greater amounts of active ingredients to provide more effective weed control without excessive crop injury is also desirable. When synergism of herbicidal active ingredients occurs on weeds at application rates giving agronomically satisfactory levels of weed control, such combinations can be advantageous for reducing crop production cost and decreasing environmental load. When safening of herbicidal active ingredients occurs on crops, such combinations can be advantageous for increasing crop protection by reducing weed competition.

Of note is a combination of a compound of the disclosure with at least one other herbicidal active ingredient. Of particular note is such a combination where the other herbicidal active ingredient has different site of action from the compound of the disclosure. In certain instances, a combination with at least one other herbicidal active ingredient having a similar spectrum of control but a different site of action will be particularly advantageous for resistance management. Thus, a composition of the present disclosure can further comprise (in a herbicidally effective amount) at least one additional herbicidal active ingredient having a similar spectrum of control but a different site of action.

Compounds of this disclosure can also be used in combination with herbicide safeners such as allidochlor, benoxacor, cloquintocet-mexyl, cumyluron, cyometrinil, cyprosulfonamide, daimuron, dichlormid, dicyclonon, dietholate, dimepiperate, fenchlorazole-ethyl, fenclorim, flurazole, fluxofenim, furilazole, isoxadifen-ethyl, mefenpyr-diethyl, mephenate, methoxyphenone naphthalic anhydride (1,8-naphthalic anhydride), oxabetrinil, N-(aminocarbonyl)-2-methylbenzenesulfonamide, N-(aminocarbonyl)-2-fluorobenzenesulfonamide, 1-bromo-4-[(chloromethyl)sulfonyl] benzene (BCS), 4-(dichloroacetyl)-1-oxa-4-azospiro[4.5] decane (MON 4660), 2-(dichloromethyl)-2-methyl-1,3-dioxolane (MG 191), ethyl 1,6-dihydro-1-(2-methoxyphenyl)-6-oxo-2-phenyl-5-pyrimidinecarboxylate, 2-hydroxy-N,N-dimethyl-6-(trifluoromethyl)pyridine-3-carboxamide, 1-(3,4-dimethylphenyl)-1,6-dihydro-6-oxo-2-phenyl-5-pyrimidinecarboxylate, 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide to increase safety to certain crops. Antidotally effective amounts of the herbicide safeners can be applied at the same time as the compounds of this disclosure, or applied as seed treatments. Therefore an aspect of the present disclosure relates to a herbicidal mixture comprising a compound of this disclosure and an antidotally effective amount of a herbicide safener. Seed treatment is particularly useful for selective weed control, because it physically restricts antidoting to the crop plants. Therefore a particularly useful embodiment of the present disclosure is a method for selectively controlling the growth of undesired vegetation in a crop comprising contacting the locus of the crop with a herbicidally effective amount of a compound of this disclosure wherein seed from which the crop is grown is treated with an antidotally effective amount of safener. Antidotally effective amounts of safeners can be easily determined by one skilled in the art through simple experimentation.

Compounds of the disclosure cans also be mixed with: (1) polynucleotides including but not limited to DNA, RNA, and/or chemically modified nucleotides influencing the amount of a particular target through down regulation, interference, suppression or silencing of the genetically derived transcript that render a herbicidal effect; or (2) polynucleotides including but not limited to DNA, RNA, and/or chemically modified nucleotides influencing the amount of a particular target through down regulation, interference, suppression or silencing of the genetically derived transcript that render a safening effect.

The following Tests A to M demonstrate the control efficacy of representative compounds of this disclosure against representative weeds, but the weed control afforded by these compounds is not limited to these species. See Index Table 1 for compound descriptions. Mass spectra are reported with an estimated precision within ±0.5 Da as the molecular weight of the highest isotopic abundance parent ion (M+1) formed by addition of H⁺ (molecular weight of 1) to the molecule observed by using atmospheric pressure chemical ionization (AP+).

INDEX TABLE 1

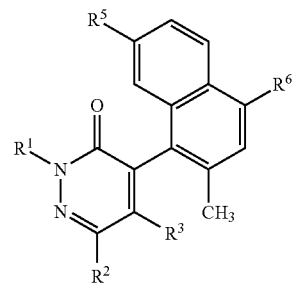

I

| Cpd. No. | R¹ | R² | R³ | R⁵ | R⁶ | Physical properties |
|---|---|---|---|---|---|---|
| 21 | CH₃ | Cl | OH | F | H | M.P. = 192-195° C. |
| 22 | CH₃ | Cl | OH | Cl | H | M.P. = 232-235° C. |
| 20 | CH₃ | Cl | OH | CH₃ | H | See above* |
| 65 | CH₃ | Cl | OH | H | Cl | ** |

*See Synthesis Example 3 for physical property data.
**¹H NMR (DMSO-d₆) δ 11.22 (br s, 1H), 8.18-8.20 (m, 1H), 7.72 (s, 1H), 7.60-7.66 (m, 1H), 7.50-7.57 (m, 2H), 3.64 (s, 3H), 2.20 (s, 3H).

Test A

Seeds of plant species selected from barnyardgrass (*Echinochloa crus-galli*), kochia (*Kochia scoparia*), ragweed (common ragweed, *Ambrosia elatior*), ryegrass, Italian (*Lolium multiflorum*), foxtail, giant (*Setaria faberii*), foxtail, green (*Setaria viridis*) and pigweed (*Amaranthus retroflexus*) were planted into a blend of loam soil and sand and treated preemergence with a directed soil spray using test chemicals formulated in a non-phytotoxic solvent mixture which included a surfactant.

At the same time, plants selected from these weed species and also wheat (*Triticum aestivum*), corn (*Zea mays*), blackgrass (*Alopecurus myosuroides*) and galium (catchweed bedstraw, *Galium aparine*) were planted in pots containing the same blend of loam soil and sand and treated with postemergence applications of test chemicals formulated in the same manner. Plants ranged in height from 2 to 10 cm and were in the one- to two-leaf stage for the postemergence treatment. Treated plants and untreated controls were maintained in a greenhouse for approximately 10 d, after which time all treated plants were compared to untreated controls and visually evaluated for injury. Plant response ratings, summarized in Table A, are based on a 0 to 100 scale where 0 is no effect and 100 is complete control. A dash (-) response means no test result.

TABLE A

| | Compounds | | | | | Compounds | | | |
|---|---|---|---|---|---|---|---|---|---|
| 125 g ai/ha | 20 | 21 | 22 | 65 | 31 g ai/ha | 20 | 21 | 22 | 65 |
| Postemergence | | | | | | | | | |
| Barnyardgrass | 100 | 90 | 100 | 100 | Barnyardgrass | 80 | 80 | 100 | 100 |
| Blackgrass | 60 | 70 | 100 | 100 | Blackgrass | 0 | 50 | 70 | 90 |
| Corn | 30 | 20 | 10 | 50 | Corn | 30 | 10 | 0 | 30 |
| Foxtail, Giant | 100 | — | — | 100 | Foxtail, Giant | 80 | — | — | 100 |
| Foxtail, Green | — | 100 | 100 | — | Foxtail, Green | — | 90 | 100 | — |

TABLE A-continued

| 125 g ai/ha | Compounds | | | | 31 g ai/ha | Compounds | | | |
|---|---|---|---|---|---|---|---|---|---|
| | 20 | 21 | 22 | 65 | | 20 | 21 | 22 | 65 |
| Galium | 100 | 100 | 100 | 100 | Galium | 90 | 100 | 100 | 100 |
| Kochia | 90 | 90 | 100 | 100 | Kochia | 70 | 80 | 60 | 80 |
| Pigweed | 100 | 100 | 100 | 100 | Pigweed | 90 | 100 | 100 | 100 |
| Ragweed | 90 | 100 | 100 | 100 | Ragweed | 90 | 100 | 100 | 100 |
| Ryegrass, Italian | 100 | 100 | 100 | 100 | Ryegrass, Italian | 90 | 90 | 100 | 100 |
| Wheat | 30 | 80 | 100 | 90 | Wheat | 20 | 50 | 100 | 80 |
| Preemergence | | | | | | | | | |
| Barnyardgrass | 100 | 100 | 100 | 100 | Barnyardgrass | 70 | 90 | 100 | 100 |
| Foxtail, Giant | 100 | — | — | 100 | Foxtail, Giant | 80 | — | — | 100 |
| Foxtail, Green | — | 100 | 100 | — | Foxtail, Green | — | 70 | 90 | — |
| Kochia | 90 | 100 | 90 | 80 | Kochia | 30 | 50 | 10 | 0 |
| Pigweed | 100 | 100 | 100 | 100 | Pigweed | 100 | 100 | 100 | 100 |
| Ragweed | 90 | 100 | 100 | 100 | Ragweed | 20 | 100 | 100 | 100 |
| Ryegrass, Italian | 100 | 100 | 100 | 100 | Ryegrass, Italian | 90 | 80 | 90 | 100 |

Test B

Plant species in the flooded paddy test selected from rice (*Oryza sativa*), sedge, umbrella (small-flower umbrella sedge, *Cyperus difformis*), duck salad (*Heteranthera limosa*) and barnyardgrass (*Echinochloa crus-galli*) were grown to the 2-leaf stage for testing. At time of treatment, test pots were flooded to 3 cm above the soil surface, treated by application of test compounds directly to the paddy water, and then maintained at that water depth for the duration of the test. Treated plants and controls were maintained in a greenhouse for 13 to 15 d, after which time all species were compared to controls and visually evaluated. Plant response ratings, summarized in Table B, are based on a scale of 0 to 100 where 0 is no effect and 100 is complete control. A dash (-) response means no test result.

TABLE B

| 250 g ai/ha Flood | Compounds | | | |
|---|---|---|---|---|
| | 20 | 21 | 22 | 65 |
| Barnyardgrass | 25 | 80 | 40 | 40 |
| Ducksalad | 100 | 90 | 90 | 80 |
| Rice | 15 | 35 | 60 | 20 |
| Sedge, Umbrella | 90 | 90 | 85 | 90 |

Test C

Seeds of plant species selected from blackgrass (*Alopecurus myosuroides*), ryegrass, Italian (*Lolium multiflorum*), wheat, winter (winter wheat, *Triticum aestivum*), galium (catchweed bedstraw, *Galium aparine*), corn (*Zea mays*), crabgrass, large (*Digitaria sanguinalis*), foxtail, giant (*Setaria faberii*), johnsongrass (*Sorghum halepense*), lambsquarters (*Chenopodium album*), morningglory (*Ipomoea coccinea*), nutsedge, yellow (*Cyperus esculentus*), pigweed (*Amaranthus retroflexus*), ragweed (common ragweed, *Ambrosia elatior*), soybean (*Glycine max*), barnyardgrass (*Echinochloa crus-galli*), oilseed rape (*Brassica napus*), waterhemp (common waterhemp, *Amaranthus rudis*), pigweed, palmer (*Amaranthus palmeri*), kochia (*Kochia scoparia*), oat, wild (*Avena fatua*), surinam grass (*Brachiaria decumbens*), windgrass (*Apera spica-venti*), poinsettia, wild (*Euphorbia heterophylla*) and velvetleaf (*Abutilon theophrasti*) were planted into a silt loam soil and treated preemergence with test chemicals formulated in a non-phytotoxic solvent mixture which included a surfactant.

At the same time, plants selected from these crop and weed species and also chickweed (common chickweed, *Stellaria media*), buckwheat, wild (*Polygonum convolvulus*), mustard, wild (*Sinapis arvensis*), field poppy (*Papaver rhoeas*), field violet (*Viola arvensis*), nightshade (eastern black nightshade, *Solanum ptycanthum*), speedwell (bird's-eye speedwell, *Veronica persica*), horseweed (*Conyza canadensis*), cutleaf geranium (*Geranium dissectum*), and Canada thistle (*Cirsium arvense*) were planted in pots containing Redi-Earth® planting medium (Scotts Company, 14111 Scottslawn Road, Marysville, Ohio 43041) comprising spaghnum peat moss, vermiculite, wetting agent and starter nutrients and treated with postemergence applications of test chemicals formulated in the same manner. Plants ranged in height from 2 to 18 cm (1- to 4-leaf stage) for postemergence treatments. Treated plants and controls were maintained in a greenhouse for 13 to 21 d, after which time all species were compared to controls and visually evaluated. Plant response ratings, summarized in Table C-1 (postemergence) and C-2 (preemergence), are based on a scale of 0 to 100 where 0 is no effect and 100 is complete control. A dash (-) response means no test result.

Plant species in the flooded paddy test consisted of rice (transplanted and water seeded, *Oryza sativa*), sedge, umbrella (small-flower umbrella sedge, *Cyperus difformis*), ducksalad (*Heteranthera limosa*), Bulrush, Japanese (*Scirpus juncoides*) and barnyardgrass (*Echinochloa crus-galli*) grown to the 2-leaf stage for testing. At time of treatment, test pots were flooded to 3 cm above the soil surface, treated by application of test compounds directly to the paddy water, and then maintained at that water depth for the duration of the test. Treated plants and controls were maintained in a greenhouse for 13 to 15 d, after which time all species were compared to controls and visually evaluated. Plant response ratings, summarized in Table C are based on a scale of 0 to 100 where 0 is no effect and 100 is complete control. A dash (-) response means no test result.

TABLE C

| 125 g ai/ha | Compounds | | | | 62 g ai/ha | Compounds | | | |
|---|---|---|---|---|---|---|---|---|---|
| | 20 | 21 | 22 | 65 | | 20 | 21 | 22 | 65 |
| Postemergence | | | | | | | | | |
| Barnyardgrass | 85 | 90 | 95 | 100 | Barnyardgrass | 75 | 90 | 95 | 100 |
| Blackgrass | 45 | 70 | 100 | 95 | Blackgrass | 40 | 65 | 90 | 90 |
| Buckwheat, Wild | — | — | 100 | 100 | Buckwheat, Wild | — | — | 100 | 100 |
| Canada Thistle | — | — | 100 | 90 | Canada Thistle | — | — | 100 | 98 |
| Chickweed | 98 | — | 100 | 98 | Chickweed | 95 | — | 100 | 95 |
| Corn | 20 | 18 | 25 | 75 | Corn | 5 | 15 | 35 | 65 |

TABLE C-continued

| | | | | | | | | |
|---|---|---|---|---|---|---|---|---|
| Crabgrass, Large | 80 | 70 | 60 | 70 | Crabgrass, Large | 70 | 40 | 15 | 40 |
| Cutleaf Geranium | — | — | 85 | 95 | Cutleaf Geranium | — | — | 85 | 95 |
| Field Poppy | — | 98 | 100 | 100 | Field Poppy | — | 75 | 75 | 98 |
| Field Violet | — | — | 80 | 85 | Field Violet | — | — | 75 | 85 |
| Foxtail, Giant | 95 | 93 | 98 | 98 | Foxtail, Giant | 85 | 90 | 95 | 98 |
| Galium | 95 | 78 | 98 | 98 | Galium | 95 | 98 | 95 | 95 |
| Horseweed | — | 90 | — | — | Horseweed | — | 90 | — | — |
| Johnsongrass | 35 | — | 60 | 85 | Johnsongrass | 30 | — | 50 | 75 |
| Kochia | 98 | 28 | 70 | 75 | Kochia | 90 | 28 | 65 | 65 |
| Lambsquarters | 95 | — | 85 | 100 | Lambsquarters | 95 | — | 100 | 100 |
| Morningglory | 100 | — | 100 | 100 | Morningglory | 100 | — | 100 | 100 |
| Mustard, Wild | — | — | 100 | 100 | Mustard, Wild | — | — | 100 | 100 |
| Nightshade | — | — | — | 100 | Nightshade | — | — | — | 100 |
| Nutsedge, Yellow | 98 | — | 85 | 95 | Nutsedge, Yellow | 95 | — | 90 | 65 |
| Oat, Wild | 90 | 100 | 100 | 100 | Oat, Wild | 70 | 99 | 100 | 100 |
| Oilseed Rape | 0 | — | 100 | 100 | Oilseed Rape | 0 | — | 95 | 100 |
| Pigweed | 98 | — | — | — | Pigweed | 95 | — | — | — |
| Pigweed, Palmer | — | 95 | 75 | 95 | Pigweed, Palmer | — | 30 | 70 | 60 |
| Poinsettia, Wild | — | — | 35 | 100 | Poinsettia, Wild | — | — | 40 | 80 |
| Ragweed | 98 | 98 | 100 | 98 | Ragweed | 95 | 98 | 100 | 98 |
| Ryegrass, Italian | 95 | — | 100 | 95 | Ryegrass, Italian | 95 | — | 95 | 95 |
| Soybean | 20 | 23 | 25 | 85 | Soybean | 10 | 20 | 20 | 80 |
| Speedwell | — | — | 90 | 90 | Speedwell | — | — | 75 | 75 |
| Surinam Grass | — | — | 95 | 95 | Surinam Grass | — | — | 95 | 95 |
| Velvetleaf | 90 | — | 85 | 100 | Velvetleaf | 85 | — | 80 | 100 |
| Waterhemp | 95 | 90 | 90 | 95 | Waterhemp | 95 | 98 | 85 | 95 |
| Wheat | 0 | 80 | 95 | 95 | Wheat | 0 | 78 | 90 | 95 |
| Windgrass | — | — | 100 | 95 | Windgrass | — | — | 100 | 95 |

| | Compounds | | | | | Compounds | | | |
|---|---|---|---|---|---|---|---|---|---|
| 31 g ai/ha | 20 | 21 | 22 | 65 | 16 g ai/ha | 20 | 21 | 22 | 65 |
| | Postemergence | | | | | | | | |
| Barnyardgrass | 75 | 85 | 90 | 85 | Barnyardgrass | 55 | 60 | 85 | 80 |
| Blackgrass | 30 | 60 | 85 | 90 | Blackgrass | 20 | 35 | 70 | 55 |
| Buckwheat, Wild | — | — | 100 | 100 | Buckwheat, Wild | — | — | 95 | 100 |
| Canada Thistle | — | — | 80 | 90 | Canada Thistle | — | — | 80 | 80 |
| Chickweed | 95 | — | 98 | 95 | Chickweed | 95 | — | 100 | 98 |
| Corn | 5 | 0 | 20 | 40 | Corn | 0 | 0 | 0 | 30 |
| Crabgrass, Large | 40 | 70 | 25 | 40 | Crabgrass, Large | 40 | 40 | 10 | 30 |
| Cutleaf Geranium | — | — | 80 | 90 | Cutleaf Geranium | — | — | 70 | 85 |
| Field Poppy | — | 70 | 75 | 98 | Field Poppy | — | 60 | 75 | 80 |
| Field Violet | — | — | 70 | 80 | Field Violet | — | — | 60 | 70 |
| Foxtail, Giant | 85 | 85 | 90 | 95 | Foxtail, Giant | 70 | 70 | 85 | 95 |
| Galium | 95 | 95 | 85 | 90 | Galium | 95 | 90 | 85 | 90 |
| Horseweed | — | 85 | — | — | Horseweed | — | 80 | — | — |
| Johnsongrass | 10 | — | 40 | 40 | Johnsongrass | 5 | — | 20 | 20 |
| Kochia | 85 | 18 | 35 | 55 | Kochia | 80 | 13 | 25 | 40 |
| Lambsquarters | 90 | — | 85 | 98 | Lambsquarters | 75 | — | 80 | 90 |
| Morningglory | 100 | — | 100 | 100 | Morningglory | 100 | — | 85 | 98 |
| Mustard, Wild | — | — | 75 | 100 | Mustard, Wild | — | — | 75 | 98 |
| Nightshade | — | — | — | 100 | Nightshade | — | — | — | 90 |
| Nutsedge, Yellow | 90 | — | 35 | 75 | Nutsedge, Yellow | 90 | — | 10 | 50 |
| Oat, Wild | 55 | 98 | 100 | 100 | Oat, Wild | 35 | 95 | 98 | 98 |
| Oilseed Rape | 0 | — | 90 | 100 | Oilseed Rape | 0 | — | 85 | 95 |
| Pigweed | 95 | — | — | — | Pigweed | 90 | — | — | — |
| Pigweed, Palmer | — | 30 | 70 | 55 | Pigweed, Palmer | — | 30 | 50 | 35 |
| Poinsettia, Wild | — | — | 25 | 95 | Poinsettia, Wild | — | — | 25 | 70 |
| Ragweed | 90 | 95 | 95 | 100 | Ragweed | 85 | 90 | 90 | 98 |
| Ryegrass, Italian | 85 | — | 85 | 95 | Ryegrass, Italian | 65 | — | 70 | 85 |
| Soybean | 10 | 13 | 10 | 75 | Soybean | 0 | 10 | 5 | 65 |
| Speedwell | — | — | 60 | 65 | Speedwell | — | — | 50 | 55 |
| Surinam Grass | — | — | 85 | 90 | Surinam Grass | — | — | 80 | 90 |
| Velvetleaf | 75 | — | 60 | 85 | Velvetleaf | 70 | — | 55 | 40 |
| Waterhemp | 70 | 85 | 85 | 90 | Waterhemp | 75 | 80 | 75 | 80 |
| Wheat | 0 | 65 | 90 | 95 | Wheat | 0 | 45 | 85 | 90 |
| Windgrass | — | — | 85 | 90 | Windgrass | — | — | 85 | 90 |

| | Compounds | | | | | Compounds | | | |
|---|---|---|---|---|---|---|---|---|---|
| 125 g ai/ha | 20 | 21 | 22 | 65 | 62 g ai/ha | 20 | 21 | 22 | 65 |
| | Preemergence | | | | | | | | |
| Barnyardgrass | 100 | 95 | 100 | 75 | Barnyardgrass | 95 | 85 | 85 | 60 |
| Blackgrass | 90 | 85 | 85 | 85 | Blackgrass | 85 | 85 | 30 | 55 |
| Corn | 35 | 20 | 30 | 15 | Corn | 5 | 5 | 5 | 5 |
| Crabgrass, Large | 100 | 65 | 85 | 65 | Crabgrass, Large | 95 | 30 | 75 | 60 |

TABLE C-continued

| | | | | | | | | | |
|---|---|---|---|---|---|---|---|---|---|
| Foxtail, Giant | 100 | 100 | 100 | 100 | Foxtail, Giant | 100 | 98 | 100 | 95 |
| Galium | 100 | 95 | 95 | 100 | Galium | 100 | 95 | 70 | 98 |
| Johnsongrass | 65 | 65 | 70 | 20 | Johnsongrass | 30 | 50 | 50 | 5 |
| Kochia | — | 90 | 95 | 90 | Kochia | — | 70 | 80 | 85 |
| Lambsquarters | 100 | 98 | 100 | 100 | Lambsquarters | 100 | 85 | 90 | 90 |
| Morningglory | 95 | 95 | 85 | 95 | Morningglory | 95 | 80 | — | 98 |
| Nutsedge, Yellow | 98 | 95 | 95 | 95 | Nutsedge, Yellow | 95 | 85 | 75 | 75 |
| Oat, Wild | — | 85 | 95 | 60 | Oat, Wild | — | 85 | 45 | 40 |
| Oilseed Rape | 0 | 100 | 100 | 100 | Oilseed Rape | 0 | 98 | 100 | 98 |
| Pigweed | 100 | — | — | — | Pigweed | 100 | — | — | — |
| Pigweed, Palmer | — | 90 | 100 | 100 | Pigweed, Palmer | — | 70 | 75 | 100 |
| Poinsettia, Wild | — | 25 | 35 | 100 | Poinsettia, Wild | — | 10 | 10 | 70 |
| Ragweed | 100 | 95 | 100 | 100 | Ragweed | 100 | 98 | 90 | 98 |
| Ryegrass, Italian | 100 | 100 | 90 | 95 | Ryegrass, Italian | 100 | 98 | 98 | 95 |
| Soybean | 60 | 0 | 30 | 30 | Soybean | 20 | 0 | 0 | 5 |
| Surinam Grass | — | 100 | 100 | 100 | Surinam Grass | — | 100 | 95 | 70 |
| Velvetleaf | 100 | 95 | 80 | 100 | Velvetleaf | 100 | 75 | 90 | 75 |
| Waterhemp | 100 | 98 | 95 | 95 | Waterhemp | 100 | 95 | 95 | 85 |
| Wheat | 70 | 90 | 100 | 90 | Wheat | 60 | 90 | 95 | 80 |
| Windgrass | — | 98 | 100 | 100 | Windgrass | — | 85 | 85 | 95 |

| | Compounds | | | | | Compounds | | | |
|---|---|---|---|---|---|---|---|---|---|
| 31 g ai/ha | 20 | 21 | 22 | 65 | 61 g ai/ha | 20 | 21 | 22 | 65 |
| | Preemergence | | | | | | | | |
| Barnyardgrass | 85 | 75 | 65 | 20 | Barnyardgrass | 70 | 25 | 5 | 10 |
| Blackgrass | 85 | 50 | 25 | 5 | Blackgrass | 20 | 35 | 5 | 10 |
| Corn | 0 | 0 | 10 | 0 | Corn | 0 | 0 | 5 | 0 |
| Crabgrass, Large | 60 | 25 | 25 | 0 | Crabgrass, Large | 60 | 0 | 5 | 0 |
| Foxtail, Giant | 100 | 85 | 80 | 75 | Foxtail, Giant | 98 | 10 | 0 | 35 |
| Galium | 100 | 95 | 50 | 85 | Galium | 98 | 90 | 20 | 0 |
| Johnsongrass | 40 | 10 | 30 | 5 | Johnsongrass | 35 | 5 | 5 | 0 |
| Kochia | — | 20 | 5 | 70 | Kochia | — | 5 | 0 | 20 |
| Lambsquarters | 75 | 70 | 75 | 80 | Lambsquarters | 80 | 75 | 70 | 20 |
| Morningglory | 85 | 40 | 35 | 90 | Morningglory | 70 | 5 | 25 | 55 |
| Nutsedge, Yellow | 95 | 60 | 50 | 75 | Nutsedge, Yellow | 40 | 30 | 25 | 10 |
| Oat, Wild | — | 70 | 30 | 35 | Oat, Wild | — | 45 | 0 | 30 |
| Oilseed Rape | 0 | 85 | 0 | 5 | Oilseed Rape | 0 | 0 | 0 | 5 |
| Pigweed | 100 | — | — | — | Pigweed | 100 | — | — | — |
| Pigweed, Palmer | — | 55 | 65 | 70 | Pigweed, Palmer | — | 20 | 40 | 50 |
| Poinsettia, Wild | — | 5 | 5 | 35 | Poinsettia, Wild | — | 0 | 5 | 25 |
| Ragweed | 100 | 100 | 60 | 95 | Ragweed | 65 | 45 | 60 | 65 |
| Ryegrass, Italian | 100 | 98 | 25 | 70 | Ryegrass, Italian | 98 | 50 | 5 | 40 |
| Soybean | 0 | 0 | 5 | 0 | Soybean | 0 | 0 | 0 | 0 |
| Surinam Grass | — | 100 | 90 | 55 | Surinam Grass | — | 80 | 75 | 15 |
| Velvetleaf | 100 | 75 | 60 | 60 | Velvetleaf | 85 | 40 | 10 | 40 |
| Waterhemp | 100 | 85 | 85 | 75 | Waterhemp | 65 | 80 | 70 | 80 |
| Wheat | 60 | 90 | 85 | 60 | Wheat | 0 | 5 | 60 | 30 |
| Windgrass | — | 75 | 80 | 80 | Windgrass | — | 50 | 0 | 50 |

| | Compounds | | | | Compounds | | |
|---|---|---|---|---|---|---|---|
| 250 g ai/ha | 20 | 21 | 65 | 125 g ai/ha | 20 | 21 | 65 |
| | Flood | | | | | | |
| Barnyardgrass | 20 | 65 | 100 | Barnyardgrass | 0 | 30 | 30 |
| Ducksalad | 85 | 85 | 100 | Bulrush, Japanese | — | — | 90 |
| Rice, Transplanted | 0 | 15 | 70 | Ducksalad | 70 | 80 | 100 |
| Rice, Water Seeded | 0 | — | — | Rice, Transplanted | 0 | 0 | 20 |
| Sedge, Umbrella | 70 | 0 | 100 | Rice, Water Seeded | 0 | — | 10 |
| | | | | Sedge, Umbrella | 50 | 0 | 100 |

| | Compounds | | | | Compounds | | |
|---|---|---|---|---|---|---|---|
| 62 g ai/ha | 20 | 21 | 65 | 31 g ai/ha | 20 | 21 | 65 |
| | Flood | | | | | | |
| Barnyardgrass | 0 | 0 | 10 | Barnyardgrass | 0 | 0 | 0 |
| Bulrush, Japanese | — | — | 75 | Ducksalad | 0 | 0 | 95 |
| Ducksalad | 30 | 30 | 100 | Rice, Transplanted | 0 | 0 | 0 |
| Rice, Transplanted | 0 | 0 | 0 | Rice, Water Seeded | 0 | — | — |
| Rice, Water Seeded | 0 | — | — | Sedge, Umbrella | 0 | 0 | 95 |
| Sedge, Umbrella | 0 | 0 | 100 | | | | |

Test D

Seeds of plant species selected from blackgrass (*Alopecurus myosuroides*), galium (catchweed bedstraw, *Galium aparine*), kochia (*Kochia scoparia*), oilseed rape (*Brassica napus*), barley, spring (*Hordeum vulgare*), wheat, spring (*Triticum aestivum*), oat, wild (*Avena fatua*), barley, winter (*Hordeum vulgare*) and wheat, winter (*Triticum aestivum*) were planted into a silt loam soil and treated preemergence with test chemicals formulated in a non-phytotoxic solvent mixture which included a surfactant.

At the same time, plants selected from these crop and weed species and also bluegrass (annual bluegrass, *Poa annua*), canarygrass (littleseed canarygrass, *Phalaris minor*), chickweed (common chickweed, *Stellaria media*), bromegrass, downy (downy bromegrass, *Bromus tectorum*), field poppy (*Papaver rhoeas*), field violet (*Viola arvensis*), foxtail, green (*Setaria viridis*), deadnettle (henbit deadnettle, *Lamium amplexicaule*), ryegrass, Italian (*Lolium multiflorum*), lambsquarters (*Chenopodium album*), pigweed (*Amaranthus retroflexus*), chamomile (scentless chamomile, *Matricaria inodora*), Russian thistle (*Salsola kali*), speedwell (bird's-eye speedwell, *Veronica persica*), buckwheat, wild (*Polygonum convolvulus*), mustard, wild (*Sinapis arvensis*), radish, wild (*Raphanus raphanistrum*), windgrass (*Apera spica-venti*), geranium, cutleaf (*Geranium dissectum*) and Canada thistle (*Cirsium arvense*) were planted in pots containing Redi-Earth® planting medium (Scotts Company, 14111 Scottslawn Road, Marysville, Ohio 43041) comprising spaghnum peat moss, vermiculite, wetting agent and starter nutrients and treated with postemergence applications of the test chemicals formulated in the same manner. Plants ranged in height from 2 to 18 cm (1- to 4-leaf stage). Treated plants and controls were maintained in a controlled growth environment for 14 to 21 d after which time all species were compared to controls and visually evaluated. Plant response ratings, summarized in Table D, are based on a scale of 0 to 100 where 0 is no effect and 100 is complete control. A dash (-) response means no test result.

TABLE D

| | Compounds | | | Compounds | | |
|---|---|---|---|---|---|---|
| 125 g ai/ha | 20 | 65 | 62 g ai/ha | 20 | 22 | 65 |
| Postemergence | | | | | | |
| Barley, Spring | 20 | 93 | Barley, Spring | 10 | 85 | 88 |
| Barley, Winter | 15 | 90 | Barley, Winter | 15 | 73 | 83 |
| Blackgrass | 60 | 95 | Blackgrass | 50 | 82 | 93 |
| Bluegrass | 10 | — | Bluegrass | 5 | — | — |
| Bromegrass, Downy | 25 | — | Bromegrass, Downy | 10 | — | — |
| Buckwheat, Wild | 100 | — | Buckwheat, Wild | 99 | — | — |
| Canada Thistle | 95 | — | Canada Thistle | 95 | — | — |
| Canarygrass | 35 | — | Canarygrass | 20 | — | — |
| Chamomile | 100 | 100 | Chamomile | 100 | — | 100 |
| Chickweed | 100 | — | Chickweed | 100 | — | — |
| Deadnettle | 95 | — | Deadnettle | 85 | — | — |
| Field Poppy | 100 | — | Field Poppy | 100 | — | — |
| Field Violet | 95 | — | Field Violet | 95 | — | — |
| Foxtail, Green | 98 | — | Foxtail, Green | 95 | — | — |
| Galium | 99 | 98 | Galium | 90 | 96 | 97 |
| Geranium, Cutleaf | 85 | — | Geranium, Cutleaf | 80 | — | — |
| Kochia | 80 | 90 | Kochia | 70 | 58 | 75 |
| Lambsquarters | 98 | — | Lambsquarters | 90 | — | — |
| Mustard, Wild | 60 | — | Mustard, Wild | 30 | — | — |
| Oat, Wild | 90 | 99 | Oat, Wild | 80 | 98 | 96 |
| Oilseed Rape | 25 | 100 | Oilseed Rape | 20 | 90 | 90 |
| Pigweed | 100 | — | Pigweed | 100 | — | — |
| Radish, Wild | 25 | — | Radish, Wild | 15 | — | — |
| Russian Thistle | 85 | — | Russian Thistle | 80 | — | — |
| Ryegrass, Italian | 90 | — | Ryegrass, Italian | 80 | — | — |
| Speedwell | 85 | — | Speedwell | 80 | — | — |
| Wheat, Spring | 55 | 93 | Wheat, Spring | 35 | 96 | 93 |
| Wheat, Winter | 30 | 92 | Wheat, Winter | 20 | 95 | 90 |
| Windgrass | 75 | — | Windgrass | 50 | — | — |

| | Compounds | | | Compounds | |
|---|---|---|---|---|---|
| 31 g ai/ha | 20 | 22 | 65 | 16 g ai/ha | 20 | 65 |
| Postemergence | | | | | | |
| Barley, Spring | 5 | 67 | 78 | Barley, Spring | 0 | 57 |
| Barley, Winter | 5 | 47 | 72 | Barley, Winter | 0 | 60 |
| Blackgrass | 25 | 75 | 90 | Blackgrass | 15 | 83 |
| Bluegrass | 5 | — | — | Bluegrass | 0 | — |
| Bromegrass, Downy | 5 | — | — | Bromegrass, Downy | 0 | — |
| Buckwheat, Wild | 98 | — | — | Buckwheat, Wild | 100 | — |
| Canada Thistle | 85 | — | — | Canada Thistle | 75 | — |
| Canarygrass | 15 | — | — | Canarygrass | 10 | — |
| Chamomile | 98 | — | 100 | Chamomile | 95 | 99 |
| Chickweed | 99 | — | — | Chickweed | 99 | — |
| Deadnettle | 80 | — | — | Deadnettle | 35 | — |
| Field Poppy | 85 | — | — | Field Poppy | 80 | — |
| Field Violet | 80 | — | — | Field Violet | 80 | — |
| Foxtail, Green | 90 | — | — | Foxtail, Green | 85 | — |
| Galium | 90 | 92 | 97 | Galium | 80 | 85 |
| Geranium, Cutleaf | 75 | — | — | Geranium, Cutleaf | 65 | — |
| Kochia | 70 | 37 | 50 | Kochia | 70 | 35 |
| Lambsquarters | 95 | — | — | Lambsquarters | 90 | — |
| Mustard, Wild | 25 | — | — | Mustard, Wild | 20 | — |
| Oat, Wild | 65 | 93 | 92 | Oat, Wild | 25 | 92 |
| Oilseed Rape | 15 | 73 | 87 | Oilseed Rape | 15 | 85 |
| Pigweed | 98 | — | — | Pigweed | 98 | — |
| Radish, Wild | 0 | — | — | Radish, Wild | 0 | — |
| Russian Thistle | 75 | — | — | Russian Thistle | 80 | — |
| Ryegrass, Italian | 75 | — | — | Ryegrass, Italian | 65 | — |
| Speedwell | 60 | — | — | Speedwell | 50 | — |
| Wheat, Spring | 25 | 90 | 93 | Wheat, Spring | 15 | 90 |
| Wheat, Winter | 15 | 85 | 90 | Wheat, Winter | 10 | 85 |
| Windgrass | 25 | — | — | Windgrass | 15 | — |

| | Compounds | | Compounds | |
|---|---|---|---|---|
| 125 g ai/ha | 20 | 65 | 62 g ai/ha | 20 | 65 |
| Preemergence | | | | |
| Barley, Spring | 10 | 73 | Barley, Spring | 2 | 5 |
| Barley, Winter | 0 | 23 | Barley, Winter | 0 | 7 |
| Blackgrass | 58 | 90 | Blackgrass | 20 | 63 |
| Galium | 100 | 100 | Galium | 97 | 98 |
| Kochia | 80 | 93 | Kochia | 35 | 72 |
| Oat, Wild | 83 | 97 | Oat, Wild | 73 | 83 |
| Oilseed Rape | 0 | 100 | Oilseed Rape | 0 | 85 |
| Wheat, Spring | 62 | 100 | Wheat, Spring | 28 | 90 |
| Wheat, Winter | 17 | 93 | Wheat, Winter | 5 | 80 |

| | Compounds | | Compounds | |
|---|---|---|---|---|
| 31 g ai/ha | 20 | 65 | 16 g ai/ha | 20 | 65 |
| Preemergence | | | | |
| Barley, Spring | 0 | 3 | Barley, Spring | 0 | 0 |
| Barley, Winter | 0 | 3 | Barley, Winter | 0 | 0 |
| Blackgrass | 8 | 23 | Blackgrass | 0 | 13 |
| Galium | 85 | 82 | Galium | 78 | 13 |
| Kochia | 25 | 22 | Kochia | 7 | 12 |
| Oat, Wild | 33 | 80 | Oat, Wild | 22 | 28 |
| Oilseed Rape | 0 | 18 | Oilseed Rape | 0 | 0 |
| Wheat, Spring | 12 | 78 | Wheat, Spring | 0 | 63 |
| Wheat, Winter | 0 | 67 | Wheat, Winter | 0 | 23 |

Test E

Seeds of plant species selected from corn (*Zea mays*), soybean (*Glycine max*), velvetleaf (*Abutilon theophrasti*), lambsquarters (*Chenopodium album*), poinsettia, wild (*Euphorbia heterophylla*), pigweed, palmer (*Amaranthus palmeri*), waterhemp (common waterhemp, *Amaranthus rudis*), surinam grass (*Brachiaria decumbens*), crabgrass, large (*Digitaria sanguinalis*), crabgrass, Brazil (*Digitaria horizontalis*), panicum, fall (*Panicum dichotomiflorum*), foxtail, giant (*Setaria faberii*), foxtail, green (*Setaria viridis*), goosegrass (*Eleusine indica*), johnsongrass (*Sorghum halepense*), ragweed (common ragweed, *Ambrosia elatior*), barnyardgrass (*Echinochloa crus-galli*), sandbur (southern sandbur, *Cenchrus echinatus*), arrowleaf sida (*Sida rhombifolia*), ryegrass, Italian (*Lolium multiflorum*), dayflower, VA (Virginia (VA) dayflower, *Commelina virginica*), field bindweed (*Convolvulus arvensis*), morningglory (*Ipomoea coccinea*), horseweed (*Conyza canadensis*), kochia (*Kochia scoparia*), nutsedge, yellow (*Cyperus esculentus*) and hairy beggarticks (Bidenspilosa), were planted into a silt loam soil and treated preemergence with test chemicals formulated in a non-phytotoxic solvent mixture which included a surfactant.

At the same time, plants selected from these crop and weed species and also waterhemp_RES1, (ALS & Triazine resistant common waterhemp, *Amaranthus rudis*), and waterhemp_RES2, (ALS & HPPD resistant common waterhemp, *Amaranthus rudis*) were planted in pots containing Redi-Earth® planting medium (Scotts Company, 14111 Scottslawn Road, Marysville, Ohio 43041) comprising spaghnum peat moss, vermiculite, wetting agent and starter nutrients were treated with postemergence applications of test chemicals formulated in the same manner. Plants ranged in height from 2 to 18 cm for postemergence treatments (1- to 4-leaf stage). Treated plants and controls were maintained in a greenhouse for 14 to 21 d, after which time all species were compared to controls and visually evaluated. Plant response ratings, summarized in Table E, are based on a scale of 0 to 100 where 0 is no effect and 100 is complete control. A dash (-) response means no test result.

TABLE E

| | Compounds | | | Compounds | |
|---|---|---|---|---|---|
| 125 g ai/ha | 20 | 65 | 62 g ai/ha | 20 | 65 |
| Postemergence | | | Postemergence | | |
| Arrowleaf Sida | 75 | — | Arrowleaf Sida | 70 | — |
| Barnyardgrass | — | 95 | Barnyardgrass | — | 93 |
| Beggarticks | 100 | — | Beggarticks | 95 | — |
| Corn | 10 | 35 | Corn | 10 | 23 |
| Crabgrass, Brazil | 85 | — | Crabgrass, Brazil | 60 | — |
| Crabgrass, Large | — | 35 | Crabgrass, Large | — | 30 |
| Dayflower, VA | 70 | — | Dayflower, VA | 60 | — |
| Field Bindweed | 90 | — | Field Bindweed | 90 | — |
| Foxtail, Giant | — | 95 | Foxtail, Giant | — | 90 |
| Horseweed | 80 | 85 | Horseweed | 85 | 85 |
| Kochia | 90 | — | Kochia | 80 | — |
| Panicum, Fall | 95 | 93 | Panicum, Fall | 90 | 93 |
| Pigweed, Palmer | 60 | 55 | Pigweed, Palmer | 70 | 68 |
| Poinsettia, Wild | 50 | — | Poinsettia, Wild | 40 | — |
| Ragweed | 95 | 93 | Ragweed | 95 | 95 |
| Ryegrass, Italian | 90 | — | Ryegrass, Italian | 85 | — |
| Sandbur | 85 | — | Sandbur | 70 | — |
| Soybean | 40 | 93 | Soybean | 30 | 90 |
| Surinam Grass | — | 93 | Surinam Grass | — | 85 |
| Velvetleaf | — | 90 | Velvetleaf | — | 85 |
| Waterhemp | 90 | 97 | Waterhemp | 95 | 99 |
| Waterhemp_RES1 | 95 | — | Waterhemp_RES1 | 80 | — |
| Waterhemp_RES2 | 70 | — | Waterhemp_RES2 | 60 | — |

TABLE E-continued

| | Compounds | | | Compounds | |
|---|---|---|---|---|---|
| 31 g ai/ha | 20 | 65 | 16 g ai/ha | 20 | 65 |
| Postemergence | | | Postemergence | | |
| Arrowleaf Sida | 70 | — | Arrowleaf Sida | 60 | — |
| Barnyardgrass | — | 88 | Barnyardgrass | — | 80 |
| Beggarticks | 95 | — | Beggarticks | 90 | — |
| Corn | 20 | 20 | Corn | 5 | 0 |
| Crabgrass, Brazil | 40 | — | Crabgrass, Brazil | 20 | — |
| Crabgrass, Large | — | 13 | Crabgrass, Large | — | 10 |
| Dayflower, VA | 50 | — | Dayflower, VA | 30 | — |
| Field Bindweed | 90 | — | Field Bindweed | 75 | — |
| Foxtail, Giant | — | 88 | Foxtail, Giant | — | 70 |
| Horseweed | 75 | 75 | Horseweed | 80 | 65 |
| Kochia | 75 | — | Kochia | 80 | — |
| Panicum, Fall | 90 | 88 | Panicum, Fall | 70 | 80 |
| Pigweed, Palmer | 65 | 43 | Pigweed, Palmer | 60 | 35 |
| Poinsettia, Wild | 50 | — | Poinsettia, Wild | 20 | — |
| Ragweed | 85 | 93 | Ragweed | 90 | 95 |
| Ryegrass, Italian | 80 | — | Ryegrass, Italian | 70 | — |
| Sandbur | 60 | — | Sandbur | 60 | — |
| Soybean | 15 | 80 | Soybean | 10 | 70 |
| Surinam Grass | — | 78 | Surinam Grass | — | 73 |
| Velvetleaf | — | 90 | Velvetleaf | — | 75 |
| Waterhemp | 75 | 88 | Waterhemp | 75 | 83 |
| Waterhemp_RES1 | 90 | — | Waterhemp_RES1 | 75 | — |
| Waterhemp_RES2 | 40 | — | Waterhemp_RES2 | 15 | — |

| | Compounds | | | Compounds | |
|---|---|---|---|---|---|
| 125 g ai/ha | 20 | 65 | 62 g ai/ha | 20 | 65 |
| Preemergence | | | Preemergence | | |
| Arrowleaf Sida | 85 | — | Arrowleaf Sida | 80 | — |
| Barnyardgrass | 100 | 60 | Barnyardgrass | 80 | 38 |
| Beggarticks | 100 | — | Beggarticks | 95 | — |
| Corn | 0 | 43 | Corn | 0 | 20 |
| Crabgrass, Brazil | 100 | — | Crabgrass, Brazil | 100 | — |
| Crabgrass, Large | 80 | 48 | Crabgrass, Large | 75 | 38 |
| Dayflower, VA | 5 | — | Dayflower, VA | 0 | — |
| Field Bindweed | 100 | — | Field Bindweed | 90 | — |
| Foxtail, Giant | 98 | 100 | Foxtail, Giant | 90 | 90 |
| Foxtail, Green | 100 | — | Foxtail, Green | 100 | — |
| Goosegrass | 75 | — | Goosegrass | 30 | — |
| Horseweed | — | 100 | Horseweed | — | 100 |
| Johnsongrass | 50 | — | Kochia | 70 | — |
| Kochia | 85 | — | Lambsquarters | 98 | — |
| Lambsquarters | 100 | — | Morningglory | 60 | — |
| Morningglory | 100 | — | Nutsedge, Yellow | 75 | — |
| Nutsedge, Yellow | 75 | — | Panicum, Fall | 98 | 100 |
| Panicum, Fall | 100 | 99 | Pigweed, Palmer | 95 | 80 |
| Pigweed, Palmer | 98 | 90 | Poinsettia, Wild | 0 | — |
| Poinsettia, Wild | 0 | — | Ragweed | 95 | 100 |
| Ragweed | 98 | 100 | Ryegrass, Italian | 98 | — |
| Ryegrass, Italian | 95 | — | Sandbur | 85 | — |
| Sandbur | 90 | — | Soybean | 15 | 15 |
| Soybean | 0 | 43 | Surinam Grass | 90 | 85 |
| Surinam Grass | 100 | 100 | Velvetleaf | 90 | 100 |
| Velvetleaf | 100 | 100 | Waterhemp | 98 | 99 |
| Waterhemp | 100 | 99 | | | |

| | Compounds | | | Compounds | |
|---|---|---|---|---|---|
| 31 g ai/ha | 20 | 65 | 16 g ai/ha | 20 | 65 |
| Preemergence | | | Preemergence | | |
| Arrowleaf Sida | 90 | — | Arrowleaf Sida | 90 | — |
| Barnyardgrass | 75 | 40 | Barnyardgrass | 0 | 0 |
| Beggarticks | 90 | — | Beggarticks | 20 | — |
| Corn | 0 | 5 | Corn | 0 | 0 |
| Crabgrass, Brazil | 90 | — | Crabgrass, Brazil | 75 | — |
| Crabgrass, Large | 65 | 18 | Crabgrass, Large | 65 | 45 |
| Dayflower, VA | 0 | — | Dayflower, VA | 0 | — |
| Field Bindweed | 85 | — | Field Bindweed | 5 | — |
| Foxtail, Giant | 60 | 78 | Foxtail, Giant | 10 | 5 |
| Foxtail, Green | 80 | — | Foxtail, Green | 35 | — |

TABLE E-continued

| | | | | | |
|---|---|---|---|---|---|
| Goosegrass | 0 | — | Goosegrass | 0 | — |
| Horseweed | — | 100 | Horseweed | — | 100 |
| Johnsongrass | 0 | — | Johnsongrass | 0 | — |
| Kochia | 50 | — | Kochia | 0 | — |
| Lambsquarters | 95 | — | Lambsquarters | 80 | — |
| Morningglory | 20 | — | Morningglory | 10 | — |
| Nutsedge, Yellow | 15 | — | Nutsedge, Yellow | 10 | — |
| Panicum, Fall | 98 | 99 | Panicum, Fall | 75 | 75 |
| Pigweed, Palmer | 35 | 58 | Pigweed, Palmer | 20 | 40 |
| Poinsettia, Wild | 0 | — | Poinsettia, Wild | 0 | — |
| Ragweed | 95 | 99 | Ragweed | 60 | 75 |
| Ryegrass, Italian | 25 | — | Ryegrass, Italian | 0 | — |
| Sandbur | 75 | — | Sandbur | 30 | — |
| Soybean | — | 13 | Soybean | 0 | 23 |
| Surinam Grass | 80 | 92 | Surinam Grass | 35 | 8 |
| Velvetleaf | 80 | 100 | Velvetleaf | 50 | 75 |
| Waterhemp | 70 | 90 | Waterhemp | 60 | 75 |

Test F

Three plastic pots (ca. 16-cm diameter) per rate were partially filled with sterilized Tama silt loam soil comprising a 35:50:15 ratio of sand, silt and clay and 2.6% organic matter. Separate plantings for each of the three pots were as follows. Seeds from the U.S. of monochoria (*Monochoria vaginalis*), sedge, umbrella (small-flower umbrella sedge, *Cyperus difformis*) and redstem (purple redstem, *Ammannia coccinea*), were planted into one 16-cm pot for each rate. Seeds from the U.S. of rice flatsedge (*Cyperus iria*), sprangletop, Brdd. (bearded sprangletop, *Leptochloa fascicularis*), one stand of 9 or 10 water seeded rice seedlings (Rice, W. S. Jap, *Oryza sativa* cv. 'Japonica-M202' or Rice, W. S. Ind, 'Indica'), and two stands of 3 or 4 transplanted rice seedlings (*Oryza sativa* cv. 'Japonica-M202') were planted into one 16-cm pot for each rate. Seeds from the U.S. of barnyardgrass (*Echinochloa crus-galli*), and late watergrass (*Echinochloa oryzicola*) were planted into one 16-cm pot for each rate.

Plantings were sequential so that crop and weed species were at the 2.0 to 2.5-leaf stage at time of treatment.

Potted plants were grown in a greenhouse with day/night temperature settings of 30/27° C., and supplemental balanced lighting was provided to maintain a 16-hour photoperiod. Test pots were maintained in the greenhouse until test completion.

At time of treatment, test pots were flooded to 3 cm above the soil surface, treated by application of test compounds directly to the paddy water, and then maintained at that water depth for the duration of the test. Effects of treatments on rice and weeds were visually evaluated by comparison to untreated controls after 21 d. Plant response ratings, summarized in Table F, are based on a scale of 0 to 100 where 0 is no effect and 100 is complete control. A dash (-) response means no test result.

TABLE F

| 250 g ai/ha | Compound 20 | 125 g ai/ha | Compound 20 | 65 |
|---|---|---|---|---|
| Flood | | Flood | | |
| Barnyardgrass | 65 | Barnyardgrass | 43 | 60 |
| Flatsedge | 100 | Flatsedge | 97 | — |
| Monochoria | 99 | Monochoria | 95 | 100 |
| Redstem | 99 | Redstem | 92 | — |
| Rice, Transplanted | 0 | Rice, Transplanted | 0 | 15 |
| Rice, Water Seeded | 23 | Rice, Water Seeded | 5 | 0 |

TABLE F-continued

| | | | |
|---|---|---|---|
| Sedge, Umbrella | 100 | Sedge, Umbrella | 95 | — |
| Sprangletop, Brdd. | — | Sprangletop, Brdd. | — | 100 |
| Watergrass, Late | 73 | Watergrass, Late | 50 | 55 |

| 62 g ai/ha | Compound 20 | 64 g ai/ha | Compound 65 |
|---|---|---|---|
| Flood | | Flood | |
| Barnyardgrass | 0 | Barnyardgrass | 10 |
| Flatsedge | 85 | Monochoria | 100 |
| Monochoria | 90 | Rice, Transplanted | 0 |
| Redstem | 0 | Rice, Water Seeded | 0 |
| Rice, Transplanted | 0 | Sprangletop, Brdd. | 98 |
| Rice, Water Seeded | 0 | Watergrass, Late | 20 |
| Sedge, Umbrella | 60 | | |
| Sprangletop, Brdd. | — | | |
| Watergrass, Late | 35 | | |

| 31 g ai/ha | Compound 20 |
|---|---|
| Flood | |
| Barnyardgrass | 0 |
| Flatsedge | 70 |
| Monochoria | 10 |
| Redstem | 0 |
| Rice, Transplanted | 0 |
| Rice, Water Seeded | 0 |
| Sedge, Umbrella | 0 |
| Sprangletop, Brdd. | — |
| Watergrass, Late | 0 |

Test G

This test evaluated the effect of mixtures of Cpd. No. 20 with (b15C1) on several plant species. Seeds of plant species selected from corn (ZEAMD; *Zea mays*, cv. 'Pioneer 1184'), soybean (GLXMA; *Glycine max*, cv. Pioneer 35T58), giant foxtail (SETFA; *Setaria faberi*), barnyardgrass (ECHCG; *Echinochloa crus-galli*), large crabgrass (DIGSA; *Digitaria sanguinalis*), palmer amaranth (AMAPA; *Amaranthus palmeri*), common waterhemp (AMATU; *Amaranthus rudis*), and common ragweed (AMBEL; *Ambrosia artemisiifolia*) were planted in pots containing Tama Silt Loam soil and treated preemergence with a directed soil spray using test chemicals formulated in a non-phytotoxic solvent mixture which included a surfactant.

Treated plants and untreated controls were maintained in a greenhouse for approximately 21 d, after which time all treated plants were compared to untreated controls and visually evaluated for injury. Plant response ratings, summarized in Table G, are based on a 0 to 100 scale where 0 is no effect and 100 is complete control. A dash (-) response means no test result. Test results are presented as a mean of 4 reps.

TABLE G

Observed Results from Cpd. No. 20 Alone and in Combination with (b15C1)*

| Application Rate (g a.i./ha) | | | | | |
|---|---|---|---|---|---|
| Cpd. No. 20 | (b15C1) | ZEAMD | GLXMA | SETFA | ECHCG |
| 62 | — | 0 | 24 | 74 | 70 |
| 31 | — | 0 | 18 | 88 | 51 |
| 16 | — | 0 | 0 | 66 | 21 |
| — | 31 | 0 | 0 | 74 | 35 |

TABLE G-continued

Observed Results from
Cpd. No. 20 Alone and in Combination with (b15C1)*

| — | 16 | 0 | 0 | 34 | 0 |
|---|----|---|---|----|---|
| — | 8 | 0 | 0 | 5 | 0 |
| 62 | 31 | 0 | 16 | 100 | 94 |
| 62 | 16 | 0 | 26 | 100 | 94 |
| 62 | 8 | 0 | 26 | 100 | 76 |
| 31 | 31 | 0 | 11 | 100 | 82 |
| 31 | 16 | 0 | 9 | 100 | 75 |
| 31 | 8 | 0 | 4 | 100 | 71 |
| 16 | 31 | 0 | 5 | 100 | 74 |
| 16 | 16 | 0 | 0 | 100 | 53 |
| 16 | 8 | 8 | 0 | 94 | 44 |

Application Rate (g a.i./ha)

| Cpd. No. 20 | (b15C1) | DIGSA | AMBEL | AMATU | AMAPA |
|---|---|---|---|---|---|
| 62 | — | 25 | 74 | 99 | 78 |
| 31 | — | 11 | 73 | 96 | 70 |
| 16 | — | 9 | 48 | 55 | 73 |
| — | 31 | 100 | 100 | 20 | 97 |
| — | 16 | 90 | 90 | 0 | 88 |
| — | 8 | 54 | 54 | 0 | 60 |
| 62 | 31 | 100 | 100 | 93 | 100 |
| 62 | 16 | 96 | 100 | 99 | 96 |
| 62 | 8 | 69 | 88 | 94 | 86 |
| 31 | 31 | 83 | 99 | 95 | 95 |
| 31 | 16 | 79 | 100 | 86 | 93 |
| 31 | 8 | 50 | 90 | 82 | 83 |
| 16 | 31 | 93 | 99 | 83 | 95 |
| 16 | 16 | 59 | 94 | 75 | 94 |
| 16 | 8 | 16 | 84 | 83 | 74 |

*Application rates are grams of active ingredient per hectare (g a.i./ha).

Test H

This test evaluated the effect of mixtures of Cpd. No. 20 with atrazine or glyphosate on several plant species. Seeds of plant species selected from corn (ZEAMD; *Zea mays*, cv. 'Pioneer 1184'), soybean (GLXMA; *Glycine max*, cv. Pioneer 35T58), giant foxtail (SETFA; *Setaria faberi*), Surinamgrass (BRADC; *Brachiaria decumbens*), fall panicum (PANDI; *Panicum dichotomiflorum*), velvetleaf (ABUTH; *Abutilon threophrasti*), mare's tail (ERICA; *Conyza canadensis*), barnyardgrass (ECHCG; *Echinochloa crusgalli*), large crabgrass (DIGSA; *Digitaria sanguinalis*), palmer amaranth (AMAPA; *Amaranthus palmeri*), common waterhemp (AMATU; *Amaranthus rudis*), E. black nightshade (SOLPT; *Solanum ptycanthum*), and common ragweed (AMBEL; *Ambrosia artemisiifolia*) were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence using test chemicals formulated in a non-phytotoxic solvent mixture which included a surfactant. Plants ranged in height from 2 to 10 cm and were in the one- to two-leaf stage for the postemergence treatment. Treated plants and untreated controls were maintained in a greenhouse for approximately 14 d, after which time all treated plants were compared to untreated controls and visually evaluated for injury. Plant response ratings, summarized in Tables H1 & H2, are based on a 0 to 100 scale where 0 is no effect and 100 is complete control. A dash (-) response means no test result. Test results are presented as a mean of 4 reps.

TABLE H1

Observed Results from
Cpd. No. 20 Alone and in Combination with Atrazine*

Application Rate (g a.i./ha)

| Cpd. No. 20 | Atrazine | ZEAMD | GLXMA | SETFA | ECHCG | DIGSA |
|---|---|---|---|---|---|---|
| 125 | — | 0 | 18 | 80 | 100 | 36 |
| 62 | — | 0 | 21 | 79 | 100 | 29 |
| 31 | — | 0 | 30 | 71 | 100 | 34 |
| — | 250 | 0 | 33 | 0 | 100 | 0 |
| — | 125 | 0 | 15 | 0 | 96 | 0 |
| 125 | 250 | 0 | 63 | 98 | 78 | 73 |
| 125 | 125 | 0 | 44 | 97 | 100 | 60 |
| 62 | 250 | 0 | 53 | 98 | 100 | 44 |
| 62 | 125 | 0 | 49 | 91 | 100 | 40 |
| 31 | 250 | 0 | 59 | 88 | 100 | 34 |
| 31 | 125 | 0 | 38 | 83 | 96 | 29 |

Application Rate (g a.i./ha)

| Cpd. No. 20 | Atrazine | ERICA | AMATU | AMBEL | AMAPA | ABUTH |
|---|---|---|---|---|---|---|
| 125 | — | 88 | 80 | 98 | 54 | 94 |
| 62 | — | 85 | 80 | 94 | 36 | 89 |
| 31 | — | 85 | 70 | 89 | 10 | 76 |
| — | 250 | 83 | 39 | 80 | 74 | 10 |
| — | 125 | 23 | 30 | 48 | 76 | 0 |
| 125 | 250 | 97 | 96 | 100 | 99 | 100 |
| 125 | 125 | 94 | 98 | 100 | 98 | 100 |
| 62 | 250 | 98 | 98 | 100 | 89 | 100 |
| 62 | 125 | 93 | 97 | 100 | 94 | 98 |
| 31 | 250 | 99 | 86 | 98 | 85 | 100 |
| 31 | 125 | 91 | 93 | 99 | 86 | 98 |

Application Rate (g a.i./ha)

| Cpd. No. 20 | Atrazine | PANDI | SOLPT | BRADC |
|---|---|---|---|---|
| 125 | — | 89 | 95 | 93 |
| 62 | — | 84 | 93 | 84 |
| 31 | — | 73 | 86 | 73 |
| — | 250 | 0 | 64 | 0 |
| — | 125 | 0 | 28 | 0 |
| 125 | 250 | 95 | 100 | 94 |
| 125 | 125 | 89 | 100 | 94 |
| 62 | 250 | 89 | 100 | 84 |
| 62 | 125 | 86 | 99 | 81 |
| 31 | 250 | 74 | 100 | 74 |
| 31 | 125 | 70 | 99 | 73 |

*Application rates are grams of active ingredient per hectare (g a.i./ha).

TABLE H2

Observed Results from
Cpd. No. 20 Alone and in Combination with Glyphosate*

Application Rate (g a.i./ha)

| Cpd. No. 20 | Glyphosate | ZEAMD | GLXMA | SETFA | ECHCG | DIGSA |
|---|---|---|---|---|---|---|
| 125 | — | 0 | 18 | 80 | 100 | 36 |
| 62 | — | 0 | 21 | 79 | 100 | 29 |
| 31 | — | 0 | 30 | 71 | 100 | 34 |
| — | 125 | 74 | 25 | 75 | 31 | 90 |
| — | 62 | 68 | 10 | 74 | 6 | 86 |
| 125 | 125 | 76 | 29 | 78 | 69 | 84 |

TABLE H2-continued

Observed Results from
Cpd. No. 20 Alone and in Combination with Glyphosate*

Application Rate (g a.i./ha)

| Cpd. No. 20 | Gly-phosate | ZEAMD | GLXMA | SETFA | ECHCG | DIGSA |
|---|---|---|---|---|---|---|
| 125 | 62 | 54 | 24 | 80 | 65 | 55 |
| 62 | 125 | 75 | 15 | 75 | 51 | 89 |
| 62 | 62 | 55 | 13 | 75 | 50 | 61 |
| 31 | 125 | 75 | 23 | 73 | 30 | 89 |
| 31 | 62 | 58 | 24 | 73 | 25 | 65 |

Application Rate (g a.i./ha)

| Cpd. No. 20 | Gly-phosate | ERICA | AMATU | AMBEL | AMAPA | ABUTH |
|---|---|---|---|---|---|---|
| 125 | — | 88 | 80 | 98 | 54 | 94 |
| 62 | — | 85 | 80 | 94 | 36 | 89 |
| 31 | — | 85 | 70 | 89 | 10 | 76 |
| — | 125 | 0 | 25 | 84 | 23 | 15 |
| — | 62 | 0 | 11 | 68 | 43 | 0 |
| 125 | 125 | 89 | 94 | 88 | 58 | 84 |
| 125 | 62 | 90 | 91 | 95 | 53 | 95 |
| 62 | 125 | 86 | 71 | 88 | 58 | 85 |
| 62 | 62 | 88 | 76 | 86 | 48 | 93 |
| 31 | 125 | 85 | 59 | 85 | 40 | 78 |
| 31 | 62 | 85 | 64 | 80 | 28 | 81 |

Application Rate (g a.i./ha)

| Cpd. No. 20 | Glyphosate | PANDI | SOLPT | BRADC |
|---|---|---|---|---|
| 125 | — | 89 | 95 | 93 |
| 62 | — | 84 | 93 | 84 |
| 31 | — | 73 | 86 | 73 |
| — | 125 | 51 | 51 | 69 |
| — | 62 | 28 | 43 | 68 |
| 125 | 125 | 89 | 95 | 91 |
| 125 | 62 | 89 | 95 | 86 |
| 62 | 125 | 84 | 93 | 86 |
| 62 | 62 | 75 | 93 | 74 |
| 31 | 125 | 66 | 94 | 84 |
| 31 | 62 | 56 | 93 | 73 |

*Application rates are grams of active ingredient per hectare (g a.i./ha).

Test I

This test evaluated the effect of mixtures of Cpd. No. 20 with saflufenacil or pyroxasulfone on several plant species. Seeds of plant species selected from corn (ZEAMD; *Zea mays*, cv. 'Pioneer 1184'), soybean (GLXMA; *Glycine max*, cv. Pioneer 35T58), giant foxtail (SETFA; *Setaria faberi*), palmer amaranth (AMAPA; *Amaranthus palmeri*), common waterhemp (AMATU; *Amaranthus rudis*), mare's tail (ERICA; *Conyza canadensis*), and common ragweed (AMBEL; *Ambrosia artemisiifolia*) were planted in pots containing Tama Silt Loam soil and treated preemergence with a directed soil spray using test chemicals formulated in a non-phytotoxic solvent mixture which included a surfactant.

At the same time, plants selected from these crop and weed species were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence with test chemicals formulated in the same manner. Plants ranged in height from 2 to 10 cm and were in the one- to two-leaf stage for the postemergence treatment. Treated plants and untreated controls were maintained in a greenhouse for approximately 14-21 d, after which time all treated plants were compared to untreated controls and visually evaluated for injury. Plant response ratings, summarized in Tables 11 to 14, are based on a 0 to 100 scale where 0 is no effect and 100 is complete control. A dash (-) response means no test result. Test results are presented as a mean of 4 reps.

TABLE I1

Observed Preemergence Results from
Cpd. No. 20 Alone and in Combination with Saflufenacil*

Application Rate (g a.i./ha)

| Cpd. No. 20 | Saflufenacil | ZEAMD | GLXMA | SETFA | AMAPA |
|---|---|---|---|---|---|
| 62 | — | 0 | 0 | 99 | 61 |
| 31 | — | 0 | 0 | 84 | 23 |
| 16 | — | 0 | 0 | 39 | 44 |
| 8 | — | 0 | 0 | 25 | 23 |
| — | 8 | 0 | 0 | 0 | 88 |
| — | 4 | 0 | 0 | 0 | 35 |
| 62 | 8 | 0 | 0 | 99 | 96 |
| 62 | 4 | 0 | 0 | 97 | 85 |
| 31 | 8 | 0 | 0 | 93 | 100 |
| 31 | 4 | 0 | 0 | 86 | 86 |
| 16 | 8 | 0 | 0 | 74 | 100 |
| 16 | 4 | 0 | 0 | 74 | 63 |
| 8 | 8 | 0 | 0 | 16 | 100 |
| 8 | 4 | 0 | 0 | 15 | 55 |

Application Rate (g a.i./ha)

| Cpd. No. 20 | Saflufenacil | AMATU | AMBEL | ERICA |
|---|---|---|---|---|
| 62 | — | 80 | 98 | 100 |
| 31 | — | 0 | 69 | 100 |
| 16 | — | 0 | 10 | 100 |
| 8 | — | 0 | 0 | 93 |
| — | 8 | 84 | 100 | 100 |
| — | 4 | 55 | 96 | 94 |
| 62 | 8 | 99 | 100 | 100 |
| 62 | 4 | 83 | 90 | 100 |
| 31 | 8 | 89 | 100 | 100 |
| 31 | 4 | 66 | 28 | 100 |
| 16 | 8 | 100 | 89 | 100 |
| 16 | 4 | 60 | 49 | 100 |
| 8 | 8 | 68 | 100 | 100 |
| 8 | 4 | 38 | 96 | 100 |

*Application rates are grams of active ingredient per hectare (g a.i./ha).

TABLE I2

Observed Preemergence Results from Cpd. No. 20 Alone and in Combination with Pyroxasulfone*

Application Rate (g a.i./ha)

| Cpd. No. 20 | Pyroxasulfone | ZEAMD | GLXMA | SETFA | AMAPA | AMATU |
|---|---|---|---|---|---|---|
| 62 | — | 0 | 0 | 99 | 61 | 80 |
| 31 | — | 0 | 0 | 84 | 23 | 0 |

TABLE I2-continued

Observed Preemergence Results from Cpd. No. 20 Alone and in Combination with Pyroxasulfone*

| Cpd. No. 20 | Pyroxasulfone | | | | | |
|---|---|---|---|---|---|---|
| 16 | — | 0 | 0 | 39 | 44 | 0 |
| 8 | — | 0 | 0 | 25 | 23 | 0 |
| — | 8 | 0 | 0 | 98 | 38 | 45 |
| — | 4 | 0 | 0 | 76 | 0 | 5 |
| 62 | 8 | 0 | 0 | 100 | 91 | 100 |
| 62 | 4 | 0 | 0 | 100 | 98 | 92 |
| 31 | 8 | 0 | 0 | 100 | 75 | 76 |
| 31 | 4 | 0 | 0 | 99 | 90 | 64 |
| 16 | 8 | 0 | 0 | 97 | 73 | 60 |
| 16 | 4 | 0 | 0 | 97 | 46 | 70 |
| 8 | 8 | 0 | 0 | 98 | 63 | 74 |
| 8 | 4 | 0 | 0 | 97 | 51 | 44 |

| Application Rate (g a.i./ha) | | | |
|---|---|---|---|
| Cpd. No. 20 | Pyroxasulfone | AMBEL | ERICA |
| 62 | — | 98 | 100 |
| 31 | — | 69 | 100 |
| 16 | — | 10 | 100 |
| 8 | — | 0 | 93 |
| — | 8 | 0 | 100 |
| — | 4 | 0 | 79 |
| 62 | 8 | 88 | 100 |
| 62 | 4 | 96 | 100 |
| 31 | 8 | 100 | 100 |
| 31 | 4 | 90 | 100 |
| 16 | 8 | 73 | 100 |
| 16 | 4 | 31 | 100 |
| 8 | 8 | 25 | 100 |
| 8 | 4 | 0 | 100 |

*Application rates are grams of active ingredient per hectare (g a.i./ha).

TABLE I3

Observed Postemergence Results from Cpd. No. 20 Alone and in Combination with Saflufenacil*

| Application Rate (g a.i./ha) | | | | | | |
|---|---|---|---|---|---|---|
| Cpd. No. 20 | Saflufenacil | ZEAMD | GLXMA | SETFA | AMAPA | AMATU |
| 62 | — | 0 | 16 | 78 | 65 | 83 |
| 31 | — | 0 | 15 | 76 | 50 | 81 |
| 16 | — | 0 | 0 | 80 | 40 | 59 |
| 8 | — | 0 | 0 | 55 | 38 | 50 |
| — | 8 | 70 | 91 | 55 | 70 | 90 |
| — | 4 | 15 | 74 | 23 | 84 | 85 |
| 62 | 8 | 75 | 96 | 97 | 96 | 98 |
| 62 | 4 | 63 | 90 | 93 | 86 | 95 |
| 31 | 8 | 69 | 95 | 94 | 98 | 98 |
| 31 | 4 | 36 | 90 | 83 | 83 | 298 |
| 16 | 8 | 74 | 95 | 91 | 100 | 100 |
| 16 | 4 | 15 | 91 | 74 | 93 | 86 |
| 8 | 8 | 65 | 91 | 75 | 93 | 91 |
| 8 | 4 | 15 | 90 | 60 | 85 | 93 |

| Application Rate (g a.i./ha) | | | |
|---|---|---|---|
| Cpd. No. 20 | Saflufenacil | AMBEL | ERICA |
| 62 | — | 94 | 90 |
| 31 | — | 100 | 90 |
| 16 | — | 90 | 86 |
| 8 | — | 86 | 85 |
| — | 8 | 100 | 100 |
| — | 4 | 100 | 95 |
| 62 | 8 | 100 | 100 |
| 62 | 4 | 100 | 100 |
| 31 | 8 | 100 | 100 |
| 31 | 4 | 100 | 93 |
| 16 | 8 | 100 | 100 |
| 16 | 4 | 100 | 98 |

TABLE I3-continued

Observed Postemergence Results from Cpd. No. 20 Alone and in Combination with Saflufenacil*

| 8 | 8 | 100 | 96 |
| 8 | 4 | 100 | 95 |

*Application rates are grams of active ingredient per hectare (g a.i./ha).

TABLE I4

Observed Postemergence Results from Cpd. No. 20 Alone and in Combination with Pyroxasulfone*

| Application Rate (g a.i./ha) | | | | | | |
|---|---|---|---|---|---|---|
| Cpd. No. 20 | Pyroxasulfone | ZEAMD | GLXMA | SETFA | AMAPA | AMATU |
| 62 | — | 0 | 16 | 78 | 65 | 83 |
| 31 | — | 0 | 15 | 76 | 50 | 81 |
| 16 | — | 0 | 0 | 80 | 40 | 59 |
| 8 | — | 0 | 0 | 55 | 38 | 50 |
| — | 8 | 0 | 15 | 6 | 0 | 0 |
| — | 4 | 0 | 0 | 0 | 15 | 0 |
| 62 | 8 | 0 | 20 | 80 | 73 | 80 |
| 62 | 4 | 28 | 19 | 83 | 61 | 81 |
| 31 | 8 | 0 | 23 | 76 | 63 | 76 |
| 31 | 4 | 0 | 15 | 76 | 50 | 66 |
| 16 | 8 | 0 | 20 | 74 | 48 | 60 |
| 16 | 4 | 0 | 15 | 73 | 43 | 68 |
| 8 | 8 | 0 | 14 | 73 | 45 | 63 |
| 8 | 4 | 0 | 0 | 60 | 51 | 60 |

| Application Rate (g a.i./ha) | | | |
|---|---|---|---|
| Cpd. No. 20 | Pyroxasulfone | AMBEL | ERICA |
| 62 | — | 94 | 90 |
| 31 | — | 100 | 90 |
| 16 | — | 90 | 86 |
| 8 | — | 86 | 85 |
| — | 8 | 24 | 0 |
| — | 4 | 0 | 0 |
| 62 | 8 | 99 | 93 |
| 62 | 4 | 97 | 89 |
| 31 | 8 | 94 | 90 |
| 31 | 4 | 97 | 85 |
| 16 | 8 | 91 | 89 |
| 16 | 4 | 91 | 88 |
| 8 | 8 | 85 | 86 |
| 8 | 4 | 85 | 85 |

*Application rates are grams of active ingredient per hectare (g a.i./ha).

Test J

This test evaluated the effect of mixtures of Cpd. No. 20 with (b15C2) on several plant species. Seeds of plant species selected from corn (ZEAMD; *Zea mays*, cv. 'Pioneer 1184'), soybean (GLXMA; *Glycine max*, cv. Pioneer 35T58), giant foxtail (SETFA; *Setaria faberi*), palmer amaranth (AMAPA; *Amaranthus palmeri*), common waterhemp (AMATU; *Amaranthus rudis*), mare's tail (ERICA; *Conyza canadensis*), and common ragweed (AMBEL; *Ambrosia artemisiifolia*) were planted in pots containing Tama Silt Loam soil and treated preemergence with a directed soil spray using test chemicals formulated in a non-phytotoxic solvent mixture which included a surfactant.

At the same time, plants selected from these crop and weed species were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence with test chemicals formulated in the same manner. Plants ranged in height from 2 to 10 cm and were in the one- to two-leaf stage for the postemergence treatment. Treated plants and untreated controls were maintained in a greenhouse for approximately 14-21 d, after which time all treated plants were compared to untreated controls and visually evaluated for injury. Plant response ratings, summarized in Tables J1 & J2, are based on a 0 to 100 scale where 0 is no effect and 100 is complete control. A dash (-) response means no test result. Test results are presented as a mean of 4 reps.

TABLE J1

Observed Preemergence Results from Cpd. No. 20 Alone and in Combination with (b15C2)*

| Application Rate (g a.i./ha) | | | | | | |
|---|---|---|---|---|---|---|
| Cpd. No. 20 | (b15C2) | ZEAMD | GLXMA | SETFA | AMAPA | AMATU |
| 62 | — | 0 | 20 | 89 | 60 | 50 |
| 31 | — | 0 | 0 | 78 | 48 | 29 |
| 16 | — | 0 | 0 | 63 | 46 | 20 |
| 8 | — | 0 | 0 | 15 | 20 | 0 |
| — | 62 | 0 | 0 | 100 | 100 | 100 |
| — | 31 | 0 | 0 | 95 | 100 | 100 |
| — | 16 | 0 | 0 | 64 | 90 | 79 |
| — | 8 | 0 | 0 | 8 | 63 | 20 |
| 62 | 62 | 0 | 20 | 100 | 100 | 100 |
| 62 | 31 | 0 | 5 | 100 | 100 | 100 |
| 62 | 16 | 0 | 31 | 100 | 100 | 100 |
| 62 | 8 | 0 | 9 | 100 | 89 | 94 |
| 31 | 62 | 0 | 8 | 100 | 100 | 99 |
| 31 | 31 | 0 | 21 | 100 | 96 | 100 |
| 31 | 16 | 0 | 29 | 100 | 96 | 100 |
| 31 | 8 | 0 | 19 | 100 | 99 | 94 |
| 16 | 62 | 0 | 25 | 100 | 86 | 100 |
| 16 | 31 | 0 | 9 | 100 | 100 | 100 |
| 16 | 16 | 0 | 5 | 100 | 100 | 96 |
| 16 | 8 | 0 | 27 | 94 | 90 | 81 |
| 8 | 62 | 0 | 3 | 100 | 99 | 100 |
| 8 | 31 | 0 | 0 | 100 | 100 | 100 |
| 8 | 16 | 0 | 13 | 98 | 100 | 93 |
| 8 | 8 | 0 | 15 | 75 | 89 | 80 |

| Application Rate (g a.i./ha) | | | |
|---|---|---|---|
| Cpd. No. 20 | (b15C2) | AMBEL | ERICA |
| 62 | — | 96 | 95 |
| 31 | — | 86 | 94 |
| 16 | — | 100 | 90 |
| 8 | — | 0 | 58 |
| — | 62 | 15 | 13 |
| — | 31 | 0 | 0 |
| — | 16 | 0 | 0 |
| — | 8 | 0 | 0 |
| 62 | 62 | 100 | 99 |
| 62 | 31 | 100 | 77 |
| 62 | 16 | 100 | 63 |
| 62 | 8 | 100 | 99 |
| 31 | 62 | 98 | 97 |
| 31 | 31 | 100 | 93 |
| 31 | 16 | 100 | 99 |
| 31 | 8 | 88 | 97 |
| 16 | 62 | 53 | 99 |
| 16 | 31 | 0 | 93 |
| 16 | 16 | 89 | 88 |
| 16 | 8 | 33 | 87 |
| 8 | 62 | 0 | 94 |
| 8 | 31 | 0 | 85 |
| 8 | 16 | 0 | 0 |
| 8 | 8 | 16 | 63 |

*Application rates are grams of active ingredient per hectare (g a.i./ha).

TABLE J2

Observed Postemergence Results from Cpd. No. 20 Alone and in Combination with (b15C2)*

| Application Rate (g a.i./ha) | | | | | | |
|---|---|---|---|---|---|---|
| Cpd. No. 20 | (b15C2) | ZEAMD | GLXMA | SETFA | AMAPA | AMATU |
| 62 | — | 0 | 6 | 80 | 63 | 86 |
| 31 | — | 0 | 9 | 75 | 33 | 71 |
| 16 | — | 0 | 4 | 69 | 15 | 53 |
| 8 | — | 0 | 3 | 34 | 18 | 55 |
| — | 62 | 10 | 68 | 6 | 74 | 83 |
| — | 31 | 9 | 43 | 8 | 56 | 75 |

TABLE J2-continued

Observed Postemergence Results from Cpd. No. 20 Alone and in Combination with (b15C2)*

| | | | | | | |
|---|---|---|---|---|---|---|
| — | 16 | 5 | 29 | 5 | 38 | 55 |
| — | 8 | 3 | 20 | 5 | 20 | 43 |
| 62 | 62 | 15 | 79 | 91 | 92 | 98 |
| 62 | 31 | 8 | 51 | 90 | 86 | 95 |
| 62 | 16 | 15 | 51 | 91 | 78 | 94 |
| 62 | 8 | 1 | 38 | 86 | 65 | 91 |
| 31 | 62 | 10 | 75 | 93 | 84 | 95 |
| 31 | 31 | 6 | 45 | 85 | 73 | 90 |
| 31 | 16 | 11 | 54 | 86 | 64 | 91 |
| 31 | 8 | 3 | 39 | 78 | 55 | 84 |
| 16 | 62 | 13 | 76 | 81 | 78 | 94 |
| 16 | 31 | 6 | 46 | 80 | 64 | 89 |
| 16 | 16 | 8 | 58 | 76 | 60 | 86 |
| 16 | 8 | 1 | 39 | 71 | 54 | 81 |
| 8 | 62 | 13 | 68 | 80 | 84 | 88 |
| 8 | 31 | 11 | 48 | 75 | 63 | 67 |
| 8 | 16 | 1 | 45 | 76 | 59 | 85 |
| 8 | 8 | 0 | 33 | 63 | 46 | 68 |

Application Rate (g a.i./ha)

| Cpd. No. 20 | (b15C2) | AMBEL | ERICA |
|---|---|---|---|
| 62 | — | 95 | 90 |
| 31 | — | 91 | 90 |
| 16 | — | 93 | 90 |
| 8 | — | 86 | 85 |
| — | 62 | 20 | 5 |
| — | 31 | 10 | 0 |
| — | 16 | 3 | 0 |
| — | 8 | 5 | 0 |
| 62 | 62 | 98 | 90 |
| 62 | 31 | 97 | 89 |
| 62 | 16 | 97 | 90 |
| 62 | 8 | 97 | 90 |
| 31 | 62 | 97 | 90 |
| 31 | 31 | 95 | 90 |
| 31 | 16 | 95 | 89 |
| 31 | 8 | 94 | 90 |
| 16 | 62 | 90 | 88 |
| 16 | 31 | 94 | 90 |
| 16 | 16 | 85 | 90 |
| 16 | 8 | 90 | 86 |
| 8 | 62 | 85 | 85 |
| 8 | 31 | 81 | 85 |
| 8 | 16 | 83 | 86 |
| 8 | 8 | 84 | 85 |

*Application rates are grams of active ingredient per hectare (g a.i./ha).

Test K

This test evaluated the effect of mixtures of Cpd. No. 20 with metribuzin or rimsulfuron on several plant species. Seeds of plant species selected from corn (ZEAMD; *Zea mays*, cv. 'Pioneer 1184'), soybean (GLXMA; *Glycine max*, cv. Pioneer 35T58), giant foxtail (SETFA; *Setaria faberi*), palmer amaranth (AMAPA; *Amaranthus palmeri*), common waterhemp (AMATU; *Amaranthus rudis*), mare's tail (ERICA; *Conyza canadensis*), and common ragweed (AMBEL; *Ambrosia artemisiifolia*) were planted in pots containing Tama Silt Loam soil and treated preemergence with a directed soil spray using test chemicals formulated in a non-phytotoxic solvent mixture which included a surfactant. At the same time, plants selected from these crop and weed species were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence with test chemicals formulated in the same manner. Plants ranged in height from 2 to 10 cm and were in the one- to two-leaf stage for the postemergence treatment. Treated plants and untreated controls were maintained in a greenhouse for approximately 14-21 d, after which time all treated plants were compared to untreated controls and visually evaluated for injury. Plant response ratings, summarized in Tables K1 to K4, are based on a 0 to 100 scale where 0 is no effect and 100 is complete control. A dash (-) response means no test result. Test results are presented as a mean of 4 reps.

TABLE K1

Observed Preemergence Results from Cpd. No. 20 Alone and in Combination with Metribuzin*

| Application Rate (g a.i./ha) | | | | | | |
|---|---|---|---|---|---|---|
| Cpd. No. 20 | Metribuzin | ZEAMD | GLXMA | SETFA | AMAPA | AMATU |
| 62 | — | 0 | 0 | 100 | 45 | 30 |
| 31 | — | 0 | 0 | 84 | 50 | 20 |
| 16 | — | 0 | 0 | 50 | 26 | 0 |
| 8 | — | 0 | 0 | 6 | 0 | 0 |
| — | 125 | 0 | 0 | 80 | 70 | 86 |
| — | 62 | 0 | 0 | 30 | 78 | 53 |
| 62 | 125 | 0 | 0 | 100 | 68 | 100 |
| 62 | 62 | 0 | 0 | 100 | 49 | 100 |
| 31 | 125 | 0 | 0 | 100 | 98 | 100 |
| 31 | 62 | 0 | 0 | 99 | 70 | 83 |
| 16 | 125 | 0 | 0 | 98 | 100 | 100 |
| 16 | 62 | 0 | 0 | 88 | 95 | 78 |
| 8 | 125 | 0 | 0 | 95 | 91 | 98 |
| 8 | 62 | 0 | 0 | 65 | 66 | 71 |

| Application Rate (g a.i./ha) | | | |
|---|---|---|---|
| Cpd. No. 20 | Metribuzin | AMBEL | ERICA |
| 62 | — | 100 | 100 |
| 31 | — | 55 | 100 |
| 16 | — | 26 | 100 |
| 8 | — | 0 | 89 |
| — | 125 | 100 | 100 |
| — | 62 | 40 | 100 |
| 62 | 125 | 100 | 100 |
| 62 | 62 | 100 | 100 |
| 31 | 125 | 100 | 100 |
| 31 | 62 | 100 | 100 |
| 16 | 125 | 100 | 100 |
| 16 | 62 | 75 | 100 |
| 8 | 125 | 100 | 100 |
| 8 | 62 | 100 | 100 |

*Application rates are grams of active ingredient per hectare (g a.i./ha).

TABLE K2

Observed Preemergence Results from Cpd. No. 20 Alone and in Combination with Rimsulfuron*

| Application Rate (g a.i./ha) | | | | | | |
|---|---|---|---|---|---|---|
| Cpd. No. 20 | Rimsulfuron | ZEAMD | GLXMA | SETFA | AMAPA | AMATU |
| 62 | — | 0 | 0 | 100 | 45 | 30 |
| 31 | — | 0 | 0 | 84 | 50 | 20 |
| 16 | — | 0 | 0 | 50 | 26 | 0 |
| 8 | — | 0 | 0 | 6 | 0 | 0 |
| — | 16 | 0 | 0 | 73 | 40 | 73 |
| — | 8 | 0 | 0 | 50 | 33 | 51 |
| 62 | 16 | 0 | 0 | 100 | 51 | 63 |
| 62 | 8 | 0 | 0 | 98 | 65 | 70 |
| 31 | 16 | 0 | 0 | 90 | 53 | 53 |
| 31 | 8 | 0 | 0 | 93 | 40 | 74 |
| 16 | 16 | 0 | 0 | 83 | 28 | 43 |
| 16 | 8 | 0 | 0 | 66 | 31 | 41 |
| 8 | 16 | 0 | 0 | 14 | 0 | 0 |
| 8 | 8 | 0 | 0 | 36 | 35 | 39 |

| Application Rate (g a.i./ha) | | | |
|---|---|---|---|
| Cpd. No. 20 | Rimsulfuron | AMBEL | ERICA |
| 62 | — | 100 | 100 |
| 31 | — | 55 | 100 |
| 16 | — | 26 | 100 |
| 8 | — | 0 | 89 |
| — | 16 | 43 | 98 |
| — | 8 | 0 | 95 |

TABLE K2-continued

Observed Preemergence Results from Cpd. No. 20 Alone and in Combination with Rimsulfuron*

| | | | |
|---|---|---|---|
| 62 | 16 | 100 | 100 |
| 62 | 8 | 100 | 100 |
| 31 | 16 | 95 | 100 |
| 31 | 8 | 99 | 100 |
| 16 | 16 | 86 | 100 |
| 16 | 8 | 78 | 95 |
| 8 | 16 | 14 | 93 |
| 8 | 8 | 48 | 100 |

*Application rates are grams of active ingredient per hectare (g a.i./ha).

TABLE K3

Observed Postemergence Results from Cpd. No. 20 Alone and in Combination with Metribuzin*

| Application Rate (g a.i./ha) | | | | | | |
|---|---|---|---|---|---|---|
| Cpd. No. 20 | Metribuzin | ZEAMD | GLXMA | SETFA | AMAPA | AMATU |
| 62 | — | 0 | 13 | 92 | 60 | 62 |
| 31 | — | 0 | 8 | 77 | 33 | 68 |
| 16 | — | 0 | 0 | 62 | 38 | 57 |
| 8 | — | 0 | 0 | 37 | 28 | 50 |
| — | 125 | 10 | 53 | 10 | 47 | 82 |
| — | 62 | 0 | 33 | 0 | 35 | 37 |
| 62 | 125 | 18 | 40 | 98 | 75 | 90 |
| 62 | 62 | 13 | 32 | 100 | 80 | 92 |
| 31 | 125 | 15 | 52 | 98 | 77 | 85 |
| 31 | 62 | 10 | 37 | 97 | 58 | 100 |
| 16 | 125 | 7 | 55 | 93 | 77 | 88 |
| 16 | 62 | 7 | 40 | 98 | 57 | 92 |
| 8 | 125 | 10 | 33 | 82 | 80 | 83 |
| 8 | 62 | 0 | 27 | 78 | 65 | 80 |

| Application Rate (g a.i./ha) | | | |
|---|---|---|---|
| Cpd. No. 20 | Metribuzin | AMBEL | ERICA |
| 62 | — | 97 | 93 |
| 31 | — | 92 | 92 |
| 16 | — | 82 | 85 |
| 8 | — | 82 | 77 |
| — | 125 | 62 | 13 |
| — | 62 | 55 | 10 |
| 62 | 125 | 99 | 100 |
| 62 | 62 | 99 | 99 |
| 31 | 125 | 99 | 97 |
| 31 | 62 | 99 | 98 |
| 16 | 125 | 100 | 100 |
| 16 | 62 | 99 | 90 |
| 8 | 125 | 83 | 80 |
| 8 | 62 | 99 | 100 |

*Application rates are grams of active ingredient per hectare (g a.i./ha).

TABLE K4

Observed Postemergence Results from Cpd. No. 20 Alone and in Combination with Rimsulfuron*

| Application Rate (g a.i./ha) | | | | | | |
|---|---|---|---|---|---|---|
| Cpd. No. 20 | Rimsulfuron | ZEAMD | GLXMA | SETFA | AMAPA | AMATU |
| 62 | — | 0 | 13 | 92 | 60 | 62 |
| 31 | — | 0 | 8 | 77 | 33 | 68 |
| 16 | — | 0 | 0 | 62 | 38 | 57 |
| 8 | — | 0 | 0 | 37 | 28 | 50 |
| — | 16 | 10 | 93 | 97 | 60 | 77 |

TABLE K4-continued

Observed Postemergence Results from Cpd. No. 20 Alone and in Combination with Rimsulfuron*

| | | | | | | |
|---|---|---|---|---|---|---|
| — | 8 | 0 | 75 | 80 | 60 | 75 |
| 62 | 16 | 3 | 92 | 100 | 63 | 77 |
| 62 | 8 | 0 | 85 | 99 | 62 | 75 |
| 31 | 16 | 0 | 83 | 99 | 58 | 60 |
| 31 | 8 | 0 | 90 | 97 | 60 | 75 |
| 16 | 16 | 0 | 85 | 95 | 53 | 75 |
| 16 | 8 | 0 | 90 | 97 | 55 | 63 |
| 8 | 16 | 0 | 7 | 42 | 25 | 50 |
| 8 | 8 | 0 | 90 | 95 | 60 | 68 |

| Application Rate (g a.i./ha) | | | |
|---|---|---|---|
| Cpd. No. 20 | Rimsulfuron | AMBEL | ERICA |
| 62 | — | 97 | 93 |
| 31 | — | 92 | 92 |
| 16 | — | 82 | 85 |
| 8 | — | 82 | 77 |
| — | 16 | 60 | 70 |
| — | 8 | 40 | 50 |
| 62 | 16 | 94 | 97 |
| 62 | 8 | 97 | 96 |
| 31 | 16 | 90 | 92 |
| 31 | 8 | 96 | 95 |
| 16 | 16 | 92 | 92 |
| 16 | 8 | 87 | 83 |
| 8 | 16 | 82 | 82 |
| 8 | 8 | 80 | 68 |

*Application rates are grams of active ingredient per hectare (g a.i./ha).

This test evaluated the effect of mixtures of Cpd. No. 20 with benoxacor, isoxadifen-ethyl, or cloquintocet-mexyl on several plant species. Seeds of plant species selected from corn (ZEAMD; *Zea mays*, cv. 'Pioneer 1184'), soybean (GLXMA; *Glycine max*, cv. Pioneer 35T58), winter wheat (TRZAW; *Triticum aetivum*, cv. Arezzo), rice (ORYSS; *Oryza sativa*, cv. M202), and giant foxtail (SETFA; *Setaria faberi*) were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence using test chemicals formulated in a non-phytotoxic solvent mixture which included a surfactant. Plants ranged in height from 7 to 10 cm and were in the one- to two-leaf stage for the postemergence treatment. Treated plants and untreated controls were maintained in a greenhouse for approximately 14 d, after which time all treated plants were compared to untreated controls and visually evaluated for injury. Plant response ratings, summarized in Tables L1 to L3, are based on a 0 to 100 scale where 0 is no effect and 100 is complete control. A dash (-) response means no test result. Test results are presented as a mean of 4 reps.

TABLE L1

Observed Results from Cpd. No. 20 Alone and in Combination with Benoxacor*

| Application Rate (g a.i./ha) | | | | | | |
|---|---|---|---|---|---|---|
| Cpd. No. 20 | Benoxacor | ZEAMD | GLXMA | TRZAW | ORYSS | SETFA |
| 375 | — | 34 | 39 | 39 | 23 | 90 |
| 250 | — | 1 | 29 | 36 | 18 | 88 |
| 125 | — | 8 | 15 | 28 | 5 | 84 |
| — | 31 | 0 | 0 | 0 | 0 | 0 |
| 375 | 31 | 15 | 45 | 35 | 25 | 93 |

TABLE L1-continued

Observed Results from Cpd. No. 20 Alone and in Combination with Benoxacor*

| Application Rate (g a.i./ha) | | | | | | |
|---|---|---|---|---|---|---|
| Cpd. No. 20 | Benoxacor | ZEAMD | GLXMA | TRZAW | ORYSS | SETFA |
| 250 | 31 | 19 | 39 | 31 | 24 | 90 |
| 125 | 31 | 13 | 20 | 18 | 8 | 90 |

*Application rates are grams of active ingredient per hectare (g a.i./ha).

TABLE L2

Observed Results from Cpd. No. 20 Alone and in Combination with Isoxadifen-ethyl*

| Application Rate (g a.i./ha) | | | | | | |
|---|---|---|---|---|---|---|
| Cpd. No. 20 | Isoxadifen-ethyl | ZEAMD | GLXMA | TRZAW | ORYSS | SETFA |
| 375 | — | 34 | 39 | 39 | 23 | 90 |
| 250 | — | 1 | 29 | 36 | 18 | 88 |
| 125 | — | 8 | 15 | 28 | 5 | 84 |
| — | 31 | 0 | 10 | 0 | 8 | 0 |
| 375 | 31 | 0 | 45 | 28 | 6 | 97 |
| 250 | 31 | 0 | 45 | 10 | 0 | 93 |
| 125 | 31 | 0 | 29 | 0 | 0 | 88 |

*Application rates are grams of active ingredient per hectare (g a.i./ha).

TABLE L3

Observed Results from Cpd. No. 20 Alone and in Combination with Cloquintocet-mexyl*

| Application Rate (g a.i./ha) | | | | | | |
|---|---|---|---|---|---|---|
| Cpd. No. 20 | Cloquintocet-mexyl | ZEAMD | GLXMA | TRZAW | ORYSS | SETFA |
| 375 | — | 34 | 39 | 39 | 23 | 90 |
| 250 | — | 1 | 29 | 36 | 18 | 88 |
| 125 | — | 8 | 15 | 28 | 5 | 84 |
| — | 31 | 0 | 0 | 0 | 0 | 0 |
| 375 | 31 | 0 | 43 | 23 | 29 | 96 |
| 250 | 31 | 0 | 31 | 21 | 25 | 91 |
| 125 | 31 | 0 | 25 | 0 | 10 | 93 |

*Application rates are grams of active ingredient per hectare (g a.i./ha).

Test M

This test evaluated the effect of mixtures of Cpd. No. 20 with isoxadifen-ethyl, or cloquintocet-mexyl, or Mefenpyr-diethyl on several plant species. Seeds of plant species selected from corn (ZEAMD; *Zea mays*, cv. 'Pioneer 1184'), soybean (GLXMA; *Glycine max*, cv. Pioneer 35T58), winter wheat (TRZAW; *Triticum aetivum*, cv. Arezzo), winter barley (HORVW; *Hordeum vulgare*, cv. Boone), rice (ORYSS; *Oryza sativa*, cv. M202), and giant foxtail (SETFA; *Setaria faberi*) were planted in pots containing Redi-Earth® planting medium (Scotts Company, 14111 Scottslawn Road, Marysville, Ohio 43041) comprising spaghnum peat moss, vermiculite, wetting agent and starter nutrients and treated postemergence using test chemicals formulated in a non-phytotoxic solvent mixture which included a surfactant. Plants ranged in height from 7 to 10 cm and were in the one- to two-leaf stage for the postemergence treatment. Treated plants and untreated controls were maintained in a greenhouse for approximately 14 d, after which time all treated plants were compared to untreated controls and visually evaluated for injury. Plant response ratings, summarized in Tables M1 to M3, are based on a 0 to 100 scale where 0 is no effect and 100 is complete control. A dash (-) response means no test result. Test results are presented as a mean of 3 reps.

TABLE M1

Observed Results from Cpd. No. 20 Alone and in Combination with Isoxadifen-ethyl*

| Application Rate (g a.i./ha) | | | | | | | |
|---|---|---|---|---|---|---|---|
| Cpd. No. 20 | Isoxadifen-ethyl | ZEAMD | GLXMA | TRZAW | HORVW | ORYSS | SETFA |
| 375 | — | 33 | 35 | 35 | 20 | 40 | 100 |
| 250 | — | 28 | 30 | 22 | 15 | 40 | 100 |
| 125 | — | 17 | 22 | 8 | 10 | 35 | 99 |
| 62 | — | 0 | 15 | 0 | 0 | 20 | 96 |
| — | 31 | 0 | 0 | 0 | 0 | 0 | 0 |
| 375 | 31 | 0 | 40 | 23 | 12 | 43 | 98 |
| 250 | 31 | 0 | 38 | 13 | 12 | 35 | 99 |
| 125 | 31 | 0 | 30 | 0 | 7 | 18 | 98 |
| 62 | 31 | 0 | 20 | 0 | 0 | 15 | 93 |

*Application rates are grams of active ingredient per hectare (g a.i./ha).

TABLE M2

Observed Results from Cpd. No. 20 Alone and in Combination with Cloquintocet-mexyl*

| Application Rate (g a.i./ha) | | | | | | | |
|---|---|---|---|---|---|---|---|
| Cpd. No. 20 | Cloquintocet-mexyl | ZEAMD | GLXMA | TRZAW | HORVW | ORYSS | SETFA |
| 375 | — | 33 | 35 | 35 | 20 | 40 | 100 |
| 250 | — | 28 | 30 | 22 | 15 | 40 | 100 |
| 125 | — | 17 | 22 | 8 | 10 | 35 | 99 |
| 62 | — | 0 | 15 | 0 | 0 | 20 | 96 |
| — | 31 | 0 | 0 | 0 | 0 | 0 | 0 |
| 375 | 31 | 0 | 60 | 8 | 13 | 55 | 100 |
| 250 | 31 | 0 | 40 | 0 | 15 | 42 | 100 |
| 125 | 31 | 0 | 22 | 0 | 13 | 33 | 98 |
| 62 | 31 | 0 | 17 | 0 | 12 | 10 | 93 |

*Application rates are grams of active ingredient per hectare (g a.i./ha).

TABLE M3

Observed Results from Cpd. No. 20 Alone and in Combination with Mefenpyr-diethyl*

Application Rate (g a.i./ha)

| Cpd. No. 20 | Mefenpyr-diethyl | ZEAMD | GLXMA | TRZAW | HORVW | ORYSS | SETFA |
|---|---|---|---|---|---|---|---|
| 375 | — | 33 | 35 | 35 | 20 | 40 | 100 |
| 250 | — | 28 | 30 | 22 | 15 | 40 | 100 |
| 125 | — | 17 | 22 | 8 | 10 | 35 | 99 |
| 62 | — | 0 | 15 | 0 | 0 | 20 | 96 |
| — | 31 | 0 | 0 | 0 | 0 | 0 | 0 |
| 375 | 31 | 22 | 57 | 12 | 10 | 58 | 99 |
| 250 | 31 | 13 | 35 | 3 | 3 | 40 | 99 |
| 125 | 31 | 7 | 17 | 0 | 12 | 35 | 99 |
| 62 | 31 | 5 | 25 | 0 | 0 | 17 | 93 |

*Application rates are grams of active ingredient per hectare (g a.i./ha).

What is claimed is:

1. A compound of Formula I and N-oxides or salts thereof,

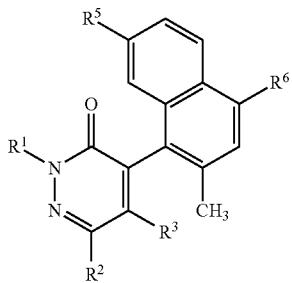

I wherein
$R^1$ is $C_1$-$C_4$ alkyl or $C_3$-$C_6$ cycloalkyl;
$R^2$ is Cl;
$R^3$ is Cl or $OR^4$;
$R^4$ is H or $C_1$-$C_4$ alkyl;
$R^5$ is F, Cl or $CH_3$; and
$R^6$ is H.

2. The compound of claim 1 wherein
$R^2$ is Cl;
$R^3$ is $OR^4$;
$R^4$ is H or methyl; and
$R^5$ is F, Cl or $CH_3$;
$R^6$ is H.

3. The compound of any one of claims 1 to 2 wherein $R^5$ is $CH_3$.

4. The compound of claim 1 selected from the group consisting of
6-chloro-4-(2,7-dimethyl-1-naphthalenyl)-5-hydroxy-2-methyl-3 (2H)-pyridazinone;
6-chloro-4-(7-fluoro-2-methyl-1-naphthalenyl)-5-hydroxy-2-methyl-3 (2H)-pyridazinone; and
6-chloro-4-(7-chloro-2-methyl-1-naphthalenyl)-5-hydroxy-2-methyl-3 (2H)-pyridazinone.

5. A herbicidal composition comprising the compound of claim 1 and at least one component selected from the group consisting of surfactants, solid diluents, and liquid diluents.

6. A herbicidal composition comprising a compound of claim 1, at least one additional active ingredient selected from the group consisting of other herbicides and herbicide safeners, and at least one component selected from the group consisting of surfactants, solid diluents and liquid diluents.

7. A herbicidal mixture comprising (a) a compound of claim 1, and (b) at least one additional active ingredient.

8. The herbicidal mixture of claim 7 wherein the (b) at least one additional active ingredient is selected from the group consisting of 5-chloro-2-[3-chloro-2-[3-(difluoromethyl)-5-isoxazolyl]phenoxy]-pyrimidine, 1-[2-chloro-6-[(5-chloro-2-pyrimidinyl)oxy]phenyl]-4,4,4-trifluoro-1-butanone, 2,4-D, Acetochlor, Acifluorfen, Atrazine, Carfentrazone, Chlorimuron, Clethodim, Clomazone, Clopyralid, Cloransulam-methyl, Dicamba, Diflufenican, Dimethenamid, Diquat, Flumioxazin, Fluroxypyr, Fluthiacet-methyl, Fomesafen, Glufosinate, Glyphosate, Imazethapyr, Isoxaflutole, Lactofen, Mesotrione, Metribuzin, Pyroxasulfone, Rimsulfuron, Saflufenacil, S-metolachlor, Sulfentrazone, Tembotrione, Thiencarbazone, Tolpyralate, Topramezone, benoxacor, isoxadifen-ethyl, cloquintocet-mexyl and Mefenpyr-diethyl.

9. The herbicidal mixture of claim 8 wherein the (b) at least one additional active ingredient is selected from the group consisting of 5-chloro-2-[3-chloro-2-[3-(difluoromethyl)-5-isoxazolyl]phenoxy]-pyrimidine, atrazine, glyphosate, saflufenacil, pyroxasulfone, 1-[2-chloro-6-[(5-chloro-2-pyrimidinyl)oxy]phenyl]-4,4,4-trifluoro-1-butanone, metribuzin, and rimsulfuron.

10. A herbicidal mixture of claim 8 wherein the (b) at least one additional active ingredient is selected from the group consisting of benoxacor, isoxadifen-ethyl, cloquintocet-mexyl and Mefenpyr-diethyl.

11. A herbicidal mixture of claim 8 wherein the (b) at least one additional active ingredient is selected from the group consisting of S-metolachlor, Sulfentrazone, Clomazone, Chlorimuron, Fomesafen, Flumioxazin, Fluroxypyr, 2,4-D, Isoxaflutole, Diflufenican, Mesotrione, Topramezone, Tolpyralate, Dicamba, Carfentrazone, Clopyralid, Acetochlor and Thiencarbazone.

12. A method for controlling the growth of undesired vegetation comprising contacting the vegetation or its environment with a herbicidally effective amount of a compound of claim 1.

13. A process for preparing a compound of Formula I-A,

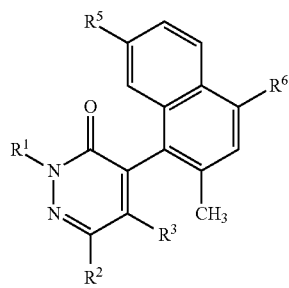

I-A wherein
R$^1$ is C$_1$-C$_4$ alkyl or C$_3$-C$_6$ cycloalkyl;
R$^2$ is Cl;
R$^5$ is F, Cl or CH$_3$; and
R$^6$ is H;
the process comprising:
(1) reacting a compound of Formula II

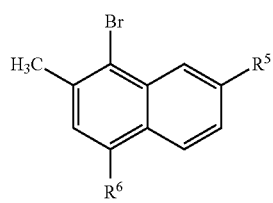

II wherein
R$^5$ is F, Cl or CH$_3$; and
R$^6$ is H;
with magnesium to form an intermediate compound of Formula III

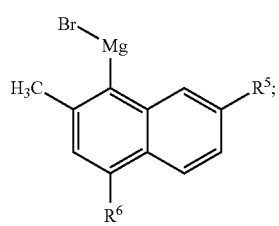

III and
(2) reacting the intermediate compound or Formula III formed in (1) with a compound of Formula IV-B

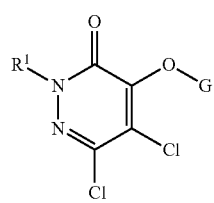

IV-B wherein
R$^1$ is C$_1$-C$_4$ alkyl or C$_3$-C$_6$ cycloalkyl;
G is C$_1$-C$_4$ alkyl, SO$_2$CF$_3$ or SO$_2$ (4-Me-Ph).

14. A process for preparing a compound of Formula I-C

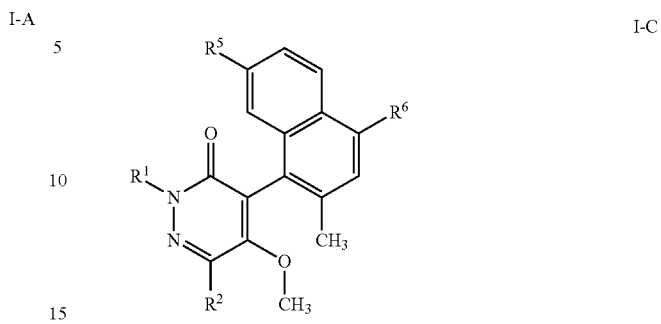

I-C wherein
R$^1$ is C$_1$-C$_4$ alkyl or C$_3$-C$_6$ cycloalkyl;
R$^2$ is Cl;
R$^5$ is F, Cl or CH$_3$; and
R$^6$ is H;
the process comprising:
(1) reacting a compound of Formula I-B,

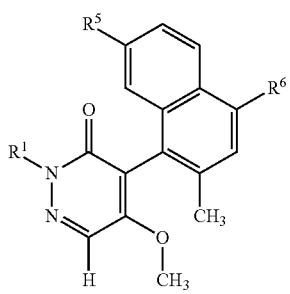

I-B wherein
R$^1$ is C$_1$-C$_4$ alkyl or C$_3$-C$_6$ cycloalkyl;
R$^5$ is F, Cl or CH$_3$; and
R$^6$ is H;
with a tmp-zinc base, to form a zincated intermediate compound of Formula V

V and
(2) reacting the zincated intermediate compound of Formula V formed in (1) with a halogenating agent.

15. A process for preparing a compound of Formula I-D

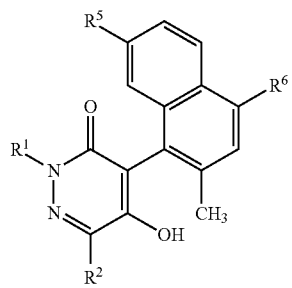

wherein
$R^1$ is $C_1$-$C_4$ alkyl or $C_3$-$C_6$ cycloalkyl;
$R^2$ is Cl;
$R^5$ is F, Cl or $CH_3$; and
$R^6$ is H;
the process comprising reacting a compound of Formula I-C,

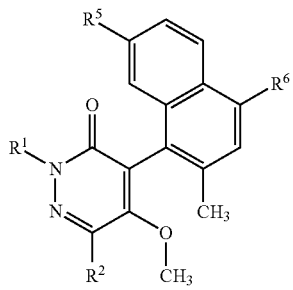

wherein
$R^1$ is $C_1$-$C_4$ alkyl or $C_3$-$C_6$ cycloalkyl;
$R^2$ is Cl;
$R^5$ is F, Cl or $CH_3$; and
$R^6$ is H;
with a demethylating agent.

16. A process for preparing a compound of Formula I-E

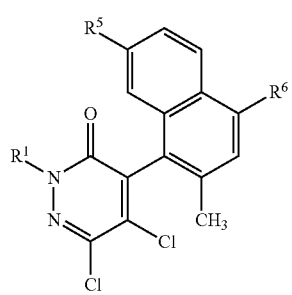

wherein
$R^1$ is $C_1$-$C_4$ alkyl or $C_3$-$C_6$ cycloalkyl;
$R^5$ is F, Cl or $CH_3$; and
$R^6$ is H;

the process comprising reacting a compound of Formula VI

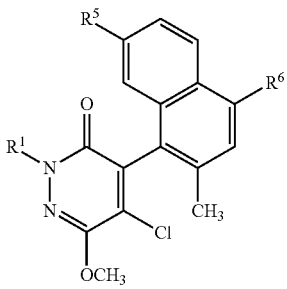

wherein
$R^1$ is $C_1$-$C_4$ alkyl or $C_3$-$C_6$ cycloalkyl;
$R^5$ is F, Cl or $CH_3$; and
$R^6$ is H;
with phosphorous oxychloride.

17. A process for preparing a compound of Formula I-E

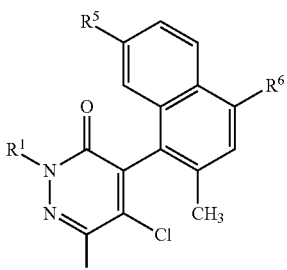

wherein
$R^1$ is $C_1$-$C_4$ alkyl or $C_3$-$C_6$ cycloalkyl;
$R^5$ is F, Cl or $CH_3$; and
$R^6$ is H;
the process comprising:
(1) reacting a compound of Formula II

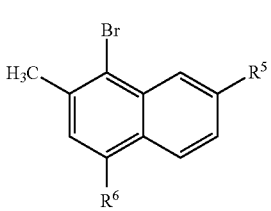

wherein
$R^5$ is F, Cl or $CH_3$; and
$R^6$ is H;

with magnesium to form an intermediate compound of Formula III
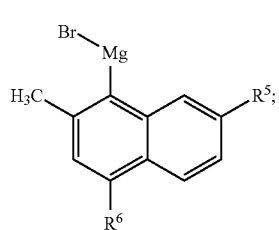
and
(2) reacting the intermediate compound or Formula III formed in (1) with a compound of Formula 7
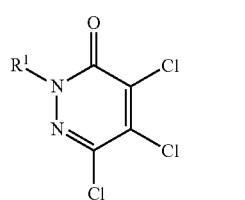
wherein
$R^1$ is $C_1$-$C_4$ alkyl or $C_3$-$C_6$ cycloalkyl.
* * * * *